(12) United States Patent
Ogasawara et al.

(10) Patent No.: US 7,847,805 B2
(45) Date of Patent: Dec. 7, 2010

(54) DISPLAY APPARATUS, DISPLAY METHOD, PROGRAM AND RECORDING MEDIUM

(75) Inventors: Masakazu Ogasawara, Osaka (JP); Akira Ueda, Shiga (JP); Hiroshi Miyai, Hyogo (JP)

(73) Assignee: Panasonic Corporation, Osaka (JP)

( * ) Notice: Subject to any disclaimer, the term of this patent is extended or adjusted under 35 U.S.C. 154(b) by 706 days.

(21) Appl. No.: 10/577,373

(22) PCT Filed: Oct. 29, 2004

(86) PCT No.: PCT/JP2004/016126

§ 371 (c)(1),
(2), (4) Date: Apr. 28, 2006

(87) PCT Pub. No.: WO2005/043502

PCT Pub. Date: May 12, 2005

(65) Prior Publication Data

US 2007/0030284 A1 Feb. 8, 2007

(30) Foreign Application Priority Data

Oct. 30, 2003 (JP) .............................. 2003-371290
Sep. 10, 2004 (JP) .............................. 2004-264345
Sep. 10, 2004 (JP) .............................. 2004-264346

(51) Int. Cl.
*G09G 5/02* (2006.01)
(52) U.S. Cl. .................................................... 345/593
(58) Field of Classification Search .................. 345/600, 345/617; 382/254
See application file for complete search history.

(56) References Cited

U.S. PATENT DOCUMENTS

| 5,428,385 A | * | 6/1995 | Sakata .......................... 348/30 |
| 5,929,843 A | | 7/1999 | Tanioka |
| 5,990,855 A | * | 11/1999 | Kobayashi et al. ............ 345/88 |

(Continued)

FOREIGN PATENT DOCUMENTS

JP 5-241551 9/1993

(Continued)

OTHER PUBLICATIONS

A. Kunzman, G. Pettitt, "White Enhancement for Color-Sequential DLP," SID International Symposium Digest of Technical Papers, SID (Society for Information Display), May 1998, vol. 29, pp. 121-128, USA.

(Continued)

*Primary Examiner*—Aaron M Richer
(74) *Attorney, Agent, or Firm*—RatnerPrestia

(57) ABSTRACT

A display apparatus, which makes one pixel displayable in four colors, that is, three primary colors and a white color, and inputs and displays chrominance signals corresponding to a mixing ratio of the four colors, includes a color correction instrument which performs first color correction of increasing the saturation of chrominance signals, and a second color correction of decreasing at least the saturation of the chrominance signals, when a predetermined color component exists in the chrominance signals corresponding to a pixel, selection instrument which switches temporally and selects either of first chrominance signals obtained by the first color correction, and second chrominance signals obtained by the second color correction, and a display instrument which displays the chrominance signals, which are selected, in the pixel.

21 Claims, 30 Drawing Sheets

U.S. PATENT DOCUMENTS

| | | | |
|---|---|---|---|
| 6,766,052 B2 * | 7/2004 | Okada et al. | 382/162 |
| 6,868,179 B2 * | 3/2005 | Gruzdev et al. | 382/167 |
| 7,176,935 B2 * | 2/2007 | Higgins | 345/589 |
| 2004/0051908 A1 * | 3/2004 | Curry et al. | 358/3.08 |

FOREIGN PATENT DOCUMENTS

| | | |
|---|---|---|
| JP | 6-324654 | 11/1994 |
| JP | 8-146905 | 6/1996 |
| JP | 9-244602 | 9/1997 |
| JP | 2000-39862 | 2/2000 |
| JP | 2001-125557 | 5/2001 |
| JP | 2002-229531 | 8/2002 |
| JP | 2003-224860 | 8/2003 |
| JP | 2003-255908 | 9/2003 |

OTHER PUBLICATIONS

International Search Report corresponding to PCT International Application No. PCT/JP2004/016126 dated Feb. 8, 2005.

Supplementary European Search Report for Application No. EP 04793234, Sep. 19, 2008, Panasonic Corp.

* cited by examiner

DISPLAY APPARATUS, DISPLAY METHOD, PROGRAM AND RECORDING MEDIUM

This application is a U.S. national phase application of PCT International Application PCT/JP2004/016126 dated Oct. 29, 2004.

TECHNICAL FIELD

The present invention relates to a display apparatus, a display method, a program, and a recording medium for making one pixel displayable in four colors, that is, three primary colors and a white color, and inputting and displaying chrominance signals corresponding to a mixing ratio of the above-mentioned four colors.

BACKGROUND ART

CRT, LCD (Liquid Crystal Device), DLP (Digital Light Processing Device), PDP, and the like are used as devices for color display, and RGB (red, green, and blue) three primary colors are used as general fundamental colors. On the other hand, white is also added in a part of LCD displays and DLP projectors to emphasize brightness.

That is, a display apparatus in which one pixel can display the color of four colors of R (red), G (green), B (blue), and W (white), and which displays RGB signals, which are inputted, by mixing the color of these four colors is used (e.g., refer to Japanese Patent Laid-Open No. 5-241551, and A. Kunzman and G. Pettitt, "White Enhancement for Color-Sequential DLP", SID International Symposium Digest of Technical Papers, USA, SID (Society for Information Display), May, 1998, Vol 29, pp. 121-124). A display apparatus which displays one pixel in the color of four colors of RGBW in this way is used, for example in a direct-view liquid crystal display apparatus, a DLP projector, or the like. For example, a four-color wheel of RGBW is used in a field-sequential system of one-chip DLP data projector which uses a color wheel. In addition, four display elements, which can display four colors of RGBW, per pixel are used in a liquid crystal display apparatus.

By displaying each pixel not only using RGB but using W, in comparison with the case of displaying only by RGB, it is possible to perform bright display, to increase contrast, and to reduce the consumed power of a lamp when brightness is same.

The structure of such a conventional display apparatus 51 is shown in FIG. 28.

The display apparatus 51 is constituted of white color component detection instrument 7, white display element driving instrument 8, a white display unit 9, RGB display element driving instrument 10, and an RGB display unit 11.

The white color component detection instrument 7 is the instrument which detects a white color component from RGB signals inputted.

The white display element driving instrument 8 is the instrument which drives the white display unit 9 in order to display a white color component detected by the white color component detection instrument 7.

The white display unit 9 is the instrument which displays a white color component by being driven by the white display element driving instrument 8.

The RGB display element driving instrument 10 is the instrument which drives the RGB display unit 11 in order to display the RGB signals inputted.

The RGB display unit 11 is the instrument which displays RGB components by being driven by the RGB display element driving instrument 10.

Screen structure in the case that the display apparatus 51 is a liquid crystal display apparatus is shown in FIG. 29. Reference numeral 52 denotes a basic unit which constitutes one pixel, and is constituted of four liquid crystal cells which can independently control the extent of transmission of white light exposed from the back. Then, the four color filters of R, G, B, and W are located to these four liquid crystal cells, respectively. In this way, when the display apparatus 51 is a liquid crystal display apparatus, a screen of the RGB display unit 11 and white display unit 9 has structure as shown in FIG. 29.

In addition, when being a DLP projector, the display apparatus 51 has the structure that four colors of RGBW are time-sequentially switched and is displayed in one pixel of the screen while synchronizing with a color wheel. Thus, when the display apparatus 51 is a DLP projector, the RGB display unit 11 and white display unit 9 are constituted of the color wheel, DMD (Digital Micromirror Device), and the like.

Next, the operation of such the conventional display apparatus 51 will be explained.

The RGB signals inputted from an apparatus, which displays an image on the display apparatus 51, such as a personal computer, DVD equipment, or a TV receiver are inputted into the RGB display element driving instrument 10 and white color component detection instrument 7.

The RGB display element driving instrument 10 generates drive signals of the RGB display unit 11 in order to display the RGB signals inputted, and drives the RGB display unit 11 with the drive signals.

On the other hand, the white color component detection instrument 7 detects a white color component from the RGB signals inputted, and outputs the white color component to the white display element driving instrument 8. The white display element driving instrument 8 generates a drive signal of the white display unit 9 in order to display the white color component from white color component detection instrument 7, and drives the white display unit 9 with the drive signal.

The RGB display unit 11 displays three colors of R, G, and B by being driven by the RGB display element driving instrument 10. On the other hand, the white display unit 9 displays one color of W by being driven by the white display element driving instrument 8.

Since the white by the white display unit 9 is added to the white by the RGB display unit 11 in the display apparatus 51, brightness becomes nearly twice in comparison with the case of only the RGB display unit 11.

In this way, the display apparatus 51 can achieve the display of a full color image whose brightness and contrast are increased by four colors of the three primary RGB colors and white color.

Nevertheless, in the display apparatus 51, a luminance ratio of white to RGB becomes nearly two times as large also using the white display unit 9 in compared with the case of only the RGB display unit 11. In consequence, the difference in brightness between white and normal color may become so large that, it may be apart from the sense of brightness which the brain stores, and sense of incongruity may be felt as to the way those colors appear. Thus, the brightness of image portions of colors other than white becomes dark relatively in comparison with the brightness of a white portion. As a result, since the brightness of some colors is much different from that of a white portion, the colors appear differently, and hence, sense of incongruity arises.

Since the luminance ratio of white and bright yellow becomes large in particular, yellow looks darker and the difference from the memory color of yellow becomes large, and hence, the sense of incongruity becomes large. Thus, as shown in FIG. 30, when pixels 14 in pastel yellow which are bright yellow, and pixels 13 in white which are white are displayed on the display screen, the bright yellow looks darker due to the contract with the white and the bright yellow may appear greenish. Such the sense of incongruity arises similarly also in bright cyan or bright magenta.

Thus, a display apparatus in which one pixel can be displayed in the color of four colors, that is, the three primary colors and a white color, and which inputs and displays chrominance signals corresponding to the mixing ratio of the color of the four colors has a problem that the brightness of colors may be apart from those which a brain stores when the difference in brightness between white and normal colors becomes large, and the sense of incongruity may be felt as to the way normal colors appear.

DISCLOSURE OF THE INVENTION

The present invention aims at providing a display apparatus, a display method, a program, and a recording medium capable of decreasing the sense of incongruity of the visual aspect of color in consideration of the above-mentioned problem.

In order to solve the problem mentioned above, the first aspect of the present invention is a display apparatus which makes one pixel displayable in four colors, that is, three primary colors and a white color, and inputs and displays chrominance signals corresponding to a mixing ratio of said four colors, comprising:

color correction instrument which performs a first color correction of increasing the saturation of said chrominance signals and a second color correction of increasing a white color component of said chrominance signals, when a predetermined color component exists in said chrominance signals corresponding to said pixel;

selection instrument which switches temporally a first chrominance signal obtained by said first color correction, and a second chrominance signal obtained by said second color correction, and selects either; and display instrument which displays the chrominance signal, which is selected, in said pixel.

In addition, the second aspect of the present invention is a display apparatus which makes one pixel displayable in four colors, that is, three primary colors and a white color, inputs chrominance signals corresponding to a mixing ratio of said four colors, and displays them without decreasing the number of colors, comprising:

color correction instrument which performs a first color correction of increasing saturation of said chrominance signals and a second color correction of increasing a white color component of said chrominance signals, when a predetermined color component exists in said chrominance signals corresponding to said pixel;

height generation instrument which gives, when there is a region where a plurality of pixels having said predetermined color component exist adjacently, at least height difference in saturation to said region by selecting either of said first chrominance signals and said second chrominance signals for every pixel of said region according to a predetermined pattern for selecting said first chrominance signals obtained by said first color correction, and said second chrominance signals obtained by said second color correction in turn for every one pixel or a plurality of adjacent pixels; and display instrument which displays said region where at least said height difference in saturation is given.

In addition, the third aspect of the present invention is the display apparatus according to the first or the second aspect of the present invention, wherein said predetermined color is yellow, magenta, or cyan.

In addition, the fourth aspect of the present invention is the display apparatus according to the first or the second aspect of the present invention, wherein said three primary colors are red, green, and blue.

In addition, the fifth aspect of the present invention is the display apparatus according to the first or the second aspect of the present invention, wherein said chrominance signals are RGB signals.

In addition, the sixth aspect of the present invention is the display apparatus according to the fifth aspect of the present invention, wherein, when said predetermined color is yellow, said color correction instrument performs said first color correction by decreasing a value of a B signal of said chrominance signals and performs said second color correction by increasing a B signal of said chrominance signals, when a yellow color component exists in said chrominance signals corresponding to said pixel.

In addition, the seventh present invention is the display apparatus according to the first aspect of the present invention wherein said selection instrument switches temporally and selects either said first chrominance signal or said second chrominance signal using a signal of determining the timing when said display instrument performs display in said pixel.

In addition, the eighth aspect of the present invention is the display apparatus according to the second aspect of the present invention, wherein said height generation instrument performs the selection of said first chrominance signals and said second chrominance signals using a signal of determining timing when said display instrument performs display in said pixel.

Furthermore, the ninth aspect of the present invention is a display method of making one pixel displayable in four colors, that is, three primary colors and a white color, and inputting and displaying chrominance signals corresponding to a mixing ratio of said four colors, comprising:

a color correction step of performing a first color correction of increasing the saturation of said chrominance signals and a second color correction of increasing a white color component of said chrominance signals, when a predetermined color component exists in said chrominance signals corresponding to said pixel;

a selection step of switching temporally a first chrominance signal obtained by said first color correction, and a second chrominance signal obtained by said second color correction, and selecting either; and a display step of displaying the chrominance signal, which is selected, in said pixel.

Furthermore, the tenth aspect of the present invention is a display method of making one pixel displayable in four colors, that is, three primary colors and a white color, and inputting chrominance signals corresponding to a mixing ratio of said four colors, and displaying them without decreasing the number of colors, comprising:

a color correction step of performing a first color correction of increasing saturation of said chrominance signals and a second color correction of increasing a white color component of said chrominance signals, when a predetermined color component exists in said chrominance signals corresponding to said pixel;

a height generation step of giving, when there is a region where a plurality of pixels having said predetermined color component exist adjacently, at least height difference in saturation to said region by selecting either of said first chrominance signals and said second chrominance signals for every pixel of said region according to a predetermined pattern for selecting said first chrominance signals obtained by said first color correction, and said second chrominance signals obtained by said second color correction in turn for every one pixel or a plurality of adjacent pixels; and a display step of displaying said region where at least the height difference in saturation is given.

In addition, the eleventh aspect of the present invention is a program for making a computer function as color correction instrument which performs the first color correction of increasing the saturation of said chrominance signals and the second color correction of increasing a white color component of said chrominance signals, when a predetermined color component exists in said chrominance signals corresponding to said pixel, and selection instrument which switches temporally a first chrominance signal obtained by said first color correction, and a second chrominance signal obtained by said second color correction, and selects either, in the display apparatus according to the first aspect of the present invention.

In addition, the twelfth aspect of the present invention is a program for making a computer function as:

color correction instrument which performs a first color correction of increasing saturation of said chrominance signals and a second color correction of increasing a white color component of said chrominance signals, when a predetermined color component exists in said chrominance signals corresponding to said pixel; and height generation instrument which gives, when there is a region where a plurality of pixels having said predetermined color component exist adjacently, at least height difference in saturation to said region by selecting either of said first chrominance signals and said second chrominance signals for every pixel of said region according to a predetermined pattern for selecting said first chrominance signals obtained by said first color correction, and said second chrominance signals obtained by said second color correction in turn for every one pixel or a plurality of adjacent pixels in the display apparatus according to the second aspect of the present invention.

In addition, the thirteenth aspect of the present invention is a recording medium which records the program according to the eleventh or the twelfth aspect of the present invention and can be processed by a computer.

Moreover, the fourteenth aspect of the present invention is a display apparatus which makes one pixel displayable in four colors, that is, three primary colors and a white color, and inputs and displays chrominance signals corresponding to a mixing ratio of said four colors, comprising:

color detection instrument which detects whether a predetermined color component is included in each chrominance signal corresponding to each pixel in a predetermined region;

color correction instrument which performs a first color correction of increasing the saturation of said chrominance signals and creating a first chrominance signal, and a second color correction of increasing a white color component of said chrominance signals and creating a second chrominance signal, control instrument which performs the color correction of a chrominance signal, including said predetermined color component, by said color correction instrument, and performs control so that said first chrominance signal and said second chrominance signal may be displayed spatially in turn in every predetermined plural pixel units, which are horizontally and/or vertically adjacent, in said predetermined region; and display instrument which displays said first chrominance signal, said second chrominance signal, or a chrominance signal, which is not given said color correction, in said pixel on the basis of said control instrument.

In addition, the fifteenth aspect of the present invention is the display apparatus according to the fourteenth aspect of the present invention wherein said every predetermined plural pixel units is every two pixel units.

Furthermore, the sixteenth aspect of the present invention is the display apparatus according to the fourteenth aspect of the present invention, wherein in the case that said control instrument performs control so that said first chrominance signal and said second chrominance signal may be displayed spatially in turn in every predetermined plural pixel units, which are horizontally adjacent, in said predetermined region, said control instrument switches and selects said first chrominance signal and said second chrominance signal in every said predetermined plurality of dot clock signals for determining display timing of every pixel in said predetermined region.

Moreover, the seventeenth aspect of the present invention is the display apparatus according to the fourteenth aspect of the present invention, wherein in the case that said control instrument performs control so that said first chrominance signal and said second chrominance signal may be displayed spatially in turn in every predetermined plural pixel unit, which are vertically adjacent, in said predetermined region, said control instrument switches and selects said first chrominance signal and said second chrominance signal for every said predetermined plurality of horizontal periods in said predetermined region.

In addition, the eighteenth aspect of the present invention is the display apparatus according to the fourteenth aspect of the present invention wherein said control instrument performs control so that said first chrominance signal and said second chrominance signal may be displayed in a pixel of said predetermined region in turn temporally.

Furthermore, the nineteenth aspect of the present invention is the display apparatus according to the fourteenth aspect of the present invention, wherein said control instrument performs control so that a chrominance signal which does not include said color component may be displayed without performing said color correction, and performs control so as to be displayed in turn spatially, where it is assumed that all the chrominance signals displayed in a pixel of said predetermined region include said predetermined color component.

Moreover, the twentieth aspect of the present invention is the display apparatus according to the fourteenth aspect of the present invention, wherein said predetermined color component is yellow, magenta, or cyan.

In addition, the twenty-first aspect of the present invention is the display apparatus according to the fourteenth aspect of the present invention, wherein said three primary colors are red, green, and blue.

Furthermore, the twenty-second aspect of the present invention is the display apparatus according to the fourteenth aspect of the present invention, wherein said chrominance signals are RGB signals.

Moreover, the twenty-third aspect of the present invention is the display apparatus according to the twenty-second aspect of the present invention, wherein, when said predetermined color component is yellow, said color correction instrument performs said first color correction by decreasing a value of a B signal of said chrominance signal and performs said second color correction by increasing a value of the B signal of said chrominance signal, when a yellow color component exists in said chrominance signals corresponding to said pixel.

In addition, the twenty-fourth aspect of the present invention is a display method using a display apparatus which makes one pixel displayable in four colors, that is, three primary colors and a white color, and inputs and displays chrominance signals corresponding to a mixing ratio of said four colors, comprising:

a color detection step of detecting whether a predetermined color component is included in each chrominance signal corresponding to each pixel in a predetermined region;

a color correction step of performing a first color correction of increasing the saturation of said chrominance signals and creating said first chrominance signal, and a second color correction of increasing a white color component of said chrominance signals and creating a second chrominance signal, a control step of performing said color correction of a chrominance signal, including said predetermined color component, and performing control so that said first chrominance signal and said second chrominance signal may be displayed spatially in turn in every predetermined plural pixel units, which are horizontally and/or vertically adjacent, in said predetermined region; and a display step of displaying said first chrominance signal, said second chrominance signal, or a chrominance signal which is not given said color correction, in said pixel on the basis of said control.

In addition, the twenty-fifth aspect of the present invention is a program for making a computer execute:

a color detection step of detecting whether a predetermined color component is included in each chrominance signal corresponding to each pixel in a predetermined region;

a color correction step of performing a first color correction of increasing the saturation of said chrominance signals and creating a first chrominance signal, and a second color correction of increasing a white color component of said chrominance signals and creating a second chrominance signal; and a control step of performing said color correction of a chrominance signal, including said predetermined color component, and performing control so that said first chrominance signal and said second chrominance signal may be displayed spatially in turn in every predetermined plural pixel units, which are horizontally and/or vertically adjacent, in said predetermined region, of the display method according to the twenty-fourth aspect of the present invention.

In addition, the twenty-sixth aspect of the present invention is a recording medium which records the program according to the twenty-fifth aspect of the present invention, and is the recording medium which can be processed by a computer.

Furthermore, the twenty-seventh aspect of the present invention is a display apparatus which makes one pixel displayable in four colors, that is, three primary colors and a white color, and inputs and displays chrominance signals corresponding to a mixing ratio of said four colors, comprising:

color detection instrument which detects whether a predetermined color component is included in each chrominance signal corresponding to each pixel in a predetermined region;

color correction instrument which performs a first color correction of increasing the saturation of said chrominance signals and creating a first chrominance signal, and a second color correction of increasing a white color component of said chrominance signals and creating a second chrominance signal;

judgment instrument which judges whether a plurality of chrominance signals displayed in a pixel of said predetermined region fulfills a predetermined condition;

control instrument which performs the color correction of chrominance signals including said predetermined color component by said color correction instrument when not fulfilling said predetermined condition; and display instrument which displays said first chrominance signal, said second chrominance signal, or a chrominance signal which is not given said color correction, in a pixel of said predetermined region on the basis of said control instrument.

In addition, the twenty-eighth aspect of the present invention is the display apparatus according to the twenty-seventh aspect of the present invention, wherein said predetermined condition is a condition that chrominance signals, including said predetermined color component, are not displayed in two or more adjoining pixels spatially.

Furthermore, the twenty-ninth aspect of the present invention is the display apparatus according to the twenty-seventh aspect of the present invention, wherein said predetermined condition is a condition that when a chrominance signal which does not include said color component is displayed without performing said color correction, and about the chrominance signals including said color component, said first chrominance signal and said second chrominance signal are displayed in turn spatially in a state that assumes that all the chrominance signals displayed in a pixel of said predetermined region include the predetermined color component and, either of an area where said first chrominance signal is displayed, and an area where said second chrominance signal is displayed is larger by 5% or more than the other.

Moreover, the thirtieth aspect of the present invention is the display apparatus according to the twenty-seventh aspect of the present invention, wherein said predetermined condition is a condition that, when a chrominance signal which does not include said color component is displayed without performing said color correction, and concerning a chrominance signals which include said color component, said first chrominance signal and said second chrominance signal are displayed in turn spatially in a state that assumes that all the chrominance signals displayed in a pixel of said predetermined region include the predetermined color component, either said first chrominance signal or said second chrominance signal is displayed except a chrominance signal which is not given said color correction.

In addition, the thirty-first aspect of the present invention is the display apparatus according to the twenty-eighth aspect of the present invention, wherein, when said predetermined condition is not fulfilled, said control instrument performs control so that said first chrominance signal and said second chrominance signal may be displayed in turn spatially in every pixel unit or in every plural pixel units in said predetermined region.

Furthermore, the thirty-second aspect of the present invention is the display apparatus according to the twenty-ninth or thirtieth aspect of the present invention, wherein, when said predetermined condition is not fulfilled, said control instrument performs control so that said first chrominance signal and said second chrominance signal may be displayed in turn spatially in every pixel unit in said predetermined region in a state that assumes that all the chrominance signals displayed in a pixel of said predetermined region include the predetermined color component.

Moreover, the thirty-third aspect of the present invention is the display apparatus according to the thirty-second aspect of the present invention, wherein, when said predetermined condition is fulfilled, said control instrument performs control so that concerning a chrominance signal which does not include said color component, said control instrument does not perform said color correction, and concerning the chrominance signals which include said color component, said first chrominance signal and said second chrominance signal may be displayed in turn spatially in every plural pixel units in said predetermined region in a state that assumes that all the chrominance signals displayed in a pixel of said predetermined region include the predetermined color component.

In addition, the thirty-fourth aspect of the present invention is the display apparatus according to the thirty-first aspect of the present invention, wherein said control instrument has switching signal generating instrument which generates such a switching signal that said first chrominance signal and said second chrominance signal may be displayed in turn in every pixel unit or in every plural pixel units, and wherein performing control so as to be displayed in turn spatially is selecting said first chrominance signal and said second chrominance signal in turn on the basis of said switching signal.

Furthermore, the thirty-fifth aspect of the present invention is the display apparatus according to the thirty-second aspect of the present invention, wherein the control instrument has switching signal generating instrument which generates such a switching signal that said first chrominance signal and said second chrominance signal may be displayed in turn in every pixel unit, and wherein performing control so as to be displayed in turn spatially is selecting said first chrominance signal and said second chrominance signal in turn on the basis of said switching signal, in a state that assumes that all the chrominance signals displayed in a pixel of said predetermined region include the predetermined color component.

Moreover, the thirty-sixth aspect of the present invention is the display apparatus according to the thirty-third aspect of the present invention, wherein said control instrument has:

first switching signal generating instrument which generates a first switching signal so that said first chrominance signal and said second chrominance signal may be displayed in turn in every pixel unit in a pixel of a predetermined region;

second switching signal generating instrument which generates a second switching signal so that said first chrominance signal and said second chrominance signal may be displayed in turn in every plural pixel units in a pixel of a predetermined region; and switching signal selection instrument which selects said first switching signal when said predetermined condition is not fulfilled, and selects said second switching signal when said predetermined condition is fulfilled, and wherein performing control so as to be displayed in turn spatially is selecting said first chrominance signal and said second chrominance signal in turn on the basis of said first switching signal or said second switching signal, in a state that assumes that all the chrominance signals displayed in a pixel of said predetermined region include the predetermined color component.

In addition, the thirty-seventh aspect of the present invention is the display apparatus according to the thirty-fourth or thirty-fifth aspect of the present invention, wherein said switching signal is a signal using a signal which determines the timing of said display instrument which displays in said pixel.

Furthermore, the thirty-eighth aspect of the present invention is the display apparatus according to the thirty-sixth aspect of the present invention, wherein said first switching signal and said second switching signal are signals using a signal which determines the timing of said display instrument which displays in said pixel.

Moreover, the thirty-ninth aspect of the present invention is the display apparatus according to the twenty-seventh aspect of the present invention, wherein said control instrument performs control so that said first chrominance signal and said second chrominance signal are displayed in a pixel of said predetermined region in turn temporally.

In addition, the fortieth aspect of the present invention is the display apparatus according to the twenty-seventh aspect of the present invention, wherein the color around said predetermined region is white.

Furthermore, the forty-first aspect of the present invention is the display apparatus according to the twenty-seventh aspect of the present invention, wherein said predetermined color component is yellow, magenta, or cyan.

Moreover, the forty-second aspect of the present invention is the display apparatus according to the twenty-seventh aspect of the present invention, wherein said three primary colors are red, green, and blue.

In addition, the forty-third aspect of the present invention is the display apparatus according to the twenty-seventh aspect of the present invention, wherein said chrominance signals are RGB signals.

Furthermore, the forty-fourth aspect of the present invention is the display apparatus according to the forty-third aspect of the present invention, wherein said predetermined color component is yellow; and wherein said color correction instrument performs said first color correction by decreasing a value of a B signal of said chrominance signals, and performs said second color correction by increasing a value of the B signal of said chrominance signals.

Moreover, the forty-fifth aspect of the present invention is a display method using a display apparatus which makes one pixel displayable in four colors, that is, three primary colors and a white color, and inputs and displays chrominance signals corresponding to a mixing ratio of said four colors, comprising:

a color detection step of detecting whether a predetermined color component is included in each chrominance signal corresponding to each pixel in a predetermined region;

a color correction step of performing a first color correction of increasing the saturation of said chrominance signals and creating a first chrominance signal, and a second color correction of increasing a white color component of said chrominance signals and creating a second chrominance signal;

a judgment step of judging whether a plurality of chrominance signals displayed in a pixel of said predetermined region fulfill a predetermined condition;

a control step of performing control so as to perform the color correction of chrominance signals including said predetermined color component when not fulfilling said predetermined condition; and a display step of displaying said first chrominance signal, said second chrominance signal, or a chrominance signal which is not given said color correction, in a pixel of said predetermined region on the basis of said control.

In addition, the forty-sixth aspect of the present invention is a program for making a computer execute:

the color detection step of detecting whether a predetermined color component is included in each chrominance signal corresponding to each pixel in said predetermined region;

the color correction step of performing the first color correction of increasing the saturation of said chrominance signals and creating a first chrominance signal, and the second color correction of increasing a white color component of said chrominance signals and creating a second chrominance signal;

the judgment step of judging whether a plurality of chrominance signals displayed in a pixel of said predetermined region fulfill a predetermined condition; and the control step of performing control so as to perform said color correction of chrominance signals including said predetermined color component when not fulfilling said predetermined condition, of the display method according to the forty-fifth aspect of the present invention.

In addition, the forty-seventh aspect of the present invention is a recording medium which records the program according to the forty-sixth aspect of the present invention, and is the recording medium which can be processed by a computer.

Furthermore, the forty-eighth aspect of the present invention is a display apparatus which makes one pixel displayable in four colors, that is, three primary colors and a white color, and inputs and displays chrominance signals corresponding to a mixing ratio of said four colors, comprising:

color detection instrument which detects whether a predetermined color component is included in each chrominance signal corresponding to each pixel in a predetermined region;

judgment instrument which judges whether a plurality of chrominance signals displayed in a pixel of said predetermined region fulfill a predetermined condition;

color correction instrument which performs the first color correction of increasing the saturation of said predetermined chrominance component of said chrominance signals and creating a first chrominance signal, and the second color correction of increasing a white color component of said chrominance signals and creating a second chrominance signal;

switching signal generating instrument which generates such a switching signal that said first chrominance signal and said second chrominance signal may be displayed in turn in every one or in plural pixel units, in a state that assumes that all the chrominance signals displayed on a pixel of said predetermined region include said predetermined color component;

first selection instrument which selects said first chrominance signal or said second chrominance signal in turn on the basis of said switching signal, in a state that assumes that all the chrominance signals displayed on a pixel of said predetermined region include the predetermined color component;

second selection instrument which selects said first chrominance signal or said second chrominance signal when said predetermined color component is included and said predetermined condition is not fulfilled, and otherwise selects a chrominance signal which is not given said color correction; and display instrument which displays said first chrominance signal, said second chrominance signal, or a chrominance signal not given said color correction, which is selected by said first selection instrument and said second selection instrument, in a pixel of said predetermined region.

In addition, the forty-ninth aspect of the present invention is a display apparatus which makes one pixel displayable in four colors, that is, three primary colors and a white color, and inputs and displays chrominance signals corresponding to a mixing ratio of said four colors, comprising:

color detection instrument which detects whether a predetermined color component is included in each chrominance signal corresponding to each pixel in a predetermined region;

judgment instrument which judges whether a plurality of chrominance signals displayed in a pixel of said predetermined region fulfill a predetermined condition;

color correction instrument which performs a first color correction of increasing the saturation of said predetermined chrominance component of said chrominance signals and creating a first chrominance signal, and a second color correction of increasing a white color component of said chrominance signals and creating a second chrominance signal;

first switching signal generating instrument which generates a first switching signal so that said first chrominance signal and said second chrominance signal may be displayed in turn in every pixel unit, in a state that assumes that all the chrominance signals displayed on a pixel of said predetermined region include said predetermined color component;

second switching signal generating instrument which generates a second switching signal so that said first chrominance signal and said second chrominance signal may be displayed in turn in every plural pixel units, in a state that assumes that all the chrominance signals displayed on a pixel of said predetermined region include said predetermined color component;

switching signal selection instrument which selects said first switching signal when said predetermined condition is not fulfilled, and selects said second switching signal when said predetermined condition is fulfilled;

first selection instrument which selects said first chrominance signal or said second chrominance signal on the basis of said first switching signal or said second switching signal which is selected by said switching signal selection instrument;

second selection instrument which selects said first chrominance signal or said second chrominance signal, which is selected by said first selection instrument, when said predetermined color component is included, and selects a chrominance signal, which is not given said color correction, when said predetermined color component is not included; and display instrument which displays said first chrominance signal, said second chrominance signal, or a chrominance signal not given said color correction, which is selected by said first selection instrument and said second selection instrument, in a pixel of the predetermined region.

The present invention can provide the display apparatus, display method, program, and recording medium capable of decreasing the sense of incongruity of the visual aspect of color.

BRIEF DESCRIPTION OF THE DRAWINGS

Figure 29:
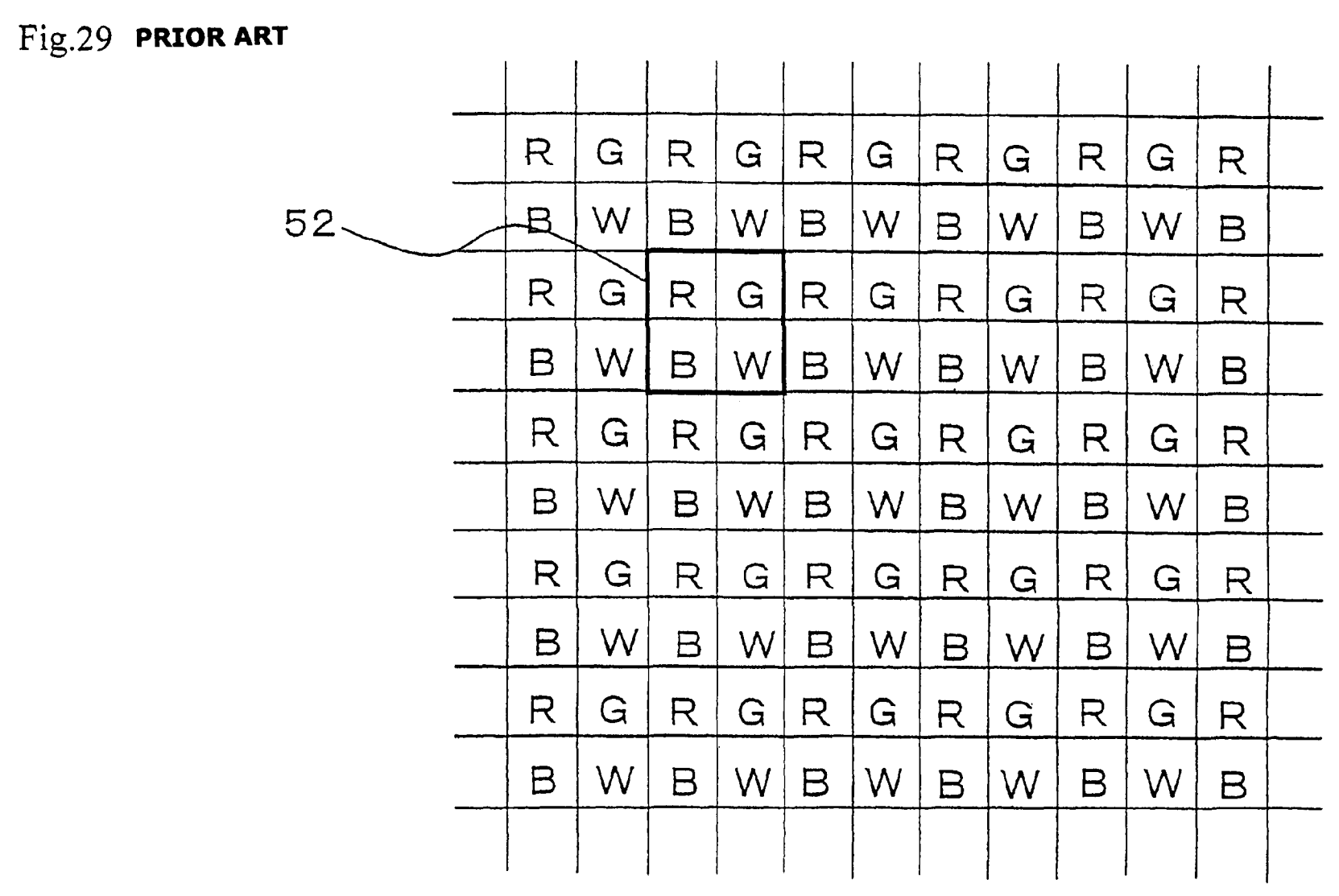

FIG. 29 is a drawing showing display screen structure in the case that a conventional display apparatus is a liquid crystal display apparatus.

DESCRIPTION OF SYMBOLS

Figure 1:
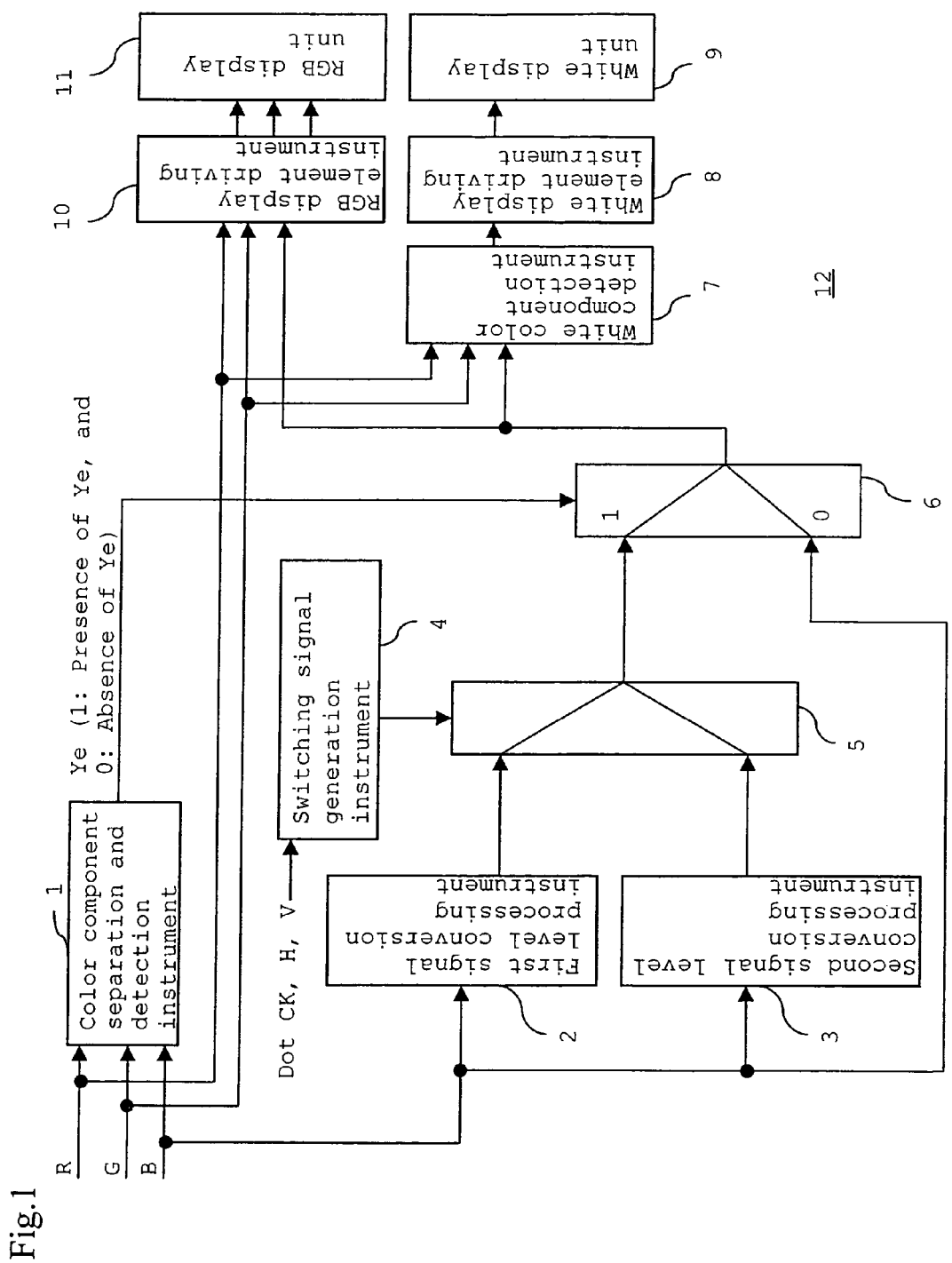
FIG. 1 is a block diagram showing the structure of a display apparatus in a first embodiment of the present invention.

1 Color component separation and detection instrument
2 First signal level conversion processing instrument
3 Second signal level conversion processing instrument
4 Switching signal generation instrument
5 First selection instrument
6 Second selection instrument
7 White color component detection instrument
8 White display element driving instrument
9 White display unit
10 RGB display element driving instrument
11 RGB display unit
12 Yellow pixel
16 White pixel
20 Frequency divider
21 Frequency divider
22 ½ frequency divider
27 Pseudo-random number generator
28 Frequency divider
29 ½ frequency divider
34 Color component separation and detection instrument
35 R signal level detection instrument
36 G signal level detection instrument
37 B signal level detection instrument
38 First selection instrument
39 Second selection instrument
40 Third selection instrument
53 Calculation instrument
101 Color component separation and detection instrument
102 First signal level conversion processing instrument
103 Second signal level conversion processing instrument
104 Switching signal generation instrument
105 First selection instrument
106 Second selection instrument
107 White color component detection instrument
108 White display element driving instrument
109 White display unit
110 RGB display element driving instrument
111 RGB display unit
112 Display apparatus
113 Pastel yellow pixel
114 White pixel (background)
115 Yellow pixel
116 White pixel 117 Dot clock signal
118 Horizontal synchronizing signal
119 Vertical synchronizing signal
120 Frequency divider
121 Frequency divider
122 ½ frequency divider
201 Color component separation and detection instrument
202 First signal level conversion processing instrument
203 Second signal level conversion processing instrument
204 First switching signal generation instrument
205 First selection instrument
206 Second selection instrument
207 White color component detection instrument
208 White display element driving instrument
209 White display unit
210 RGB display element driving instrument
211 RGB display unit
213 Pattern detection instrument
214 Arithmetic unit

BEST MODE FOR CARRYING OUT THE INVENTION

Hereafter, embodiments of the present invention will be described with reference to drawings.

Embodiment 1

In a first embodiment, a display apparatus will be explained which, even if a bright yellow (yellow with low saturation), that is, pastel yellow image portion being surrounded by white or being adjacent to white, can decrease the sense of incongruity that visible color appears differently such as the pastel yellow image portion seeming greenish and the like.

A display apparatus 12 of the first embodiment is shown in FIG. 1.

The display apparatus 12 is constituted of color component separation and detection instrument 1, first signal level conversion processing instrument 2, second signal level conversion processing instrument 3, switching signal generation instrument 4, first selection instrument 5, second selection instrument 6, white color component detection instrument 7, white display element driving instrument 8, white display unit 9, RGB display element driving instrument 10, and RGB display units 11.

The color component separation and detection instrument 1 is the instrument which performs the separation and detection of a yellow color component, when the yellow color component is included in RGB signals inputted.

The first signal level conversion processing instrument 2 is the instrument which inputs a B signal among the RGB signals inputted, and performs the conversion of lowering a signal level of a blue color, which is a complementary color of a yellow color component, to the B signal.

The second signal level conversion processing instrument 3 is the instrument which inputs a B signal among the RGB signals inputted, and performs the conversion of increasing a signal level of a blue color, which is a complementary color of a yellow color component, to the B signal.

The switching signal generation instrument 4 is the instrument which outputs a signal for first selection instrument 5 selecting either the B signal outputted from the first signal level conversion processing instrument 2 or the B signal outputted from the second signal level conversion processing instrument 3.

The first selection instrument 5 is the instrument which selects and outputs either the B signal outputted from the first signal level conversion processing instrument 2 or the B signal outputted from the second signal level conversion processing instrument 3 on the basis of the signal outputted from the switching signal generation instrument 4.

The second selection instrument 6 is the instrument which selects and outputs either of the B signal outputted from the first selection instrument 5, and the B signal among the RGB signals inputted into the display apparatus 12 on the basis of the detection result of the yellow color component of the color component separation and detection instrument 1.

In addition, since the white color component detection instrument 7, white display element driving instrument 8, white display unit 9, RGB display element driving instrument 10, and RGB display unit 11 are the same as those of what are explained in the background art, explanation is omitted.

Furthermore, the first signal level conversion processing instrument 2 and second signal level conversion processing instrument 3 of this embodiment are an example of the color correction instrument of the present invention, the switching signal generation instrument 4 and first selection instrument 5 of this embodiment are an example of the selection instrument of the present invention, the switching signal generation instrument 4 and first selection instrument 5 of this embodiment are an example of height generation instrument of the present invention, the white color component detection instrument 7, white display element driving instrument 8, white display unit 9, RGB display element driving instrument 10, and RGB display unit 11 of this embodiment are an example of the display instrument of the present invention, R (red), G (green), and B (blue) colors of this embodiment are an example of three primary colors of the present invention, the RGB signals of this embodiment are an example of the chrominance signals of the present invention, and the yellow color of this embodiment is an example of the predetermined color of the present invention.

Next, the operation of this embodiment like this will be explained.

The RGB signals inputted from an apparatus, which displays an image on the display apparatus 12, such as a personal computer, DVD equipment, or a TV receiver are inputted into the color component separation and detection instrument 1. In addition, the B signal among the RGB signals inputted is inputted into the first signal level conversion processing instrument 2, second signal level conversion processing instrument 3, and first selection instrument 5. In addition, the R signal and G signal among the RGB signals inputted are inputted into the white color component detection instrument 7 and RGB display element driving instrument 10.

The color component separation and detection instrument 1 detects whether the RGB signals which are inputted include the yellow color component.

Figure 5:
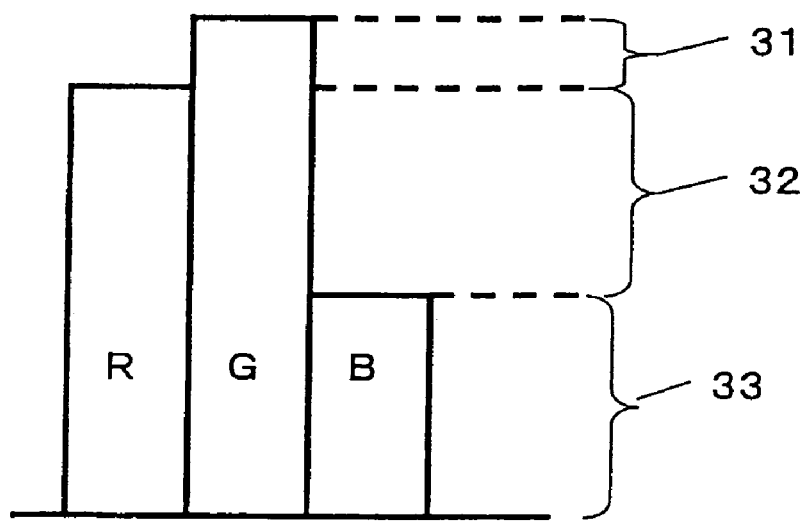
FIG. 5 is a drawing showing an example of RGB signals in the first, third, and fifth embodiments of the present invention.

An example of the RGB signals is shown in FIG. 5. The R signal which expresses red, the G signal which expresses green, and the B signal which expresses blue are signals which can take 256 kinds of values from 0 to 255, respectively, and the larger this value is, the brighter color is expressed. The green color component 31, yellow color component 32, and white color component 33 are included in the RGB signals of FIG. 5.

It is possible to perform the detection of the yellow color component from the RGB signals, by detecting the case that both of a value of the R signal and a value of the G signal are larger than a value of the B signal. Thus, the yellow color component is included in the RGB signals when both of the value of the R signal and the value of the G signal are larger than the value of the B signal.

The color component separation and detection instrument 1 outputs 1 when the yellow color component is included in the RGB signals, and it outputs 0 when the yellow color component is not included in the RGB signals. Then, the output of the color component separation and detection instrument 1 is inputted into the second selection instrument 6.

On the other hand, the first signal level conversion processing instrument 2 inputs the B signal among the RGB signals inputted into the display apparatus 12, and performs the conversion of lowering a signal level of a blue color which is a complementary color of the yellow color component. In other words, the first signal level conversion processing instrument 2 performs the conversion of increasing saturation when the yellow color component is included in the RGB signals inputted into the display apparatus 12.

FIG. 2(*a*) shows the conversion processing which the first signal level conversion processing instrument 2 performs to the B signal. Thus, the horizontal axis of FIG. 2(*a*) shows the value of the B signal among the RGB signals inputted into the first signal level conversion processing instrument 2, and the vertical axis shows the value of the B signal after the first signal level conversion processing instrument 2 performs the conversion processing. The first signal level conversion processing instrument 2 has stored beforehand a conversion table for performing the conversion processing shown in FIG. 2(*a*), and performs the conversion processing of FIG. 2(*a*) using the conversion table. In addition, although it is explained that the first signal level conversion processing instrument 2 performs the conversion processing shown in FIG. 2(*a*) using the conversion table, it is not limited to this. For example, the conversion processing of FIG. 2(*a*) may be performed using a method other than the conversion table, such as performing the conversion processing shown in FIG. 2(*a*) by operation processing by hardware or software.

Apparently from FIG. 2(*a*), when the value of the B signal inputted into the first signal level conversion processing instrument 2 is smaller than a predetermined value, the value of the B signal outputted from the first signal level conversion processing instrument 2 is set at 0. Then, when the value of the B signal inputted into the first signal level conversion processing instrument 2 is larger than the predetermined value, the value of the B signal outputted from the first signal level conversion processing instrument 2 is set at a value larger than 0, but it is set at a value smaller than the value of B signal inputted into the first signal level conversion processing instrument 2. In this way, since the first signal level conversion processing instrument 2 converts the value of the B signal inputted as shown in FIG. 2(*a*), the value of the B signal in the RGB signals outputted from the first signal level conversion processing instrument 2 becomes small in comparison with the RGB signals at the time of an input. Thus, when the RGB signals inputted into the display apparatus 12 includes the yellow color component 32 as shown in FIG. 5, RGB signals are newly constituted from the B signal outputted from the first signal level conversion processing instrument 2, and the R signal and G signal which are inputted into the display apparatus 12, and then, the constituted RGB signals become signals where saturation increases in comparison with the RGB signals inputted into the display apparatus 12.

In addition, the second signal level conversion processing instrument 3 performs the conversion of increasing a signal level of a blue color, which is a complementary color of the yellow color component, to the B signal among the RGB signals inputted into the display apparatus 12. In other words, the second signal level conversion processing instrument 3 performs the conversion of increasing a white color component when the yellow color component is included in the RGB signals inputted into the display apparatus 12.

FIG. 2(*b*) shows the conversion processing which the second signal level conversion processing instrument 3 performs to the B signal. Thus, the horizontal axis of FIG. 2(*b*) shows the value of the B signal among the RGB signals inputted into the second signal level conversion processing instrument 3, and the vertical axis shows the value of the B signal after the third signal level conversion processing instrument 3 performs the conversion processing. The second signal level conversion processing instrument 3 has stored beforehand a conversion table for performing the conversion processing shown in FIG. 2(*b*), and performs the conversion processing of FIG. 2(*b*) using the conversion table. In addition, although it is explained that the second signal level conversion processing instrument 3 performs the conversion processing shown in FIG. 2(*b*) using the conversion table, it is not limited to this. For example, the conversion processing of FIG. 2(*b*) may be performed using a method other than the conversion table, such as performing the conversion processing shown in FIG. 2(*b*) by operation processing by hardware or software.

Apparently from FIG. 2(*b*), the value of the B signal among the RGB signals outputted from the second signal level conversion processing instrument 3 becomes a value larger than the value of the B signal among the RGB signals inputted into the second signal level conversion processing instrument 3. In this way, since the second signal level conversion processing instrument 3 converts the value of the B signal among the RGB signals inputted as shown in FIG. 2(*b*), the value of the B signal outputted from the second signal level conversion processing instrument 3 becomes large in comparison with the RGB signals at the time of an input. Thus, when the RGB signals inputted into the display apparatus 12 include the yellow color component 32, when RGB signals are newly constituted by synthesizing the B signal, outputted from the second signal level conversion processing instrument 3, with the R signal and G signal inputted into the display apparatus 12, the constituted RGB signals become signals where the white color component increases in comparison with the RGB signals inputted into the display apparatus 12.

The switching signal generation instrument 4 generates a switching signal using a dot clock, a horizontal synchronizing signal, and a vertical synchronizing signal for determining the timing with which the RGB display element driving instrument 10 and the white display element driving instrument 8 of the display apparatus 12 drives the RGB display unit 11 and white display unit 9, and outputs it to the first selection instrument 5. This switching signal is a signal of taking a value of either 1 or 0. In addition, the operation of the switching signal generation instrument 4 will be described later.

The first selection instrument 5 selects the B signal outputted from the first signal level conversion processing instrument 2 when the value of the switching signal outputted from the switching signal generation instrument 4 is 1, and outputs it to the second selection instrument 6, and selects the B signal outputted from the second signal level conversion processing instrument 3 when the value of the switching signal is 0, and outputs it to the second selection instrument 6.

When the value of the signal which the color component separation and detection instrument 1 outputs is 1, that is, when the yellow color component is included, the second selection instrument 6 selects the B signal outputted from the first selection instrument 5, and outputs it to the RGB display element driving instrument 10 and white color component detection instrument 7. In addition, when the value of the signal which the color component separation and detection instrument 1 outputs is 0, that is, when the yellow color component is not included, the second selection instrument 6 outputs the B signal among the RGB signals, inputted into the display apparatus 12, without conversion processing to the RGB display element driving instrument 10 and white color component detection instrument 7.

Thus, the R signal and G signal which are inputted into the display apparatus 12, and the B signal outputted from the second selection instrument 6 are inputted into the RGB display element driving instrument 10 and white color component detection instrument 7. Then, the white color component detection instrument 7 and RGB display element driving instrument 10 process these R signals, G signal, and B signal as new RGB signals.

In addition, the operation of the white color component detection instrument 7, white display element driving instrument 8, white display unit 9, RGB display element driving instrument 10, and RGB display unit 11 is the same as that of what are explained in the background art.

In this way, an image is displayed on a display screen.

By the way, the switching signal which the switching signal generation instrument 4 outputs, for example, such a signal that the value of the switching signal becomes 0 in a pixel adjacent to a certain pixel in a horizontal direction when the value of the switching signal is 1 to the certain pixel, and, the value of the switching signal becomes 1 in a further adjacent pixel horizontally. Thus, when attention is paid to a horizontal pixel row, the switching signal takes 0 and 1 in turn. Similarly, when attention is paid to a vertical pixel column, the switching signal takes 0 and 1 in turn.

Figure 3:
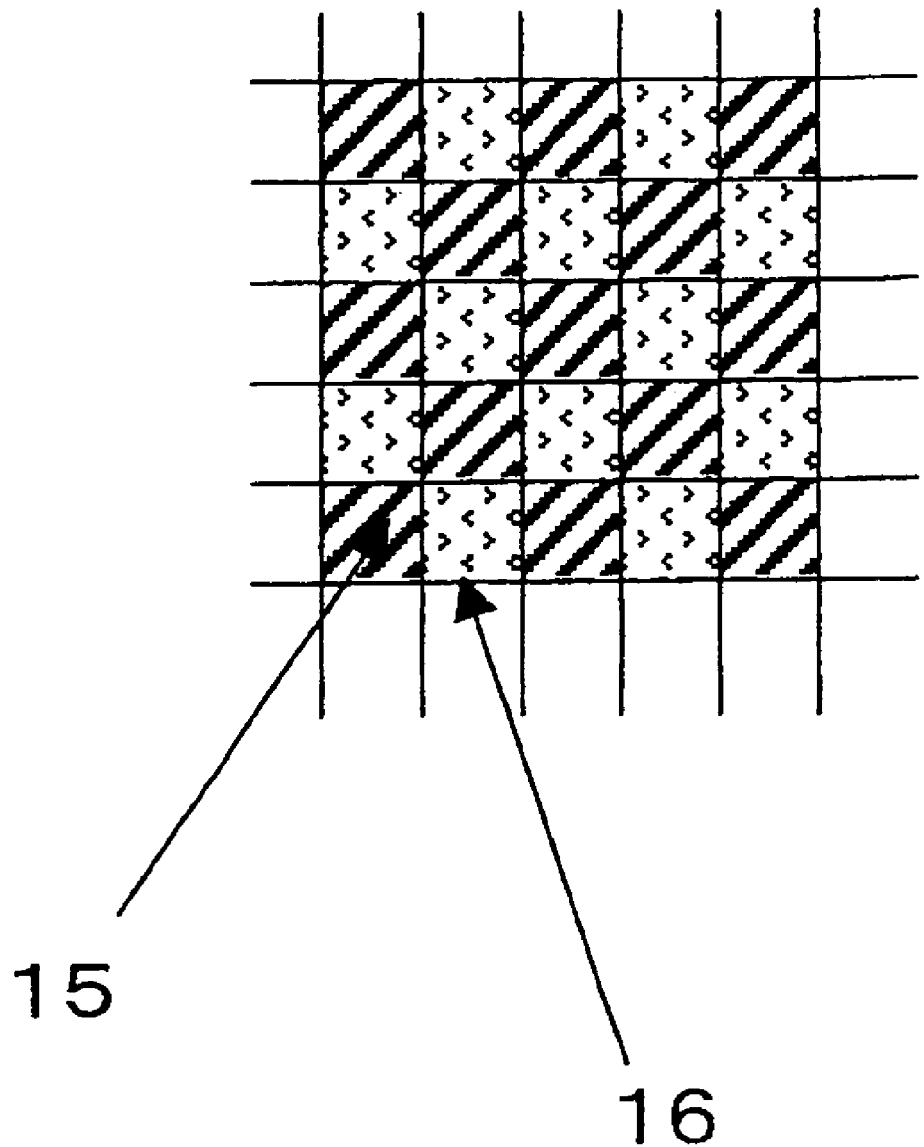
FIG. 3 is a drawing showing a display example of a region of a display screen, where a yellow color component is included, in the first embodiment of the present invention.

Hence, yellow pixels 15 and white pixels 16 in FIG. 3 will be alternately displayed in a region of the display screen where the yellow color component is included in the inputted RGB signals, that is, a region of the display screen which a plurality of pixels having a yellow color component in the inputted RGB signals exist adjacently. Thus, when a plurality of pixels which have a yellow color component in the inputted RGB signals do not exist adjacently, that is, when only one pixel having a yellow color component exists by itself, such an alternating display cannot be performed. Hence, such an alternating display is performed to a region of the display screen where a plurality of pixels having a yellow color component in the inputted RGB signals exists adjacently. Here, the yellow pixels 15 are those into which the RGB signals outputted from the first signal level conversion processing instrument 2 are displayed, and are the RGB signals which are given conversion processing so that saturation may increase. In addition, the white pixels 16 are those into which the RGB signals outputted from the second signal level conversion processing instrument 3 are displayed, and are the RGB signals which are given conversion processing so that saturation may be lowered.

In addition, the region of the display screen where the yellow color component is included in the inputted RGB signals in this embodiment is an example of the region where a plurality of pixels having a component with the above-mentioned predetermined color in the present invention exists adjacently.

Here, in the region of the display screen where the yellow color component is included in the inputted RGB signals, let the RGB signals which is constituted of the B signal where a value of the output of the first signal level conversion processing instrument 2 is decreased, and the R signal and G signal which are inputted into the display apparatus 12 be first RGB signals, and let the RGB signals which is constituted of the B signal where a value of the output of the second signal level conversion processing instrument 3 is increased, and the R signal and G signal which are inputted into the display apparatus 12 be second RGB signals. Then, the first RGB signals are signals where saturation is increased, and the second RGB signals are RGB signals whose white color component is increased. In such a region, the first RGB signals and second RGB signals will be displayed in a checkered pattern, as shown in the yellow pixels 15 and white pixels 16, respectively in FIG. 3. In this way, the display apparatus 12 gives the height difference in saturation to the region of the display screen by performing display at every pixel of the region in the region of the display screen, where the yellow color component is included in the inputted RGB signals, using either of the RGB signals where saturation is increased, and the RGB signals where the white color component is increased.

Hence, for example, bright yellow (yellow with low saturation), that is, pastel yellow will be displayed with the yellow pixels 15 whose saturation is increased more, and the white pixels 16 where the white color component is increased more. Hence, it will be felt to human eyes by the integration effect of human eyes that bright yellow (yellow with low saturation), that is, pastel yellow is displayed. Further, since it is possible to increase the brightness of an image portion by displaying bright yellow (yellow with low saturation), that is, pastel yellow by the alternating display with the yellow whose saturation is increased more, and the yellow where the white color component is increased more, even if the image portion being surrounded by white or being adjacent to white, it is possible to decrease the sense of incongruity that visible color appears differently, e.g., the image portion seems greenish.

In addition, although bright yellow (yellow with low saturation), that is, pastel yellow is expressed by the alternating display of the yellow pixels 15 and the white pixels 16 every pixel for a region of the display screen where the yellow color component is included in the inputted RGB signals in FIG. 3, an equivalent effect can be obtained also by temporally alternating display. Thus, when a certain pixel is displayed with the B signal outputted from the first signal level conversion processing instrument 2, and the R signal and G signal which are inputted into the display apparatus 12, it is possible to display it with the B signal outputted from the second signal level conversion processing instrument 3, and the R signal and G signal which are inputted into the display apparatus 12 when the next field or the next frame is displayed. Thus, an equivalent effect can be obtained also by switching and displaying the B signal outputted from the first signal processing instrument 2, and the B signal outputted from the second signal processing instrument 3, at every field or every frame. In this way, an effect equivalent to this embodiment can be obtained also by switching and displaying either of the RGB signals where saturation is increased, and the RGB signals where the white color component is increased, at every field or every frame temporally.

Nevertheless, "when the next field is displayed" is a case of interlace, and shall mean the case of displaying a second field from the present field, when one frame is displayed by an odd number field and an even number field. In addition, "switching and displaying the B signal outputted from the first signal processing instrument 2, and the B signal outputted from the second signal processing instrument 3, at every field" is a case of an interlace mode, and means "switching and displaying the B signal outputted from the first signal processing instrument 2, and the B signal outputted from the second signal processing instrument 3, at every 2 fields, when one frame is displayed with an odd number field and an even number field". Hereafter similarly, in the first embodiment and second embodiment, "switching display at every field" is a case of the interlace mode, and means "switching display at every 2 fields when one frame is displayed with an odd number field and an even number field".

Now, as mentioned above, the switching signal generation instrument 4 will be explained.

FIG. 4(*a*) shows the structure of the switching signal generation instrument 4. The switching signal generation instrument 4 is constituted of a frequency divider 20, a frequency divider 21, a ½-frequency divider 22, and calculation instrument 53.

The frequency divider 20 is the instrument which inputs a dot clock signal 17 for the white display element driving instrument 8 and RGB display element driving instrument 10 to determine the timing of display at every pixel, performing frequency dividing, and outputting a pixel alternating signal 23. The frequency divider 21 is the instrument which inputs a horizontal synchronizing signal 18 for the white display element driving instrument 8 and RGB display element driving instrument 10 to determine the timing of display every horizontal period, performs frequency dividing, and outputs a line alternating signal 24. The ½ frequency divider 22 is the instrument which inputs a vertical synchronizing signal 19 for the white display element driving instrument 8 and RGB display element driving instrument 10 to determine the timing of display in every frame or field, performs frequency dividing, and outputs a field alternating signal 25. The calculation instrument 53 is the instrument which obtains the exclusive OR of the pixel alternating signal 23, line alternating signal 24, and field alternating signal 25, and outputs the obtained exclusive OR as a switching signal 26.

Thus, the dot clock signal 17 is inputted into the frequency divider 20, the frequency divider 20 performs the frequency dividing of the dot clock signal 17, and outputs the pixel alternating signal 23.

In addition, the horizontal synchronizing signal 18 is inputted into the frequency divider 20 and frequency divider 21. The frequency divider 20 is reset in the initial state in the timing when the horizontal synchronizing signal 18 is inputted. In addition, the frequency divider 21 performs the frequency dividing of the horizontal synchronizing signal 18, and outputs the line alternating signal 24.

Furthermore, the vertical synchronizing signal 19 is inputted into the frequency divider 21 and ½ frequency divider 22. The frequency divider 21 is reset in the initial state when the vertical synchronizing signal 19 is inputted. In addition, the ½ frequency divider 22 performs the ½ frequency dividing of the vertical synchronizing signal 19, and outputs the field alternating signal 25.

The calculation instrument 53 inputs the pixel alternating signal 23, line alternating signal 24, and field alternating signal 25, obtains the exclusive OR of them, and outputs it as the switching signal 26.

When the frequency divider 20 and the frequency divider 21 perform the ½ frequency dividing of the dot clock signal 17 and horizontal synchronizing signal 18, respectively, the switching signal 26 becomes what expresses a checkered pattern.

By using the switching signal generation instrument 4 of FIG. 4(*a*), a region, where a yellow color component is included, in the display screen will be displayed with the B signal outputted from the first signal level conversion instrument 2, and the B signal outputted from the second signal level conversion processing instrument 3. Thus, by using the switching signal generation instrument 4 of FIG. 4(*a*), the region, where the yellow color component is included, in the display screen will be displayed with the B signal outputted from the first signal level conversion instrument 2 and the B signal outputted from the second signal level conversion processing instrument 3 being switched every pixel. In addition, when attention is paid to a specific pixel, when the yellow color component is included in the display screen, the B signal outputted from the first signal level conversion processing instrument 2 and the B signal outputted from the second signal level conversion processing instrument 3 will be switched and displayed every field.

In addition, FIG. 4(*b*) shows another structure of the switching signal generation instrument 4. The switching signal generation instrument 4 of FIG. 4(*b*) is constituted of a pseudo-random number generator 27, a frequency divider 28, a ½ frequency divider 29, and calculation instrument 53.

The pseudo-random number generator 27 is the instrument which inputs the dot clock signal 17 for the white display element driving instrument 8 and RGB display element driving instrument 10 to determine the timing of display every pixel, generates a pseudo-random number using the inputted dot clock signal 27, and outputs it as the pixel alternating signal 23. The frequency divider 28 is the instrument which inputs the horizontal synchronizing signal 18 for the white display element driving instrument 8 and RGB display element driving instrument 10 to determine the timing of the display every horizontal period, performs frequency dividing, and outputs the line alternating signal 24. The ½ frequency divider 22 is the instrument which inputs the vertical synchronizing signal 19 for the white display element driving instrument 8 and RGB display element driving instrument 10 to determine the timing of display in every frame or field, performs frequency dividing, and outputs a field alternating signal 25. The calculation instrument 53 is the instrument which obtains the exclusive OR of the pixel alternating signal 23, line alternating signal 24, and field alternating signal 25, and outputs the obtained exclusive OR as a switching signal 26.

Thus, the dot clock signal 17 is inputted into the pseudo-random number generator 27, and the pseudo-random number generator 27 generates a pseudo-random number using the inputted dot clock signal 17, and outputs the generated pseudo-random number as a pixel alternating signal 23.

In addition, the horizontal synchronizing signal 18 is inputted into the pseudo-random number generator 27 and frequency divider 28. The pseudo-random number generator 27 is reset in the initial state at the timing when the horizontal synchronizing signal 18 is inputted. In addition, the frequency divider 28 performs the frequency dividing of the horizontal synchronizing signal 18, and outputs the line alternating signal 24.

Furthermore, the vertical synchronizing signal 19 is inputted into the frequency divider 28 and the ½ frequency divider 229. The frequency divider 28 is reset in the initial state when the vertical synchronizing signal 19 is inputted. In addition, the ½ frequency divider 29 performs the ½ frequency dividing of the vertical synchronizing signal 19, and outputs the field alternating signal 25.

The calculation instrument 53 inputs the pixel alternating signal 23, line alternating signal 24, and field alternating signal 25, obtains the exclusive OR of them, and outputs it as the switching signal 26.

By using the switching signal generation instrument 4 of FIG. 4(*b*), a region, where a yellow color component is included, in the display screen will be displayed in a random pattern with the B signal outputted from the first signal level conversion instrument 2, and the B signal outputted from the second signal level conversion processing instrument 3. In addition, when attention is paid to a specific pixel, when the yellow color component is included in the pixel, the B signal outputted from the first signal level conversion processing instrument 2 and the B signal outputted from the second signal level conversion processing instrument 3 is switched and displayed every field. The use of the switching signal generation instrument 4 of FIG. 4(*b*) can obtain an effect equivalent to that obtained by using the switching signal generation instrument 4 of FIG. 4(*a*).

In addition, although it is explained in this embodiment that RGB signals are inputted into the display apparatus 12, it is not limited to this, but signals which express colors except RGB signals may be inputted.

Furthermore, although the display apparatus 41 performs the processing, which decreases the sense of incongruity of yellow appearance, in this embodiment, it is also possible to perform the processing which decreases the sense of incongruity of magenta or cyan.

Moreover, although the conversion which the first signal level conversion processing instrument 2 gives to a blue signal is linear conversion at a predetermined intensity level or higher as shown in FIG. 2(*a*) in this embodiment, nonlinear conversion is acceptable. In short, the first signal level conversion processing instrument 2 has only to convert the B signal inputted into the first signal level conversion processing instrument 2 so as to be a small value in comparison with the B signal at the time of an input.

Furthermore, in this embodiment, although the conversion which the second signal level conversion processing instrument 3 gives to the blue signal is linear conversion up to the predetermined intensity level, it may be nonlinear conversion. In short, the second signal level conversion processing instrument 3 has only to convert the B signal inputted into the first signal level conversion processing instrument 2 so as to be a large value in comparison with the B signal at the time of the input.

Moreover, in this embodiment, although it is explained that the pseudo-random number generator 27 is reset in the initial state at the timing when the horizontal synchronizing signal 18 is inputted, it is not limited to this. The pseudo-random number generator 27 may be not reset in the initial state at the timing when the horizontal synchronizing signal 18 is inputted.

Embodiment 2

Next, a second embodiment will be explained.

In the first embodiment, the display apparatus is explained which, even if a bright yellow (yellow with low saturation), that is, pastel yellow image portion being surrounded by white or being adjacent to white, can decrease the sense of incongruity that visible color appears differently such as the pastel yellow image portion seeming greenish and the like. In the second embodiment, the display apparatus will be explained which, even if an image portion which is bright yellow (yellow with low saturation), that is, pastel yellow, bright magenta (magenta with low saturation), that is, pastel magenta, and bright cyan (cyan with low saturation), that is, pastel cyan being surrounded by white or being adjacent to white, can decrease the sense of incongruity that visible color appears differently.

Figure 6:
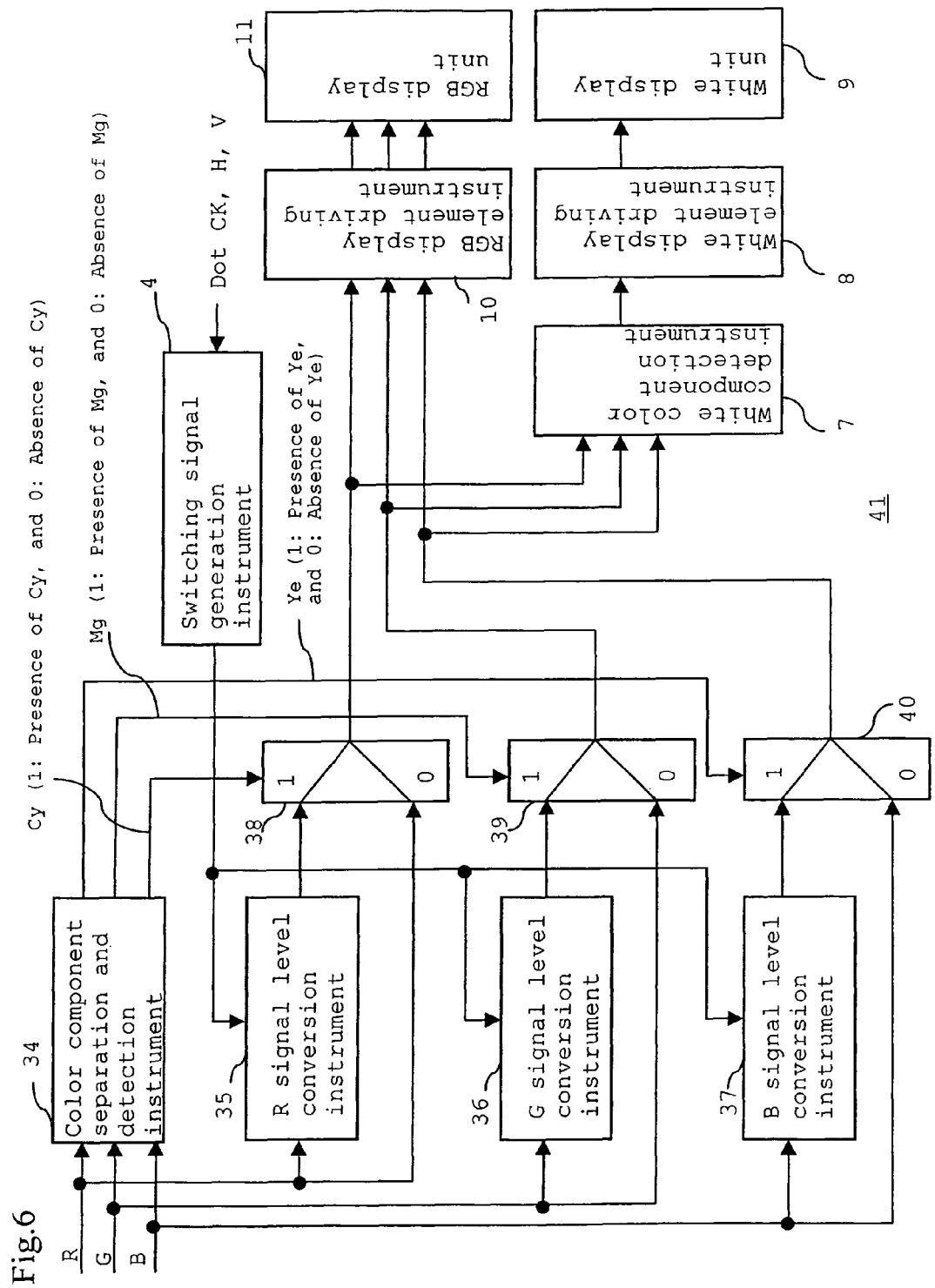
FIG. 6 is a block diagram showing the structure of a display apparatus in a second embodiment of the present invention.

The structure of a display apparatus 41 of the second embodiment is shown in FIG. 6.

The display apparatus 41 is constituted of color component separation and detection instrument 34, the switching signal generation instrument 4, R signal level conversion processing instrument 35, G signal level conversion processing instrument 36, B signal level conversion processing instrument 37, first selection instrument 38, second selection instrument 39, third selection instrument 40, the white color component detection instrument 7, the white display element driving instrument 8, the white display unit 9, the RGB display element driving instrument 10, and the RGB display units 11.

The color component separation and detection instrument 34 is the instrument which outputs a yellow color component detection signal showing whether a yellow color component is included in the RGB signals inputted, outputs a magenta color component detection signal showing whether a magenta component is included in the RGB signals inputted, and outputs a cyan color component detection signal showing whether a cyan component is included in the RGB signals inputted.

The switching signal generation instrument 4 is equivalent to what is explained in the first embodiment.

The R signal level conversion instrument 35 is the instrument which performs the first color correction of lowering a signal level of a red color, which is a complementary color of a cyan color component, to an R signal among the RGB signals inputted, and the second color correction of increasing a red signal level, and outputs the R signal which is given color correction by either color correction of the first color correction and second color correction on the basis of the switching signal outputted from the switching signal generation instrument 4.

The G signal level conversion instrument 36 is the instrument which performs the first color correction of lowering a signal level of a green color, which is a complementary color of a magenta color component, to an G signal among the RGB signals inputted, and the second color correction of increasing a green signal level, and outputs the G signal which is given color correction by either color correction of the first color correction and second color correction on the basis of the switching signal outputted from the switching signal generation instrument 4.

The B signal level conversion instrument 37 is the instrument which performs the first color correction of lowering a signal level of a blue color, which is a complementary color of a yellow color component, to a B signal among the RGB signals inputted, and the second color correction of increasing a blue signal level, and outputs the B signal which is given color correction by either color correction of the first color correction and second color correction on the basis of the switching signal outputted from the switching signal generation instrument 4.

The B signal level conversion instrument 37 is equivalent to the first signal level conversion processing instrument 2, second signal level conversion processing instrument 3, and first selection instrument 5 of the display apparatus 12 of the first embodiment.

In addition, the R signal level conversion instrument 35 is equivalent to the case that, in the first signal level conversion processing instrument 2, second signal level conversion processing instrument 3, and first selection instrument 5 of the display apparatus 12 of the first embodiment, color correction equivalent to the color correction which the first signal level conversion processing instrument 2 and second signal level conversion processing instrument 3 have given to a blue color is given to a red color using a conversion table optimized to a red color.

Furthermore, the G signal level conversion instrument 36 is equivalent to the case that, in the first signal level conversion processing instrument 2, second signal level conversion processing instrument 3, and first selection instrument 5 of the display apparatus 12 of the first embodiment, color correction equivalent to the color correction which the first signal level conversion processing instrument 2 and second signal level conversion processing instrument 3 have given to a blue color is given to a green color using a conversion table optimized to a green color.

The first selection instrument 38 is the instrument which selects and outputs either of the R signal outputted from the R signal level conversion instrument 35, and the R signal among the RGB signals inputted into the display apparatus 41 on the basis of a cyan component detection signal, that is, the detection result of the cyan component of the color component separation and detection instrument 34.

The second selection instrument 39 is the instrument which selects and outputs either of the G signal outputted from the G signal level conversion instrument 36, and the G signal among the RGB signals inputted into the display apparatus 41 on the basis of a magenta component detection signal, that is, the detection result of the magenta component of the color component separation and detection instrument 34.

The third selection instrument 40 is the instrument which selects and outputs either of the B signal outputted from the B signal level conversion instrument 35, and the B signal among the RGB signals inputted into the display apparatus 41 on the basis of a yellow color component detection signal, that is, the detection result of the yellow color component of the color component separation and detection instrument 34.

In addition, since the white color component detection instrument 7, white display element driving instrument 8, white display unit 9, RGB element driving instrument 10, and RGB display unit 11 are the same as those of what are explained in the background art, explanation is omitted.

Furthermore, the R signal level conversion instrument 35, G signal level conversion instrument 36, and B signal level conversion instrument 37 of this embodiment are an example of the color correction instrument of the present invention, the switching signal generation instrument 4, first selection instrument 38, second selection instrument 39, and third selection instrument 40 of this embodiment are an example of the selection instrument of the present invention, the switching signal generation instrument 4, first selection instrument 38, second selection instrument 39, and third selection instrument 40 of this embodiment are an example of the height generation instrument of the present invention, the white color component detection instrument 7, white display element driving instrument 8, white display unit 9, RGB display element driving instrument 10, and RGB display unit 11 of this embodiment are an example of the display instrument of the present invention, R (red), G (green), and B (blue) colors of this embodiment are an example of three primary colors of the present invention, the RGB signals of this embodiment are an example of the chrominance signals of the present invention, and the yellow color, magenta color, and cyan color of this embodiment are examples of the predetermined color of the present invention.

Next, the operation of this embodiment like this will be explained.

The RGB signals inputted from an apparatus, which displays an image on the display apparatus 41, such as a personal computer, DVD equipment, or a TV receiver are inputted into the color component separation and detection instrument 34. In addition, the R signal among the RGB signals inputted is inputted into the R signal level conversion instrument 35 and first selection instrument 38, the G signal among the RGB signals inputted is inputted into the G signal level conversion instrument 36 and second selection instrument 39, and the B signal among the RGB signals inputted is inputted into the B signal level conversion instrument 37 and third selection instrument 40.

The color component separation and detection instrument 34 outputs 1 to the first selection instrument 38 as a cyan color component detection signal, when the cyan color component is included in the RGB signals inputted, and outputs 0 to the first selection instrument 38 as the cyan color component detection signal when the cyan component is not included in the RGB signals inputted.

In addition, the color component separation and detection instrument 34 outputs 1 to the second selection instrument 39 as a magenta color component detection signal, when the magenta color component is included in the RGB signals inputted, and outputs 0 to the second selection instrument 39 as the magenta color component detection signal when the magenta component is not included in the RGB signals inputted.

Furthermore, the color component separation and detection instrument 34 outputs 1 to the third selection instrument 40 as a yellow color component detection signal, when the yellow color component is included in the RGB signals inputted, and outputs 0 to the third selection instrument 40 as the yellow color component detection signal when the yellow color component is not included in the RGB signals inputted.

On the other hand, the R signal level conversion instrument 35 performs the first color correction of lowering a signal level of a red color, which is a complementary color of a cyan color component, to an R signal inputted, and the second color correction of increasing a red signal level. Then, it outputs to the first selection instrument 38 the R signal which is given color correction by either color correction of the first color correction and second color correction on the basis of the switching signal outputted from the switching signal generation instrument 4.

Then, the first selection instrument 38 selects the R signal outputted from the R signal level conversion instrument 35 when the cyan color component detection signal outputted from the color component separation and detection instrument 34 is 1, that is, a cyan color component is included in the RGB signals which is inputted into the display apparatus 41, and outputs it to the white color component detection instrument 7 and RGB display element driving instrument 10. On the other hand, the first selection instrument 38 selects the R signal among the RGB signals, which is inputted into the display apparatus 41, when the cyan color component detection signal outputted from the color component separation and detection instrument 34 is 0, that is, a cyan color component is not included in the RGB signals which is inputted into the display apparatus 41, and outputs it to the white color component detection instrument 7 and RGB display element driving instrument 10.

The G signal level conversion instrument 36 performs the first color correction of lowering a signal level of a green color, which is a complementary color of a magenta color component, to a G signal inputted, and the second color correction of increasing a green signal level. Then, it outputs to the second selection instrument 39 the G signal which is given color correction by either color correction of the first color correction and second color correction on the basis of the switching signal outputted from the switching signal generation instrument 4.

Then, the second selection instrument 39 selects the G signal outputted from the G signal level conversion instrument 36 when the magenta color component detection signal outputted from the color component separation and detection instrument 34 is 1, that is, a magenta color component is included in the RGB signals which is inputted into the display apparatus 41, and outputs it to the white color component detection instrument 7 and RGB display element driving instrument 10. On the other hand, the second selection instrument 39 selects the G signal among the RGB signals, which is inputted into the display apparatus 41, when the magenta color component detection signal outputted from the color component separation and detection instrument 34 is 0, that is, a magenta color component is not included in the RGB signals which is inputted into the display apparatus 41, and outputs it to the white color component detection instrument 7 and RGB display element driving instrument 10.

The B signal level conversion instrument 37 performs the first color correction of lowering a signal level of a blue color, which is a complementary color of a yellow color component, to a B signal inputted, and the second color correction of increasing a blue signal level. Then, it outputs to the third selection instrument 40 the B signal which is given color correction by either color correction of the first color correction and second color correction on the basis of the switching signal outputted from the switching signal generation instrument 4.

Then, the third selection instrument 40 selects the B signal outputted from the B signal level conversion instrument 37 when the yellow color component detection signal outputted from the color component separation and detection instrument 34 is 1, that is, a yellow color component is included in the RGB signals which is inputted into the display apparatus 41, and outputs it to the white color component detection instrument 7 and RGB display element driving instrument 10. On the other hand, the third selection instrument 40 selects the B signal among the RGB signals, which is inputted into the display apparatus 41, when the yellow color component detection signal outputted from the color component separation and detection instrument 34 is 0, that is, a yellow color component is not included in the RGB signals which is inputted into the display apparatus 41, and outputs it to the white color component detection instrument 7 and RGB display element driving instrument 10.

The operation of the white color component detection instrument 7, white display element driving instrument 8, white display unit 9, RGB display element driving instrument 10, and RGB display unit 11 is the same as that of what are explained in the background art.

In this way, an image is displayed on a display screen.

Here, since the RGB signals including both a yellow color component and a magenta color component, RGB signals including both a yellow color component and a cyan component, and RGB signals including both a magenta component and a cyan component do not exist, two or more of the yellow color component detection signal, magenta color component detection signal, and a cyan color component detection signal never take 1. Thus, there is only either a case that all values of the yellow color component detection signal, magenta color component detection signal, and cyan color component detection signal become 0, or a case that any one signal takes 1.

Figure 4B:
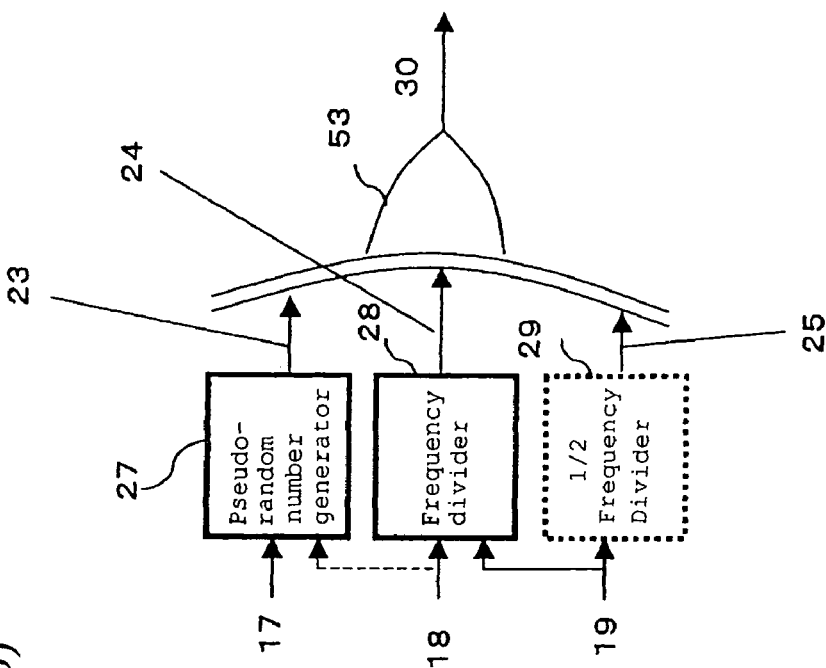
FIG. 4(b) is a drawing showing the structure of switching signal generation instrument, which is different from that in FIG. 4(a), in the first embodiment of the present invention.
Figure 4A:
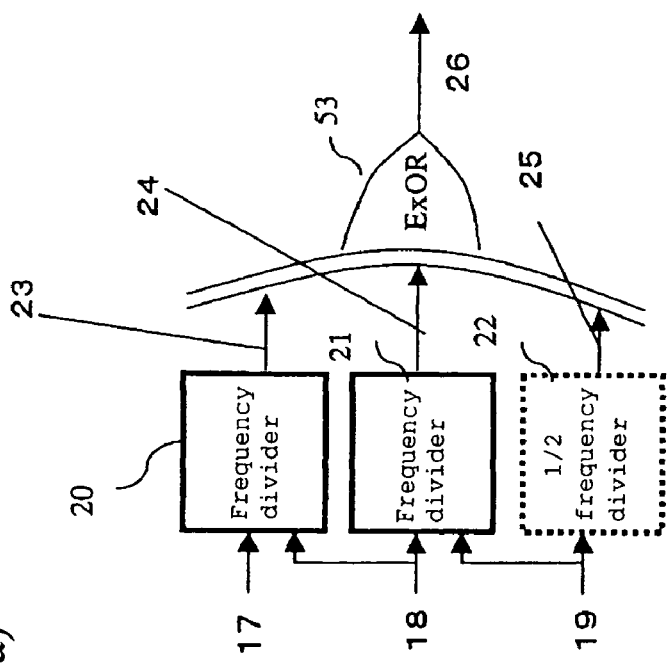
FIG. 4(a) is a drawing showing the structure of switching signal generation instrument in the first embodiment of the present invention.

Hence, display is performed as follows by using the switching signal generation instrument 4 of FIG. 4(a) as the switching signal generation instrument 4. Thus, a region, where the yellow color component, magenta color component, or cyan color component is included, in a display screen is displayed, for example as a checkered pattern or the like, which is constituted of the RGB signals where saturation is increased, and the RGB signals where the white color component is increased, and with attention being paid to one pixel, it is also alternately displayed with the RGB signals where saturation is increased every field or frame, and the RGB signals where the white color component is increased.

In addition, display is performed as follows by using the switching signal generation instrument 4 of FIG. 4(b) as the switching signal generation instrument 4. Thus, a region, where the yellow color component, magenta color component, or cyan color component is included, in the display screen is displayed in a random pattern, which is made of the RGB signals where saturation is increased, and the RGB signals where the white color component is increased, and with attention being paid to one pixel, it is also alternately displayed with the RGB signals where saturation is increased every field or frame, and the RGB signals where the white color component is increased.

In this way, alternating display is performed like a checkered pattern or the like in a region of the display screen where the yellow color component, magenta color component, or cyan color component is included in the inputted RGB signals, that is, a region of the display screen where a plurality of pixels having the yellow color component, magenta color component, or cyan color component in the inputted RGB signals exist adjacently. Thus, when a plurality of pixels which have the yellow color component, magenta color component, or cyan color component in the inputted RGB signals do not exist adjacently, that is, when only one pixel having a yellow color component, magenta color component, or cyan color component exists by itself, such an alternating display cannot be performed. Hence, such an alternating display is performed to a region of the display screen where a plurality of pixels having a yellow color component, magenta color component, or cyan color component in the inputted RGB signals exist adjacently. In this way, height difference in saturation is given to a region of the display screen by performing display at every pixel of the region in the region of the display screen, where the yellow color component, magenta color component, or cyan color component is included in the inputted RGB signals, using either of the RGB signals where saturation is increased, and the RGB signals where the white color component is increased.

In addition, the region of the display screen where the yellow color component, magenta color component, or cyan color component is included in the inputted RGB signals in this embodiment is an example of the region where a plurality of pixels having a component with the above-mentioned predetermined color in the present invention exists adjacently.

In addition, the region on a display screen where the yellow color component, magenta color component, or cyan color component is included may be displayed, for example, as a checkered pattern or the like, and alternating display may not be performed every field. In addition, such a region may be displayed as a random pattern and alternating display may not be performed every field. Furthermore, such a region is displayed in one field or one frame by either of the RGB signals, where saturation is increased, and the RGB signals where the white color component is increased, and alternating display may be performed with the RGB signals where saturation is increased every field or every frame, and the RGB signals where the white color component is increased. However, in the case of displaying with either of the RGB signals where saturation is increased, and the RGB signals, where the white color component is increased, in one field or one frame, and performing the alternating display with the RGB signals where saturation is increased, and the RGB signals, where the white color component is increased, every field or every frame, a flicker arises when the number of fields or frames displayed in 1 second is small, and hence, it is necessary to enlarge sufficiently the number of fields or frames displayed in 1 second.

In the first embodiment, even if a bright yellow (yellow with low saturation), that is, pastel yellow image portion being surrounded by white or being adjacent to white, it was possible to decrease the sense of incongruity that visible color appears differently such as the pastel yellow image portion seeming greenish and the like. In the second embodiment, it is possible to decrease the sense of incongruity that visible color appears differently for not only bright yellow (yellow with low saturation), that is, pastel yellow, but also bright magenta (magenta with low saturation), that is, pastel magenta, and bright cyan (cyan with low saturation), that is, pastel cyan even if its image portion is surrounded by white or is adjacent to white.

In addition, although it was explained in this embodiment that the sense of incongruity of appearance of yellow, magenta, and cyan was decreased, it is also possible to decrease the sense of incongruity of appearance of two or one of these three colors. For example, when decreasing the sense of incongruity of appearance of only magenta, it is not necessary to provide the R signal level conversion instrument 35, first selection instrument 38, B signal level conversion instrument 37, and third selection instrument 40.

Embodiment 3

Next, a third embodiment will be explained.

In the third embodiment, similarly to the first embodiment, a display apparatus will be explained which, even if a bright yellow (yellow with low saturation), that is, pastel yellow image portion being surrounded by white or being adjacent to white, can decrease the sense of incongruity that visible color appears differently such as the pastel yellow image portion seeming greenish and the like.

Figure 7:
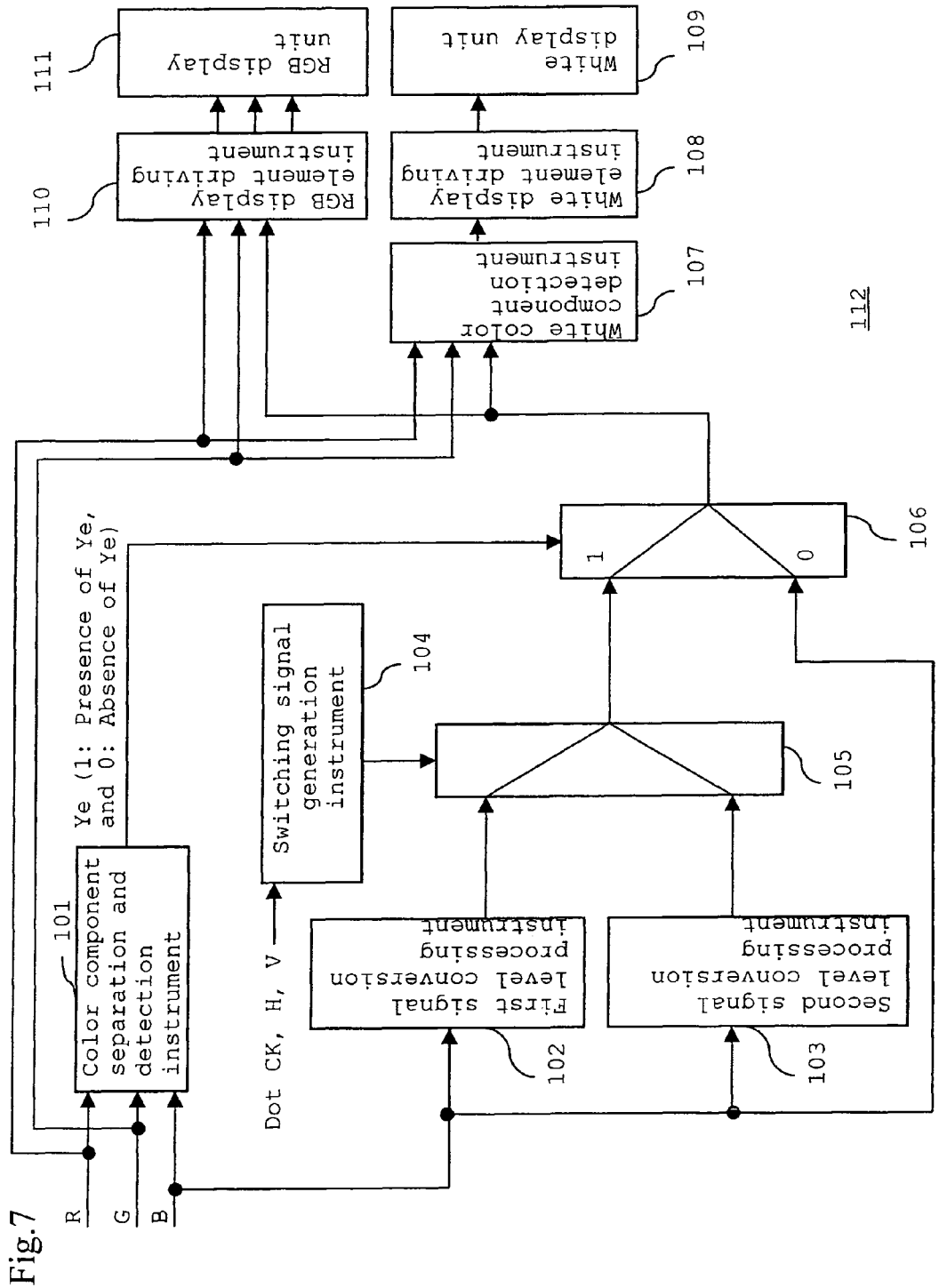
FIG. 7 is a block diagram showing the structure of a display apparatus in a third embodiment of the present invention.

FIG. 7 is a block diagram showing the structure of a display apparatus 112 of the third embodiment.

The display apparatus 112 is constituted of color component separation and detection instrument 101, first signal level conversion processing instrument 102, second signal level conversion processing instrument 103, switching signal generation instrument 104, first selection instrument 105, second selection instrument 106, white color component detection instrument 107, white display element driving instrument 108, a white display unit 109, RGB display element driving instrument 110, and an RGB display unit 111.

The color component separation and detection instrument 101 is the instrument which performs the separation and detection of a yellow color component, when the yellow color component is included in RGB signals inputted.

The first signal level conversion processing instrument 102 is the instrument which inputs a B signal among the RGB signals inputted, and performs the conversion of lowering a signal level of a blue color, which is a complementary color of a yellow color component, to the B signal.

The second signal level conversion processing instrument 103 is the instrument which inputs a B signal among the RGB signals inputted, and performs the conversion of increasing a signal level of a blue color, which is a complementary color of a yellow color component, to the B signal.

The switching signal generation instrument 104 is the instrument which outputs a signal for first selection instrument 105 selecting either the B signal outputted from the first signal level conversion processing instrument 102 or the B signal outputted from the second signal level conversion processing instrument 103.

The first selection instrument 105 is the instrument which selects and outputs either the B signal outputted from the first signal level conversion processing instrument 102 or the B signal outputted from the second signal level conversion processing instrument 103 on the basis of the signal outputted from the switching signal generation instrument 104.

The second selection instrument 106 is the instrument which selects and outputs either of the B signal outputted from the first selection instrument 105, and the B signal among the RGB signals inputted into the display apparatus 112 on the basis of the detection result of the yellow color component of the color component separation and detection instrument 101.

In addition, since the white color component detection instrument 107, white display element driving instrument 108, white display unit 109, RGB display element driving instrument 110, and RGB display unit 111 are the same as those of what are explained in the background art, explanation is omitted.

Furthermore, an example of color detection instrument of the present invention is equivalent to the color component separation instrument 101 in this third embodiment, and an example of color correction instrument of the present invention is equivalent to the first signal level conversion processing instrument 102 and second signal level conversion processing instrument 103 in this third embodiment. Moreover, the control instrument of the present invention is equivalent to the switching signal generating instrument 104, first selection instrument 105, and second selection instrument 106 in this third embodiment. Moreover, an example of display instrument of the present invention is equivalent to the white color component detection instrument 107, white display element driving instrument 108, white display unit 109, RGB display element driving instrument 110, and RGB display unit 111.

In addition, an example of the three primary colors of the present invention is equivalent to an R (red) color, a G (green) color, and a B (blue) color in this third embodiment. An example of the chrominance signals of the present invention is equivalent to the RGB signals in this third embodiment, and an example of the predetermined color component of the present invention is equivalent to yellow in this third embodiment.

Next, an example of a display method of the present invention is also concurrently explained with the operation of the display apparatus, having the above-mentioned structure, in this third embodiment.

The RGB signals inputted from an apparatus, which displays an image on the display apparatus 112, such as a personal computer, DVD equipment, or a TV receiver are inputted into the color component separation and detection instrument 110. In addition, the B signal among the RGB signals inputted is inputted into the first signal level conversion processing instrument 102, second signal level conversion processing instrument 103, and second selection instrument 106. Furthermore, the R signal and G signal among the RGB signals inputted are inputted into the white color component detection instrument 107 and RGB display element driving instrument 110.

The color component separation and detection instrument 101 detects whether the RGB signals which is inputted includes the yellow color component (this is equivalent to an example of the color detection step of the present invention).

An example of the RGB signals is shown in FIG. 5. The R signal which expresses red, the G signal which expresses green, and the B signal which expresses blue are signals which can take 256 kinds of values from 0 to 255, respectively, and the larger this value is, the brighter color is expressed. The green color component 31, yellow color component 32, and white color component 33 are included in the RGB signals of FIG. 5.

It is possible to perform the detection of the yellow color component from the RGB signals, by detecting the case that both of a value of the R signal and a value of the G signal are larger than a value of the B signal. Thus, the yellow color component is included in the RGB signals when both of the value of the R signal and the value of the G signal are larger than the value of the B signal.

The color component separation and detection instrument 101 outputs 1 when the yellow color component is included in the RGB signals, and it outputs 0 when the yellow color component is not included in the RGB signals. Then, the output of the color component separation and detection instrument 101 is inputted into the second selection instrument 106.

On the other hand, the first signal level conversion processing instrument 102 inputs the B signal among the RGB signals inputted into the display apparatus 112, and performs the conversion of lowering a signal level of a blue color which is a complementary color of the yellow color component. In other words, the first signal level conversion processing instrument 102 performs the conversion of increasing saturation when the yellow color component is included in the RGB signals inputted into the display apparatus 112.

Figure 2A:
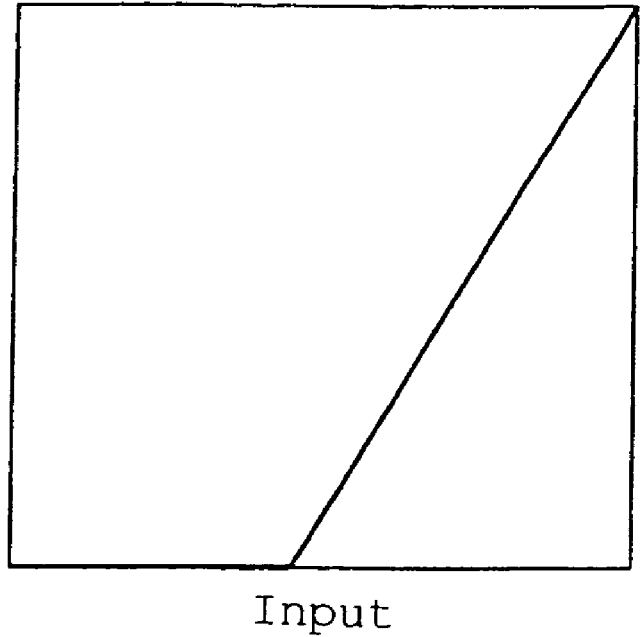
FIG. 2(a) is an explanatory diagram of operation of first signal level conversion processing instrument in first, third, and fifth embodiments of the present invention.

FIG. 2(a) shows the conversion processing which the first signal level conversion processing instrument 102 performs to the B signal. Thus, the horizontal axis of FIG. 2(a) shows the value of the B signal inputted into the first signal level conversion processing instrument 102, and the vertical axis shows the value of the B signal after the first signal level conversion processing instrument 102 performs the conversion processing. The first signal level conversion processing instrument 102 has stored beforehand a conversion table for performing the conversion processing shown in FIG. 2(a), and performs the conversion processing of FIG. 2(a) using the conversion table. In addition, although it was explained that the first signal level conversion processing instrument 102 performed the conversion processing shown in FIG. 2(a) using the conversion table, it is not limited to this. For example, the conversion processing of FIG. 2(a) may be performed using a method other than the conversion table, such as performing the conversion processing shown in FIG. 2(a) by data processing by hardware or software.

Apparently from FIG. 2(a), when the value of the B signal inputted into the first signal level conversion processing instrument 102 is smaller than a predetermined value, the value of the B signal outputted from the first signal level conversion processing instrument 102 is set at 0. Then, when the value of the B signal inputted into the first signal level conversion processing instrument 102 is larger than the predetermined value, the value of the B signal outputted from the first signal level conversion processing instrument 102 is set at a value larger than 0, but it is set at a value smaller than the value of B signal inputted into the first signal level conversion processing instrument 102.

In this way, since the first signal level conversion processing instrument 102 converts the value of the B signal inputted as shown in FIG. 2(a), the value of the B signal in the RGB signals outputted from the first signal level conversion processing instrument 102 becomes small in comparison with the RGB signals at the time of an input. This B signal outputted from the first signal level conversion processing instrument 102 is made a first B signal.

Thus, when the RGB signals inputted into the display apparatus 112 include the yellow color component 32 as shown in FIG. 5, the RGB signals are newly constituted by synthesizing the first B signal, outputted from the first signal level conversion processing instrument 102, with the R signal and G signal inputted into the display apparatus 112. The constituted RGB signals become signals where saturation is increased in comparison with the RGB signals inputted into the display apparatus 112, since the yellow color component 32 increases and the white color component 33 decreases. The color correction of increasing saturation like this is equivalent to an example of the first color correction of the present invention, and let these RGB signals, where saturation increases, be first RGB signals, and it is equivalent to an example of the first chrominance signal of the present invention.

In addition, the second signal level conversion processing instrument 103 performs the conversion of increasing a signal level of a blue color, which is a complementary color of the yellow color component, to the B signal among the RGB signals inputted into the display apparatus 112. In other words, the second signal level conversion processing instrument 103 performs the conversion of increasing a white color component when the yellow color component is included in the RGB signals inputted into the display apparatus 112.

Figure 2B:
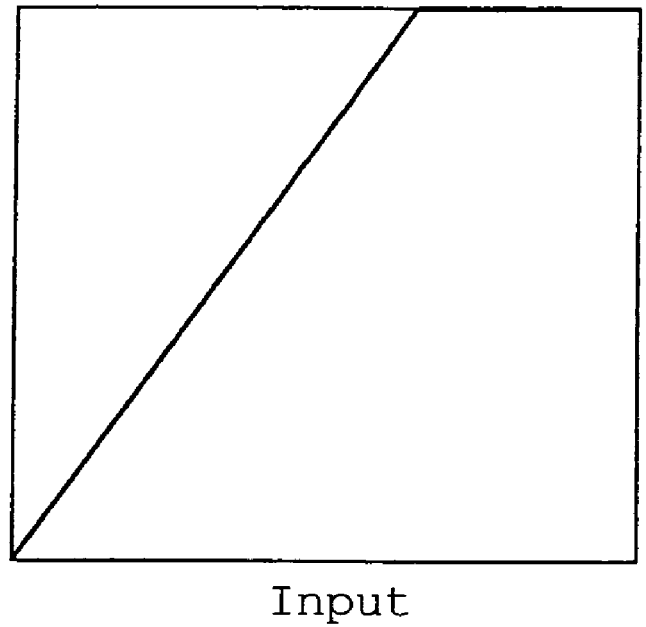
FIG. 2(b) is an explanatory diagram of operation of second signal level conversion processing instrument in first, third, and fifth embodiments of the present invention.

FIG. 2(b) shows the conversion processing which the second signal level conversion processing instrument 103 performs to the B signal. Thus, the horizontal axis of FIG. 2(b) shows the value of the B signal inputted into the second signal level conversion processing instrument 103, and the vertical axis shows the value of the B signal after the second signal level conversion processing instrument 103 performs the conversion processing. The second signal level conversion processing instrument 103 has stored beforehand a conversion table for performing the conversion processing shown in FIG. 2(b), and performs the conversion processing of FIG. 2(b) using the conversion table. In addition, although it is explained that the second signal level conversion processing instrument 103 performs the conversion processing shown in FIG. 2(b) using the conversion table, it is not limited to this. For example, the conversion processing of FIG. 2(b) may be performed using a method other than the conversion table, such as performing the conversion processing shown in FIG. 2(b) by data processing by hardware or software.

Since the second signal level conversion processing instrument 103 converts the value of the B signal inputted as shown in FIG. 2(b), the value of the B signal in the RGB signals outputted from the second signal level conversion processing instrument 103 becomes large in comparison with the B signals at the time of an input. This B signal outputted from the second signal level conversion processing instrument 103 is made a second B signal.

Thus, when the RGB signals inputted into the display apparatus 112 include the yellow color component 32, when RGB signals are newly constituted by synthesizing the second B signal, outputted from the second signal level conversion processing instrument 103, with the R signal and G signal inputted into the display apparatus 112, the constituted RGB signals become signals where the white color component increases in comparison with the RGB signals inputted into the display apparatus 112. In addition, the color correction of increasing the white color component is equivalent to an example of the second color correction of the present invention, and let these RGB signals, where the white color component increases, be second RGB signals, and it is equivalent to an example of the second chrominance signal of the present invention. Moreover, the level conversion of the B signal level by the first signal level conversion instrument 102 and second signal level conversion instrument 103 is equivalent to an example of the color correction step of the present invention.

The switching signal generation instrument 104 generates a switching signal using the dot clock, horizontal synchronizing signal, and vertical synchronizing signal for determining the timing when the RGB display element driving instrument 110 and white display element driving instrument 108 of the display apparatus 112 drives the RGB display unit 111 and white display unit 109, and outputs it to the first selection instrument 105. This switching signal is a signal of taking a value of either 1 or 0. In addition, the operation of the switching signal generation instrument 104 will be described later.

The first selection instrument 105 selects the first B signal outputted from the first signal level conversion processing instrument 102 when the value of the switching signal outputted from the switching signal generation instrument 104 is 1, outputs it to the second selection instrument 106, selects the second B signal outputted from the second signal level conversion processing instrument 103 when the value of the switching signal is 0, and outputs it to the second selection instrument 106.

When the value of the signal which the color component separation and detection instrument 101 outputs is 1, that is, when the yellow color component is included, the second selection instrument 106 selects the first or second B signal outputted from the first selection instrument 105, and outputs it to the RGB display element driving instrument 110 and white color component detection instrument 107. In addition, when the value of the signal which the color component separation and detection instrument 101 outputs is 0, that is, when the yellow color component is not included, the second selection instrument 106 outputs the B signal among the RGB signals, inputted into the display apparatus 112, without conversion processing to the RGB display element driving instrument 110 and white color component detection instrument 107. This B signal outputted without conversion processing is made a third B signal. Moreover, let RGB signals, which are constituted of this B signal, which is not given the conversion processing, and the R signal and G signal, which are inputted into the display apparatus 112, be third chrominance signals, and it is equivalent to an example of the chrominance signals of the present invention which are not given the color correction. In addition, the selection of the first B signal or second B signal by the switching signal mentioned above, and the selection of the first B signal, second B signal or third B signal by the second selection instrument 106 is equivalent to an example of the control step of the present invention.

Thus, the R signal and G signal which are inputted into the display apparatus 112, and one of the first to third B signals outputted from the second selection instrument 106 are inputted into the RGB display element driving instrument 110 and white color component detection instrument 107. Then, the white color component detection instrument 107 and RGB display element driving instrument 110 processes these R signal, G signal, and B signal as new RGB signals.

In addition, the operation of the white color component detection instrument 107, white display element driving instrument 108, white display unit 109, RGB display element driving instrument 110, and RGB display unit 111 is the same as that of what were explained in the background art.

Thus, an image is displayed on a display screen (it is equivalent to an example of the displaying step of the present invention).

By the way, the switching signal which the switching signal generation instrument 104 outputs, for example, such a signal that the value of the switching signal becomes 1 in a pixel adjacent to a certain pixel in a horizontal direction when the value of the switching signal is 1 to the certain pixel, the value of the switching signal becomes 0 in a further adjacent pixel horizontally, the value of the switching signal becomes 0 in a still further adjacent pixel horizontally, and the value of the switching signal becomes 1 in a further adjacent pixel horizontally. That is, when attention is paid to a horizontal pixel row, the switching signal takes 0 and 1 every two dot clocks for determining the timing of display every pixel. Similarly, when attention is paid to a vertical pixel column, the switching signal takes 0 and 1 every two horizontal periods.

Figure 8:
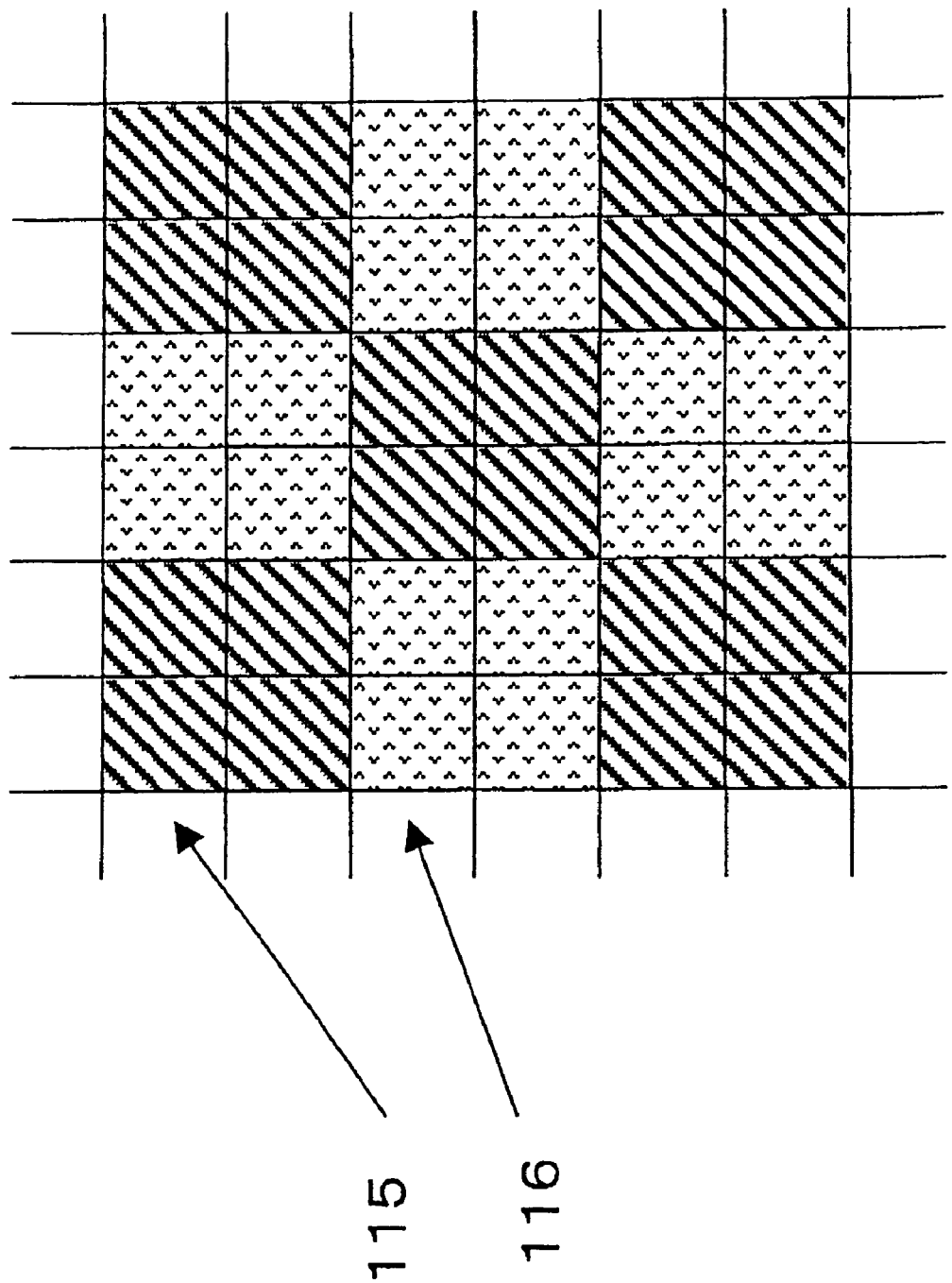
FIG. 8 is a drawing showing a display example of a region of a display screen, where a yellow color component is included, in the third embodiment of the present invention.

Hence, as shown in FIG. 8, yellow pixels 115 where the first RGB signals are displayed, and white pixels 116 where the second RGB signals are displayed are alternately displayed in a checkered pattern with a 2-pixels V×2-pixels H region as a block in a region of the display screen where the yellow color component is included in the inputted RGB signals, that is, a region of the display screen where a plurality of pixels having a yellow color component in the inputted RGB signals exist adjacently.

In this way, the display apparatus 112 gives height difference in saturation to the region of the screen by performing display every pixel of the region in the region of the display screen, where the yellow color component is included in the inputted RGB signals, using either of the RGB signals where saturation is increased, and the second RGB signals where the white color component is increased.

Hence, for example, bright yellow (yellow with low saturation), that is, pastel yellow is displayed with the yellow pixels 115 whose saturation is increased more, and the white pixels 116 where the white color component is increased more. Hence, it will be felt to human eyes by the storage effect of human eyes that bright yellow (yellow with low saturation), that is, pastel yellow is displayed.

Further, since it is possible to increase the brightness of an image portion by displaying bright yellow (yellow with low saturation), that is, pastel yellow by the alternating display with the yellow whose saturation is increased more, and the yellow where the white color component is increased more, even if the image portion being surrounded by white or being adjacent to white, it is possible to decrease the sense of incongruity that visible color appears differently such as the pastel yellow image portion seeming greenish and the like.

In addition, although bright yellow (yellow with low saturation), that is, pastel yellow is expressed by the alternating display of yellow pixels 115 and white pixels 116 in a checkered pattern with a 2-pixels V×2-pixels H region as a block in a region of the display screen where the yellow color component is included in the inputted RGB signals in FIG. 8, an equivalent effect can be obtained also by temporally alternating display. That is, when a certain pixel is displayed in the yellow pixel 115, it is possible to perform display in the white pixel 116 in the following frame.

That is, also when the first RGB signals corresponding to the yellow pixel 115, and the second RGB signals corresponding to the white pixel 116 are switched and displayed every frame, it is possible to decrease the sense of incongruity that visible color appears differently as mentioned above. Thus, it is equivalent to an example of the control of the present invention to switch and display the first RGB signals and second RGB signals temporally.

Next, as mentioned above, the switching signal generation instrument 104 will be explained.

Figure 9:
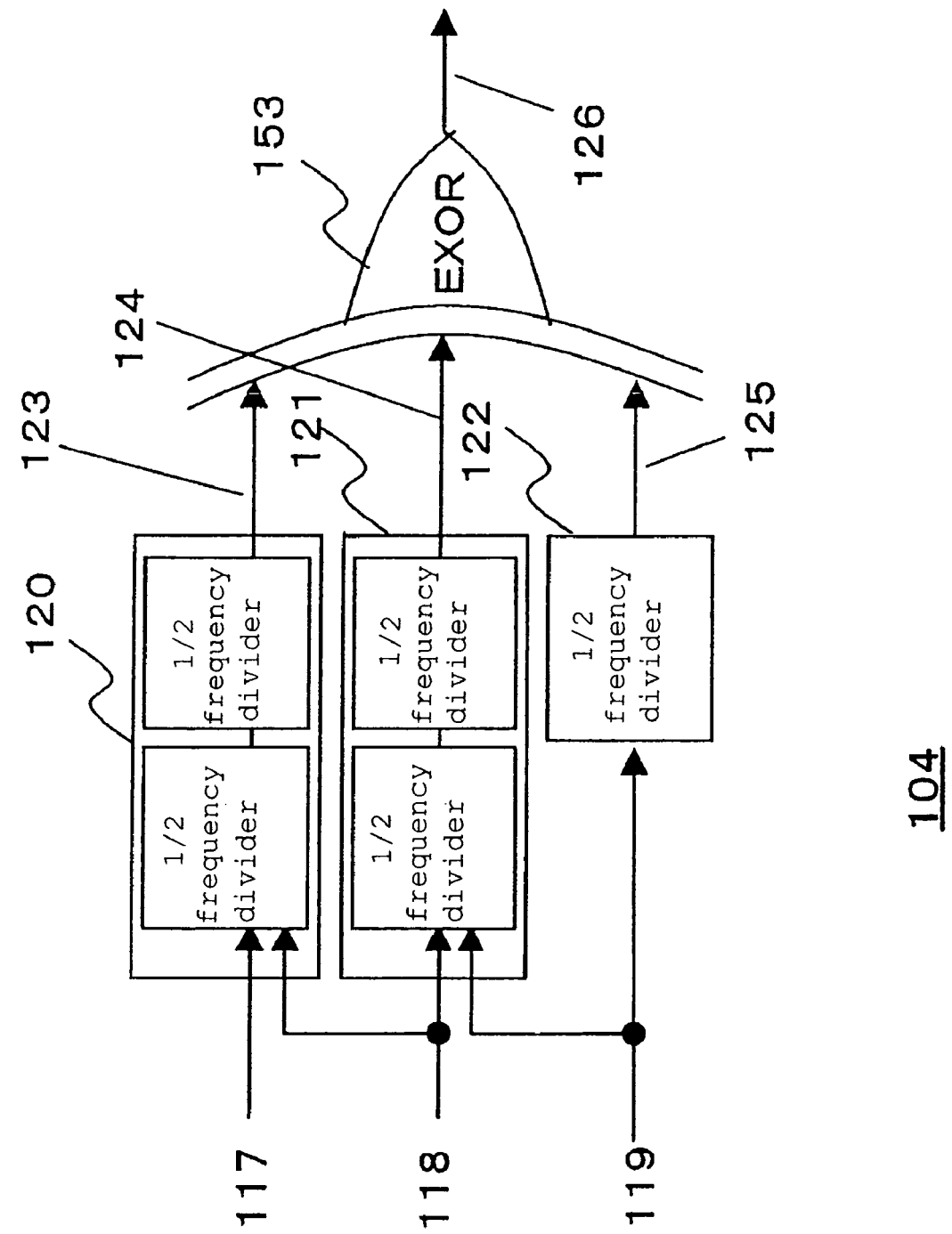
FIG. 9 is a drawing showing the structure of switching signal generation instrument in the third embodiment of the present invention.

FIG. 9 shows the structure of the switching signal generation instrument 104. The switching signal generation instrument 104 is constituted of a frequency divider 120, a frequency divider 121, a ½ frequency divider 122, and calculation instrument 153.

The frequency divider 120 is the instrument which repeats twice the ½-frequency dividing of a dot clock signal 117 inputted for the white display element driving instrument 108 and RGB display element driving instrument 110 to determine the timing of display every pixel, and outputs a pixel alternating signal 123.

The frequency divider 121 is the instrument which repeats twice the ½-frequency dividing of a horizontal synchronizing signal 118 inputted for the white display element driving instrument 108 and RGB display element driving instrument 110 to determine the timing of display every horizontal period, and outputs a line alternating signal 124.

The ½ frequency divider 122 is the instrument which performs the frequency dividing of a vertical synchronizing signal 119 inputted for the white display element driving instrument 108 and RGB display element driving instrument 110 to determine the timing of display every frame, and outputs a frame alternating signal 125.

The calculation instrument 153 is the instrument which obtains the exclusive OR of the pixel alternating signal 123, line alternating signal 124, and frame alternating signal 125, and outputs the obtained exclusive OR as a switching signal 126.

Thus, the dot clock signal 117 is inputted into the frequency divider 120, the frequency divider 120 repeats twice the ½-frequency dividing using the dot clock signal 117, and outputs the pixel alternating signal 123.

In addition, the horizontal synchronizing signal 118 is inputted into the frequency divider 120 and frequency divider 121. The frequency divider 120 is reset in the initial state in the timing when the horizontal synchronizing signal 118 is inputted. Furthermore, the frequency divider 121 repeats twice the ½-frequency dividing using the horizontal synchronizing signal 118, and outputs the line alternating signal 124.

In addition, the vertical synchronizing signal 119 is inputted into the frequency divider 121 and the ½ frequency divider 122. The frequency divider 121 is reset in the initial state when the vertical synchronizing signal 119 is inputted. Moreover, the ½ frequency divider 122 performs the ½-frequency dividing of the vertical synchronizing signal 119, and outputs the frame alternating signal 125.

The calculation instrument 153 inputs the pixel alternating signal 123, line alternating signal 124, and frame alternating signal 125, obtains the exclusive OR of them, and outputs it as the switching signal 126.

Since the frequency divider 120 and the frequency divider 121 repeat the ½-frequency dividing twice using the dot clock signal 117 and horizontal synchronizing signal 118 respectively, the switching signal 126 expresses the checkered pattern with a 2-pixels V×2-pixels H region as a block.

Since the first B signal or second B signal is switched and selected every two pixel units by the first selection instrument 105 using the switching signal generation instrument 104 of FIG. 9, the first chrominance signals or second chrominance signals are displayed in turn spatially every two pixel units in a region, where the yellow color component is contained, in the display screen.

Moreover, when attention is paid to a specific pixel, when the yellow color component is contained in the display screen, the first chrominance signals and second chrominance signals are switched and displayed every frame.

Figure 10:
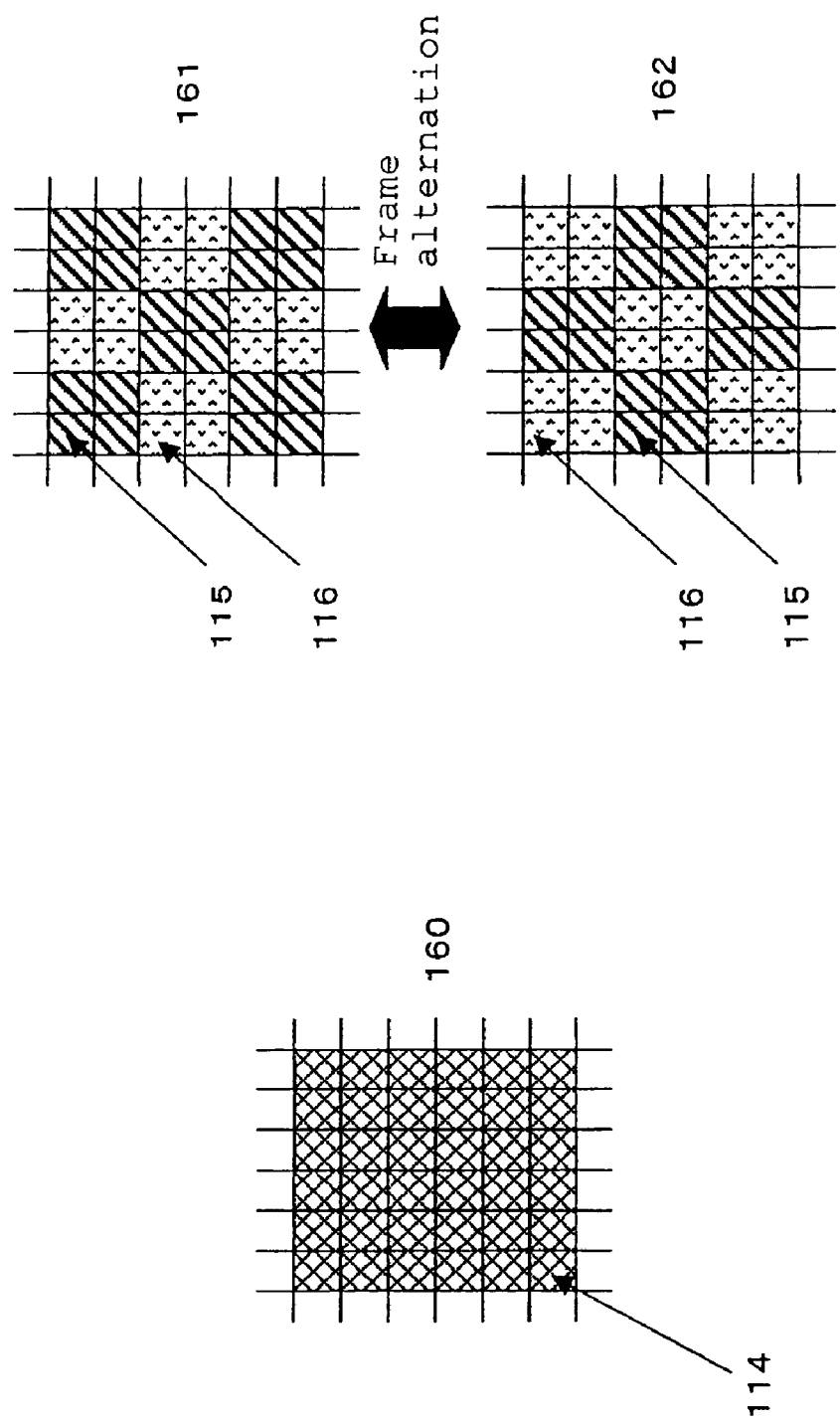
FIG. 10 includes drawings showing output result examples of a switching signal 126 in the third embodiment of the present invention.

FIG. 10 shows an example of an output at the time of using the switching signal 126. A display region 160 is a region including pastel yellow pixels 114, a display region 161 is a display region at the time of a certain frame displayed using the switching signal 126, and a display region 162 is a display region at the time of the next frame of the display region 161.

As shown in FIG. 10, the yellow pixels 115 and white pixels 116 are alternately displayed in the checkered pattern with a 2-pixels V×2-pixels H region as a block in the display region 161 and display region 162, and when attention is paid to a specific pixel, the yellow pixel 115 and white pixel 116 are switched and displayed in the display region 161 and display region 162.

In addition, in this third embodiment, when attention is paid to a specific pixel, the yellow pixel 115 and white pixel 116 were switched and displayed every frame, but in the case of the interlace mode, it may be performed per field. For example, when one frame is displayed with an odd number field and an even number field, the switching of a specific pixel is performed every two fields.

In addition, as an example of control of a present invention, in this third embodiment, the control of making the yellow pixels 115 and white pixels 116 displayed as a checkered pattern with a 2-pixels V×2-pixels H region as a block by switching the first B signal and second B signal every two dot clocks and every two horizontal periods was shown.

Figure 11:
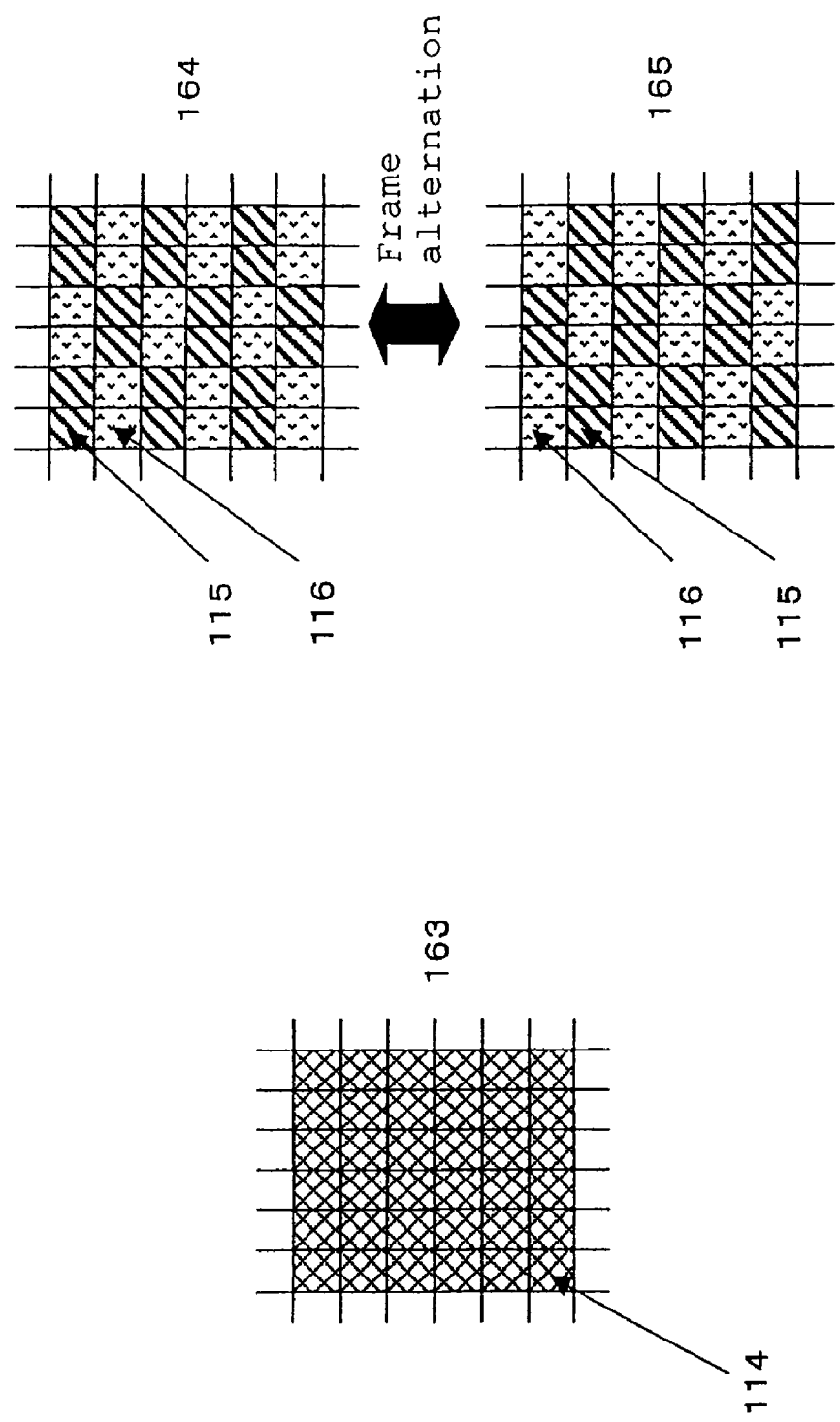
FIG. 11 includes drawings showing output result examples using a switching signal different from the case of FIG. 10.

However, a checkered pattern with a 2-pixels H region as a block may be sufficient instead of the 2-pixels V×2-pixels H region, but in that case, selection is performed by switching the first B signal and second B signal every two horizontal periods. The output result in this case is shown in FIG. 11. A display region 163 is a region including pastel yellow pixels 114, a display region 164 is a display region at the time of a certain frame displayed using a switching signal of switching the first B signal and second B signal every two horizontal periods, and a display region 165 is a display region at the time of the next frame of the display region 164. As shown in FIG. 11, the yellow pixels 115 and white pixels 116 are alternately displayed in the checkered pattern with a 2-pixels H region as a block in the display region 164 and display region 165, and when attention is paid to a specific pixel, the yellow pixel 115 and white pixel 116 are switched and displayed in the display region 164 and display region 165.

Further, a checkered pattern with a 2-pixels V region as a block may be sufficient, but in that case, selection is performed by switching the first B signal and second B signal every two dot clocks. Moreover, it may be sufficient to switch the first B signal and second B signal so as to form the checkered pattern with a two-or-more pixels region as a block besides every two pixels.

In addition, it may be two pixels or more as well as 2-pixels V×2-pixels H.

As mentioned above, according to this third embodiment, even if a bright yellow (yellow with low saturation), that is, pastel yellow display portion being surrounded by white or being adjacent to white, it is possible to decrease the sense of incongruity that visible color appears differently such as the pastel yellow image portion seeming greenish and the like.

In addition, when a display apparatus is a one-chip DLP projector, four colors of RGBW are temporally switched and displayed in one pixel of a screen with being synchronized with a color wheel. Although this temporal switching is performed also in a PDP or the like, switching timing (PWM waveform) may be generally changed depending on a location of a pixel so as to express smooth gradient. For example, if alternation is performed every field or frame in the checkered pattern which performs alternation every dot clock and every horizontal period, the PWM waveform may differ between fields or frames. As a result, since a ½ component of a field or frame frequency which constitutes the PWM waveform may become large, it may become a flicker. It is possible further to suppress the occurrence of such a phenomenon by performing the switching every two dot clocks or every two horizontal periods.

Furthermore, although the case where chrominance signals displayed only in the pastel yellow 114 as shown in the display region 160 of FIG. 10 were described in this third embodiment, the case where the chrominance signals which do not include the yellow color component are included will be also described below. In addition, as the chrominance signals which do not include the yellow color component, black will be mentioned as an example and described.

Figure 12:
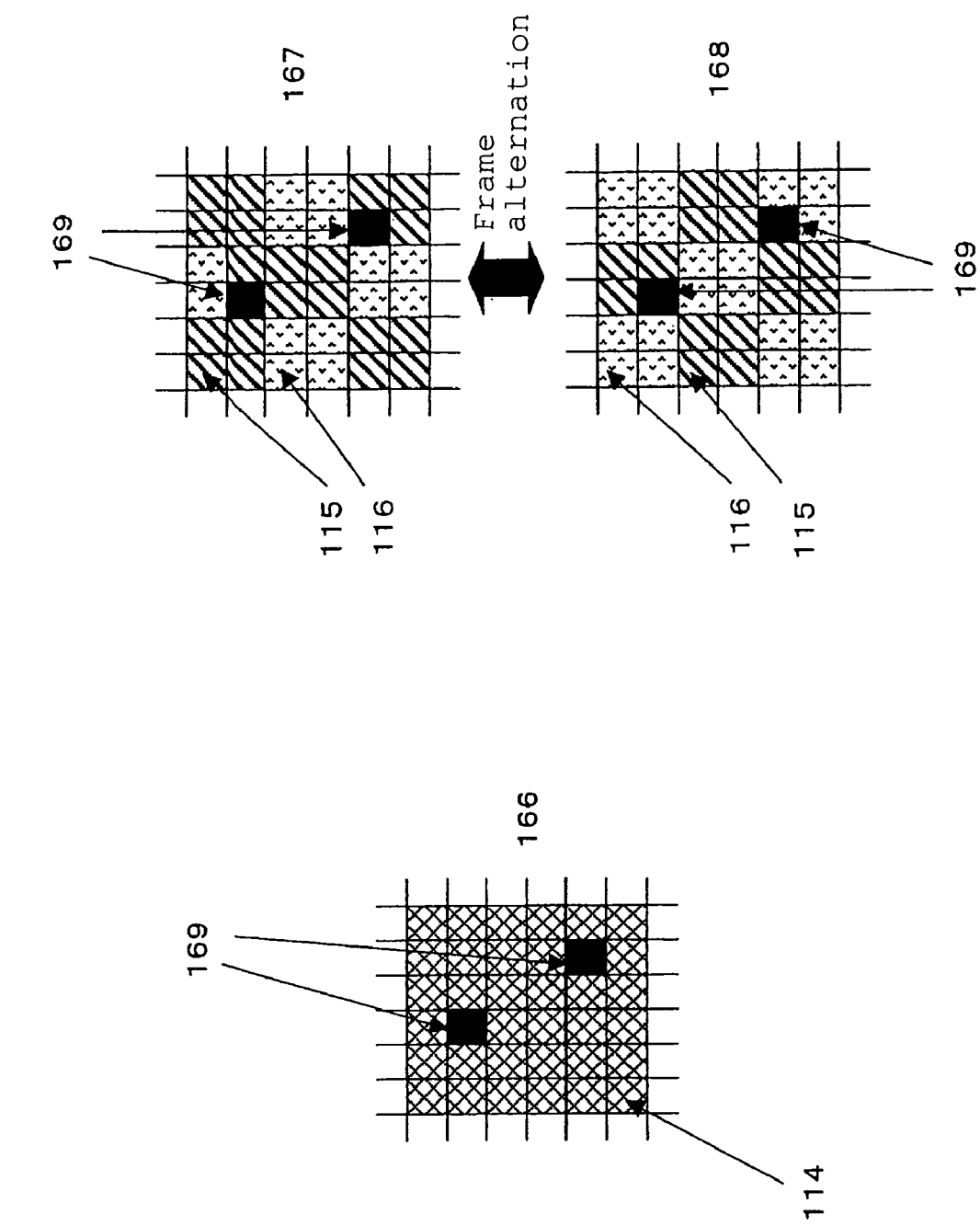
FIG. 12 includes drawings showing output result examples of the switching signal 126 in the case that a black pixel is included in a part of a display region of FIG. 10.

A display region 166 of FIG. 12 shows a display region including a small number of black pixels 169 in a plurality of pastel yellow pixels 114. Moreover, a display region 167 is a display region at the time of a certain frame which displays chrominance signals of being displayed like the display region 166 is displayed by the display device 112. Furthermore, a display region 168 shows a display region at the time of the next frame of the display region 167.

As to a plurality of chrominance signals displayed on this display region 166, the first B signal or second B signal is selected by the first selection instrument 105 in turn, and as to the black signal which does not include a yellow color component, the third B chrominance signal which is not given correction is selected by the second selection instrument 106, which are combined with the R signal and G signal, and are displayed.

Here, the selection of the first or second B signal by the first selection instrument is performed every two pixel units, and this is also performed when the third B signal is selected and displayed by the second selection instrument 106. Therefore, assuming that there is no black pixel 169 temporarily and all the chrominance signals displayed in the display region 167 include the yellow color component as shown in the display region 167, the display device 112 displays the yellow pixels 115 and white pixels 116 in turn, and displays the black pixels 169 as it is. Controlling like this display region 167 is equivalent to an example of the control of the present invention.

In addition, although it was explained in this third embodiment that RGB signals were inputted into the display apparatus 112, it is not limited to this, but signals which express colors except RGB signals may be inputted.

Furthermore, although the display apparatus 141 performs the processing, which decreases the sense of incongruity of yellow appearance, in this third embodiment, it is also possible to perform the processing which decreases the sense of incongruity of magenta or cyan.

Moreover, although the conversion which the first signal level conversion processing instrument 102 gives to a blue signal is linear conversion at a predetermined intensity level or higher as shown in FIG. 2(*a*) in this third embodiment, nonlinear conversion is acceptable. In short, the first signal level conversion processing instrument 102 has only to convert the B signal inputted into the first signal level conversion processing instrument 102 so as to be a smaller value in comparison with the B signal at the time of an input.

In addition, in this third embodiment, although the conversion which the second signal level conversion processing instrument 103 gives to the blue signal is linear conversion up to the predetermined intensity level, it may be nonlinear conversion. In short, the second signal level conversion processing instrument 103 has only to convert the B signal inputted into the first signal level conversion processing instrument 102 so as to be a large value in comparison with the B signal at the time of the input.

Embodiment 4

Next, a fourth embodiment will be described.

In the fourth embodiment, similarly to the second embodiment, a display apparatus which can decrease the sense of incongruity that visible color appears differently for not only bright yellow (yellow with low saturation), that is, pastel yellow, but also bright magenta (magenta with low saturation), that is, pastel magenta, and bright cyan (cyan with low saturation), that is, pastel cyan seems differently even if its image portion is surrounded by white or is adjacent to white will be explained.

Figure 13:
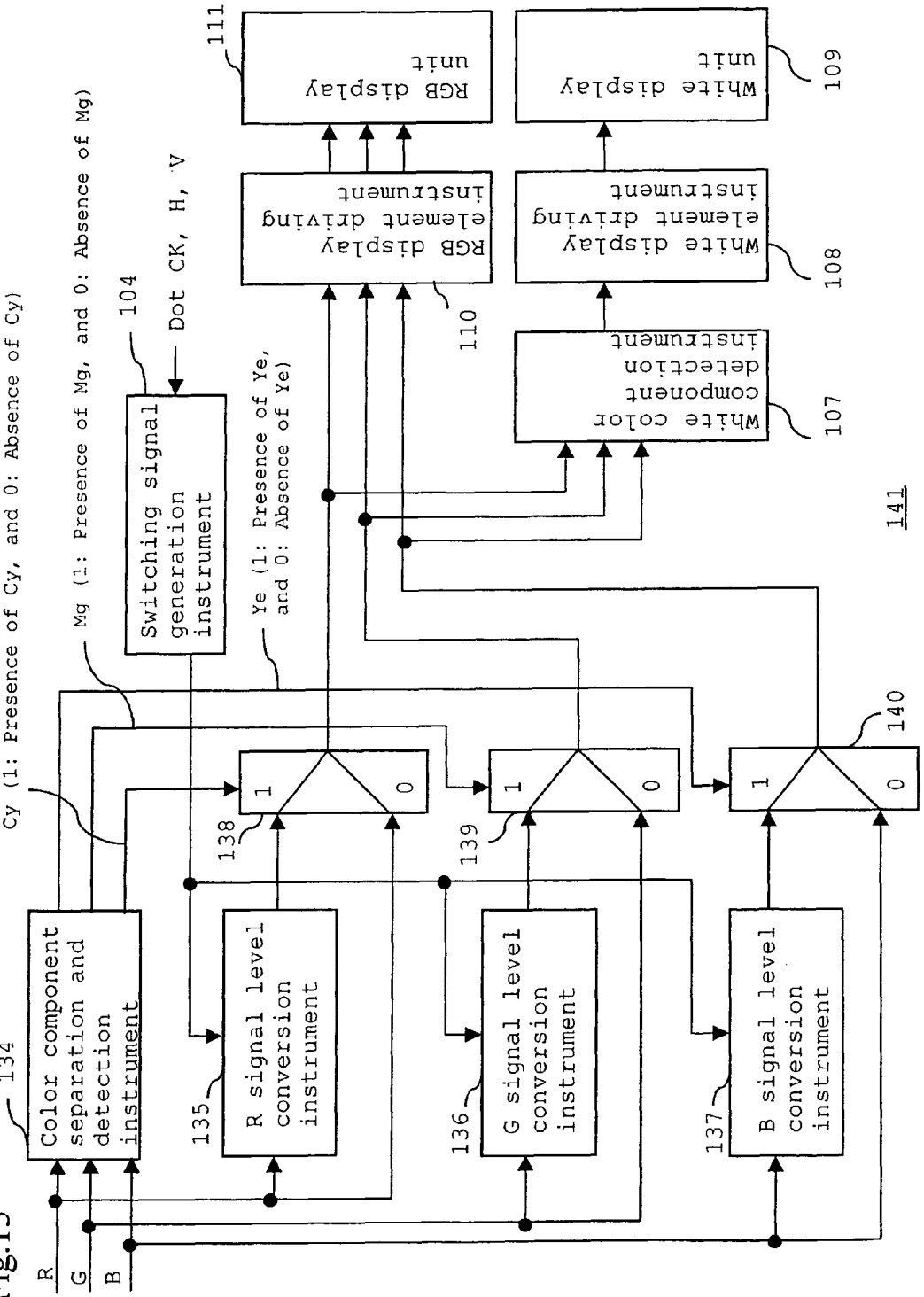
FIG. 13 is a block diagram showing the structure of a display apparatus in a fourth embodiment of the present invention.

FIG. 13 is a block diagram showing the structure of the display apparatus 141 of the fourth embodiment.

The display apparatus 141 is constituted of color component separation and detection instrument 134, the switching signal generation instrument 104, R signal level conversion processing instrument 135, G signal level conversion processing instrument 136, B signal level conversion processing instrument 137, first selection instrument 138, second selection instrument 139, third selection instrument 140, the white color component detection instrument 107, the white display element driving instrument 108, the white display unit 109, the RGB display element driving instrument 110, and the RGB display unit 111.

The color component separation and detection instrument 134 is the instrument which outputs a yellow color component detection signal showing whether a yellow color component is included in the RGB signals inputted, outputs a magenta color component detection signal showing whether a magenta color component is included in the RGB signals inputted, and outputs a cyan color component detection signal showing whether a cyan color component is included in the RGB signals inputted.

The switching signal generation instrument 104 is equivalent to what was described in the third embodiment.

The R signal level conversion instrument 135 is the instrument which performs the first color correction of lowering a signal level of a red color, which is a complementary color of a cyan color component, to an R signal among the RGB signals inputted, and the second color correction of increasing a red signal level, and outputs the R signal which is given color correction by either color correction of the first color correction and second color correction on the basis of the switching signal outputted from the switching signal generation instrument 104.

The G signal level conversion instrument 136 is the instrument which performs the first color correction of lowering a signal level of a green color, which is a complementary color of a magenta color component, to an G signal among the RGB signals inputted, and the second color correction of increasing a green signal level, and outputs the G signal which is given color correction by either color correction of the first color correction and second color correction on the basis of the switching signal outputted from the switching signal generation instrument 104.

The B signal level conversion instrument 137 is the instrument which performs the first color correction of lowering a signal level of a blue color, which is a complementary color of a yellow color component, to a B signal among the RGB signals inputted, and the second color correction of increasing a blue signal level, and outputs the B signal which is given color correction by either color correction of the first color correction and second color correction on the basis of the switching signal outputted from the switching signal generation instrument 104.

In addition, the B signal level conversion instrument 137 is equivalent to the first signal level conversion processing instrument 102, second signal level conversion processing instrument 103, and first selection instrument 105 of the display apparatus 112 of the third embodiment.

Furthermore, the R signal level conversion instrument 135 is equivalent to the case that, in the first signal level conversion processing instrument 102, second signal level conversion processing instrument 103, and first selection instrument 105 of the display apparatus 112 of the third embodiment, color correction equivalent to the color correction which the first signal level conversion processing instrument 102 and second signal level conversion processing instrument 103 are given to a blue color is given to a red color using a conversion table optimized to a red color.

Moreover, the G signal level conversion instrument 136 is equivalent to the case that, in the first signal level conversion processing instrument 102, second signal level conversion processing instrument 103, and first selection instrument 105 of the display apparatus 112 of the third embodiment, color correction equivalent to the color correction which the first signal level conversion processing instrument 102 and second signal level conversion processing instrument 103 are given to a blue color is given to a green color using a conversion table optimized to a green color.

The first selection instrument 138 is the instrument which selects and outputs either of the R signal outputted from the R signal level conversion instrument 135, and the R signal among the RGB signals inputted into the display apparatus 141 on the basis of a cyan color component detection signal, that is, the detection result of the cyan color component of the color component separation and detection instrument 134.

The second selection instrument 139 is the instrument which selects and outputs either of the G signal outputted from the G signal level conversion instrument 136, and the G signal among the RGB signals inputted into the display apparatus 141 on the basis of a magenta color component detection signal, that is, the detection result of the magenta color component of the color component separation and detection instrument 134.

The third selection instrument 140 is the instrument which selects and outputs either of the B signal outputted from the B signal level conversion instrument 137, and the B signal among the RGB signals inputted into the display apparatus 141 on the basis of a yellow color component detection signal, that is, the detection result of the yellow color component of the color component separation and detection instrument 134.

In addition, since the white color component detection instrument 107, white display element driving instrument 108, white display unit 109, RGB display element driving instrument 110, and RGB display unit 111 are the same as those of what are explained in the background art, explanation is omitted.

In addition, an example of the color detection instrument of the present invention is equivalent to the color component separation and detection instrument 134 in this fourth embodiment. Moreover, an example of the color correction instrument of the present invention is equivalent to a portion excluding a portion equivalent to the first selection instrument 105, described in the third embodiment, from the R signal level conversion instrument 135, G signal level conversion instrument 136, and B signal level conversion instrument 137 in the fourth embodiment. Moreover, an example of the control instrument of the present invention is equivalent to a portion equivalent to the switching signal generation instrument 104, first selection instrument 138, second selection instrument 139, and third selection instrument 140 in this fourth embodiment, and the first selection instrument 105 described in the third embodiment. Furthermore, an example of the display instrument of the present invention is equivalent to the white color component detection instrument 107, white display element driving instrument 108, white display unit 109, RGB display element driving instrument 110, and RGB display unit 111 in the fourth embodiment.

Moreover, an example of three primary colors of the present invention is equivalent to an R (red) color, a G (green) color, and a B (blue) color in this fourth embodiment. An example of chrominance signals of the present invention is equivalent to RGB signals in this fourth embodiment, and an example of the predetermined color component of the present invention is equivalent to yellow, magenta, and cyan in this fourth embodiment.

About the other points, since they are the same as those of the second embodiment, explanation is omitted.

Next, an example of a display method of the present invention will be also concurrently explained with the operation of such display apparatus of the fourth embodiment. In addition, detailed explanation of the same points as the second embodiment is omitted.

The RGB signals inputted from an apparatus, which displays an image on the display apparatus 141, such as a personal computer, DVD equipment, or a TV receiver are inputted into the color component separation and detection instrument 134. In addition, the R signal among the RGB signals inputted is inputted into the R signal level conversion instrument 135 and first selection instrument 138, the G signal among the RGB signals inputted is inputted into the G signal level conversion instrument 136 and second selection instrument 139, and the B signal among the RGB signals inputted is inputted into the B signal level conversion instrument 137 and third selection instrument 140.

The color component separation and detection instrument 134 outputs 1 to the first selection instrument 138 as a cyan color component detection signal, when the cyan color component is included in the RGB signals inputted, and outputs 0 to the first selection instrument 138 as the cyan color component detection signal when the cyan component is not included in the RGB signals inputted.

In addition, the color component separation and detection instrument 134 outputs 1 to the second selection instrument 139 as a magenta color component detection signal, when the magenta color component is included in the RGB signals inputted, and outputs 0 to the second selection instrument 139 as the magenta color component detection signal when the magenta component is not included in the RGB signals inputted.

In addition, the color component separation and detection instrument 134 outputs 1 to the third selection instrument 140 as a yellow color component detection signal, when the yellow color component is included in the RGB signals inputted, and outputs 0 to the third selection instrument 140 as the yellow color component detection signal when the yellow color component is not included in the RGB signals inputted. The detection of the cyan color, magenta color, and yellow color by this color component separation and detection instrument 134 is equivalent to an example of the color detection step of the present invention.

On the other hand, the R signal level conversion instrument 135 performs the first color correction of lowering a signal level of a red color, which is a complementary color of a cyan color component, to an R signal inputted, and the second color correction of increasing a red signal level. Then, it outputs to the first selection instrument 138 the R signal which is given color correction by either color correction of the first color correction and second color correction on the basis of the switching signal outputted from the switching signal generation instrument 104.

Then, the first selection instrument 138 selects the R signal outputted from the R signal level conversion instrument 135 when the cyan color component detection signal outputted from the color component separation and detection instrument 134 is 1, that is, a cyan color component is included in the RGB signals which is inputted into the display apparatus 141, and outputs it to the white color component detection instrument 107 and RGB display element driving instrument 110. On the other hand, the first selection instrument 138 selects the R signal among the RGB signals, which is inputted into the display apparatus 141, when the cyan color component detection signal outputted from the color component separation and detection instrument 134 is 0, that is, a cyan color component is not included in the RGB signals which is inputted into the display apparatus 141, and outputs it to the white color component detection instrument 107 and RGB display element driving instrument 110.

The G signal level conversion instrument 136 performs the first color correction of lowering a signal level of a green color, which is a complementary color of a magenta color component, to a G signal inputted, and the second color correction of increasing a green signal level. Then, it outputs to the second selection instrument 139 the G signal which is given color correction by either color correction of the first color correction and second color correction on the basis of the switching signal outputted from the switching signal generation instrument 104.

Then, the second selection instrument 139 selects the G signal outputted from the G signal level conversion instrument 136 when the magenta color component detection signal outputted from the color component separation and detection instrument 134 is 1, that is, a magenta color component is included in the RGB signals which is inputted into the display apparatus 141, and outputs it to the white color component detection instrument 107 and RGB display element driving instrument 110. On the other hand, the second selection instrument 139 selects the G signal among the RGB signals, which is inputted into the display apparatus 141, when the magenta color component detection signal outputted from the color component separation and detection instrument 134 is 0, that is, a magenta color component is not included in the RGB signals which is inputted into the display apparatus 141, and outputs it to the white color component detection instrument 107 and RGB display element driving instrument 110.

The B signal level conversion instrument 137 performs the first color correction of lowering a signal level of a blue color, which is a complementary color of a yellow color component, to a B signal inputted, and the second color correction of increasing a blue signal level. Then, it outputs to the third selection instrument 140 the B signal which is given color correction by either color correction of the first color correction and second color correction on the basis of the switching signal outputted from the switching signal generation instrument 104.

Then, the third selection instrument 140 selects the B signal outputted from the B signal level conversion instrument 137 when the yellow color component detection signal outputted from the color component separation and detection instrument 134 is 1, that is, a yellow color component is included in the RGB signals which is inputted into the display apparatus 141, and outputs it to the white color component detection instrument 107 and RGB display element driving instrument 110. On the other hand, the third selection instrument 140 selects the B signal among the RGB signals, which is inputted into the display apparatus 141, when the yellow color component detection signal outputted from the color component separation and detection instrument 134 is 0, that is, a yellow color component is not included in the RGB signals which is inputted into the display apparatus 141, and outputs it to the white color component detection instrument 107 and RGB display element driving instrument 110. Each first color correction and second color correction by the R signal level conversion instrument 135, G signal level conversion instrument 136, and B signal level conversion instrument, which are mentioned above, are equivalent to an example of the color correction step of the present invention. Moreover, it is equivalent to an example of the control step of the present invention to select any one of a signal which is given the first color correction, a signal which is given the second color correction, and an inputted signal in each signal of an R signal, a B signal, and a G signal on the basis of the switching signal and the signal from the color component separation and detection instrument 134.

The operation of the white color component detection instrument 107, white display element driving instrument 108, white display unit 109, RGB display element driving instrument 110, and RGB display unit 111 is the same as that of what were explained in the background art.

In this way, an image is displayed on a display screen.

Here, since the RGB signals including both a yellow color component and a magenta color component, RGB signals including both a yellow color component and a cyan component, and RGB signals including both a magenta component and a cyan component do not exist, two or more of the yellow color component detection signal, magenta color component detection signal, and a cyan color component detection signal never take 1. Thus, there is only either a case that all values of the yellow color component detection signal, magenta color component detection signal, and cyan color component detection signal become 0, or a case that any one signal takes 1.

Hence, display is performed as follows by using the switching signal generation instrument 104 of FIG. 9 as the switching signal generation instrument 104. Thus, a region, where the yellow color component, magenta color component, or cyan color component is included, in a display screen is alternately displayed, for example as a checkered pattern or the like, which is constituted of the RGB signals where saturation is increased, and the RGB signals where the white color component is increased, with a 2-pixels V×2-pixels H region as a block, and when attention is paid to one pixel, it is also alternately displayed with the RGB signals where saturation is increased every frame, and the RGB signals where the white color component is increased.

In this way, alternating display is performed like a checkered pattern or the like with a 2-pixels V×2-pixels H region as a block in a region of the display screen where the yellow color component, magenta color component, or cyan color component is included in the inputted RGB signals, that is, a region of the display screen where a plurality of pixels having the yellow color component, magenta color component, or cyan color component in the inputted RGB signals exist adjacently.

In this way, height difference in saturation is given to a region of the screen by performing display every pixel of the region in the region of the display screen, where the yellow color component, magenta color component, or cyan color component is included in the inputted RGB signals, using either of the RGB signals where saturation is increased, and the RGB signals where the white color component is increased.

In addition, the region on a display screen where the yellow color component, magenta color component, or cyan color component is included may be alternately displayed, for example, as a checkered pattern or the like with a 2-pixels V×2-pixels H region as a block, and alternating display may not be performed every frame. In addition, such a region may be displayed in one frame with either of the RGB signals, where saturation is increased, and the RGB signals where the white color component is increased, and alternating display may be performed with the RGB signals, where saturation is increased, and the RGB signals, where the white color component is increased, every frame.

However, in the case of displaying with either of the RGB signals where saturation is increased, and the RGB signals, where the white color component is increased, in one frame, and performing the alternating display with the RGB signals where saturation is increased, and the RGB signals, where the white color component is increased, every frame, a flicker arises when the number of frames displayed in 1 second is small, and hence, it is necessary to enlarge sufficiently the number of frames displayed in 1 second. In addition, in this fourth embodiment, when attention is paid to a specific pixel, the yellow pixel 115 and white pixel 116 were switched and displayed every frame, but in the case of the interlace mode, it may be performed per field. For example, when one frame is displayed with an odd number field and an even number field, the switching of a specific pixel is performed every two fields.

As mentioned above, in the third embodiment, even if a bright yellow (yellow with low saturation), that is, pastel yellow image portion being surrounded by white or being adjacent to white, it was possible to decrease the sense of incongruity that visible color appears differently such as the pastel yellow image portion seeming greenish and the like.

In addition, in the fourth embodiment, it is possible to decrease the sense of incongruity that visible color appears differently, also about bright yellow (yellow with low saturation), that is, pastel yellow, or bright magenta (magenta with low saturation), that is, pastel magenta, and bright cyan (cyan with low saturation), that is, pastel cyan, even if its image portion is surrounded by white or is adjacent to white.

In addition, although it was explained in this fourth embodiment that the sense of incongruity of appearance of yellow, magenta, and cyan was decreased, it is also possible to decrease the sense of incongruity of appearance of two or one of these three colors. For example, when decreasing the sense of incongruity of appearance of only magenta, it is not necessary to provide the R signal level conversion instrument 135, first selection instrument 138, B signal level conversion instrument 137, and third selection instrument 140.

Embodiment 5

Next, the fifth embodiment will be described.

In the fifth embodiment, a display apparatus will be explained which, even if a bright yellow (yellow with low saturation), that is, pastel yellow image portion being surrounded by white or being adjacent to white, can decrease the sense of incongruity that visible color appears differently such as the pastel yellow image portion seeming greenish and the like by performing color correction according to whether a display portion fulfills a predetermined condition.

Figure 14:
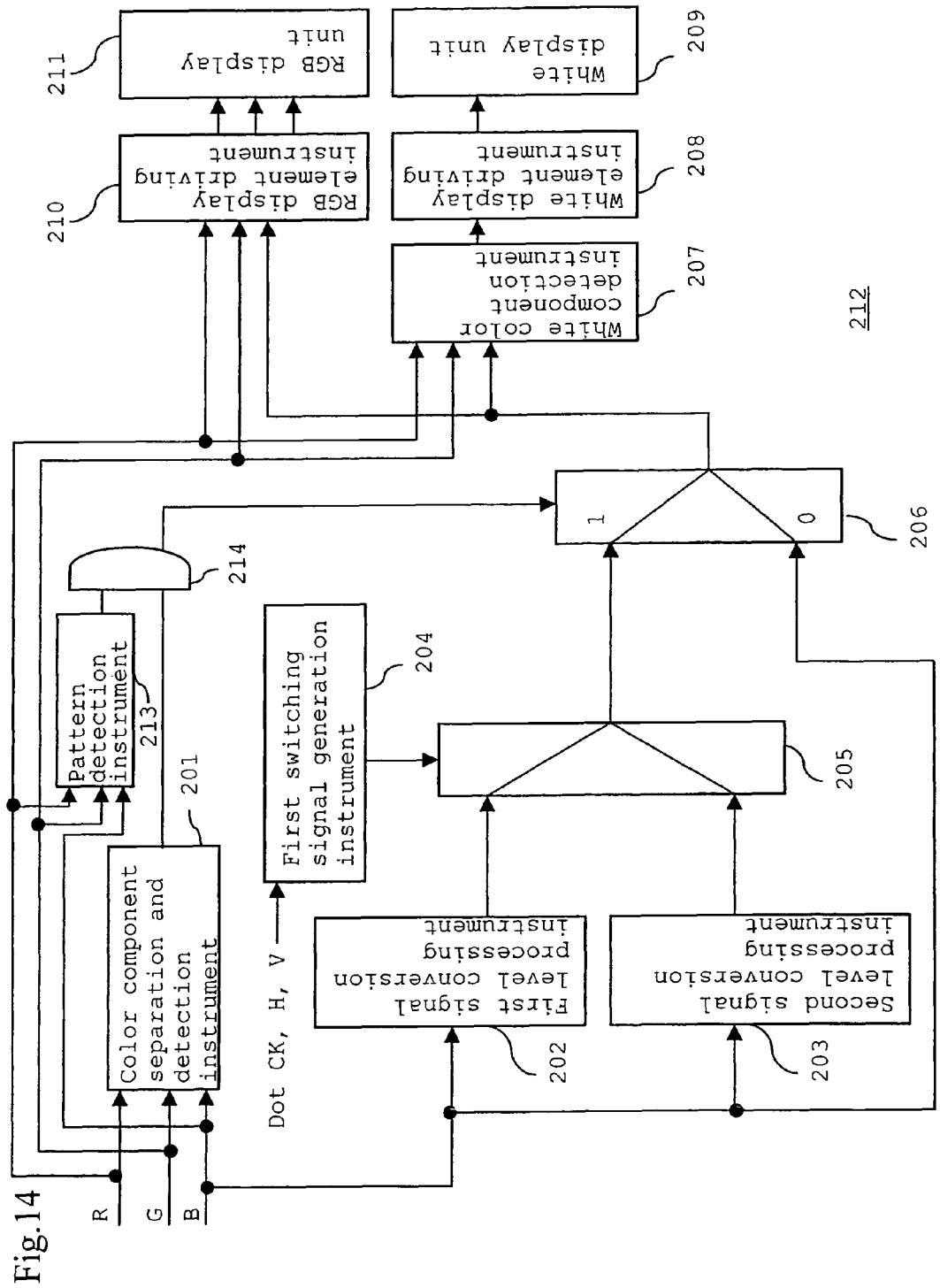
FIG. 14 is a block diagram showing the structure of a display apparatus in a fifth embodiment of the present invention.

FIG. 14 is a block diagram showing the structure of a display apparatus 212 of the fifth embodiment.

The display apparatus 212 is constituted of color component separation and detection instrument 201, first signal level conversion processing instrument 202, second signal level conversion processing instrument 203, first switching signal generation instrument 204, first selection instrument 205, second selection instrument 206, white color component detection instrument 207, white display element driving instrument 208, a white display unit 209, RGB display element driving instrument 210, an RGB display unit 211, pattern detection instrument 213, and an arithmetic unit 214.

The color component separation and detection instrument 201 is the instrument which performs the separation and detection of a yellow color component, when the yellow color component is included in RGB signals inputted.

The first signal level conversion processing instrument 202 is the instrument which inputs a B signal among the RGB signals inputted, and performs the conversion of lowering a signal level of a blue color, which is a complementary color of a yellow color component, to the B signal.

The second signal level conversion processing instrument 203 is the instrument which inputs a B signal among the RGB signals inputted, and performs the conversion of increasing a signal level of a blue color, which is a complementary color of a yellow color component, to the B signal.

The first switching signal generation instrument 204 is the instrument which outputs a signal for the first selection instrument 205 selecting either the B signal outputted from the first signal level conversion processing instrument 202 or the B signal outputted from the second signal level conversion processing instrument 203.

The first selection instrument 205 is the instrument which selects and outputs either the B signal outputted from the first signal level conversion processing instrument 202 or the B signal outputted from the second signal level conversion processing instrument 203 on the basis of the signal outputted from the switching signal generation instrument 204.

The second selection instrument 206 is the instrument which selects and outputs either of the B signal outputted from the first selection instrument 205, and the B signal among the RGB signals inputted into the display apparatus 212 on the basis of an output of the arithmetic unit 214.

The pattern detection instrument 213 is the instrument which detects whether an input signal displayed on a plurality of pixels fulfills the predetermined condition.

The arithmetic unit 214 is the instrument which makes the detection result of the yellow color component of the color component separation and detection instrument 201, and the result of the pattern detection instrument 213 as an input, and performs logical operation.

In addition, since the white color component detection instrument 207, white display element driving instrument 208, white display unit 209, RGB display element driving instrument 210, and RGB display unit 211 are the same as those of what are explained in the background art, explanation is omitted.

Furthermore, an example of the color detection instrument of the present invention is equivalent to the color component separation and detection instrument 201 in this fifth embodiment. Moreover, an example of the color correction instrument of the present invention is equivalent to the first signal level conversion processing instrument and second signal level conversion processing instrument in this fifth embodiment. In addition, an example of the judging instrument of the present invention is equivalent to the pattern detection instrument 213 in this fifth embodiment, and an example of the control instrument of the present invention is equivalent to the arithmetic unit 214, first switching signal generation instrument 204, first selection instrument, and second selection instrument 206 in this fifth embodiment. Furthermore, an example of the display instrument of the present invention is equivalent to the white color component detection instrument 207, white display element driving instrument 208, white display unit 209, RGB display element driving instrument 210, and RGB display unit 211 of this fifth embodiment.

Moreover, the R (red) color, G (green) color, and B (blue) color of this fifth embodiment are examples of the three primary colors of the present invention, the RGB signals of this fifth embodiment are examples of the chrominance signals of the present invention, and the yellow of this fifth embodiment is an example of the predetermined color component of the present invention.

Next, an example of a display method of the present invention will be also concurrently explained with the operation of the display apparatus, having the above-mentioned structure, in this fifth embodiment.

The RGB signals inputted from an apparatus, which displays an image on the display apparatus 212, such as a personal computer, DVD equipment, or a TV receiver are inputted into the color component separation and detection instrument 201 and pattern detection instrument 213. In addition, the B signal among the RGB signals inputted is inputted into the first signal level conversion processing instrument 202, second signal level conversion processing instrument 203, and second selection instrument 206. Furthermore, the R signal and G signal among the RGB signals inputted are inputted into the white color component detection instrument 207 and RGB display element driving instrument 210.

The color component separation and detection instrument 201 detects whether the RGB signals which are inputted include the yellow color component (this is equivalent to an example of the color detection step of the present invention).

An example of the RGB signals is shown in FIG. 5. The R signal which expresses red, the G signal which expresses green, and the B signal which expresses blue are signals which can take 256 kinds of values from 0 to 255 respectively, and the larger this value is, the brighter color is expressed. The green color component 31, yellow color component 32, and white color component 33 are included in the RGB signals of FIG. 5.

It is possible to perform the detection of the yellow color component from the RGB signals, by detecting the case that both of a value of the R signal and a value of the G signal are larger than a value of the B signal. Thus, the yellow color component is included in the RGB signals when both of the value of the R signal and the value of the G signal are larger than the value of the B signal.

The color component separation and detection instrument 201 outputs 1 when the yellow color component is included in the RGB signals, and it outputs 0 when the yellow color component is not included in the RGB signals. Then, the output of the color component separation and detection instrument 201 is inputted into the arithmetic unit 214.

The pattern detection instrument 213 outputs 1, when an input signal displayed on a plurality of pixels does not fulfill a predetermined condition, and it outputs 0 when fulfilling (it is equivalent to an example of the decision step of the present invention). Then, the output of the pattern detection instrument 213 is inputted into the arithmetic unit 214. In addition, the operation of the pattern detection instrument 213 will be described later.

The arithmetic unit 214 outputs the AND of the detection result of the yellow color component of the color component separation and detection instrument 1, and the result of the pattern detection instrument 213, which is inputted into the second selection instrument 206.

On the other hand, the first signal level conversion processing instrument 202 inputs the B signal among the RGB signals inputted into the display apparatus 212, and performs the conversion of lowering a signal level of a blue color which is a complementary color of the yellow color component. In other words, the first signal level conversion processing instrument 202 performs the conversion of increasing saturation when the yellow color component is included in the RGB signals inputted into the display apparatus 212.

FIG. 2(a) shows the conversion processing which the first signal level conversion processing instrument 202 performs to the B signal. Thus, the horizontal axis of FIG. 2(a) shows the value of the B signal inputted into the first signal level conversion processing instrument 202, and the vertical axis shows the value of the B signal after the first signal level conversion processing instrument 202 performs the conversion processing. The first signal level conversion processing instrument 202 has stored beforehand a conversion table for performing the conversion processing shown in FIG. 2(a), and performs the conversion processing of FIG. 2(a) using the conversion table. In addition, although it was explained that the first signal level conversion processing instrument 202 performed the conversion processing shown in FIG. 2(a) using the conversion table, it is not limited to this. For example, the conversion processing of FIG. 2(a) may be performed using a method other than the conversion table, such as performing the conversion processing shown in FIG. 2(a) by data processing by hardware or software.

Apparently from FIG. 2(a), when the value of the B signal inputted into the first signal level conversion processing instrument 202 is smaller than a predetermined value, the value of the B signal outputted from the first signal level conversion processing instrument 202 is set at 0. Then, when the value of the B signal inputted into the first signal level conversion processing instrument 202 is larger than the predetermined value, the value of the B signal outputted from the first signal level conversion processing instrument 202 is set at a value larger than 0, but it is set at a value smaller than the value of B signal inputted into the first signal level conversion processing instrument 202.

In this way, since the first signal level conversion processing instrument 202 converts the value of the B signal inputted as shown in FIG. 2(a), the value of the B signal in the RGB signals outputted from the first signal level conversion processing instrument 202 becomes small in comparison with the RGB signals at the time of an input. This B signal outputted from the first signal level conversion processing instrument 202 is made a first B signal.

Thus, when the RGB signals inputted into the display apparatus 212 include the yellow color component 32 as shown in FIG. 5, RGB signals are newly constituted of the first B signal, outputted from the first signal level conversion processing instrument 202, and the R signal and G signal which are inputted into the display apparatus 212. The constituted RGB signals become signals where saturation is increased in comparison with the RGB signals inputted into the display apparatus 212, since the yellow color component 32 increases and the white color component 33 decreases. The color correction of increasing saturation like this is equivalent to an example of the first color correction of the present invention, and let these RGB signals, where saturation increases, be first RGB signals, which are equivalent to examples of the first chrominance signals of the present invention.

In addition, the second signal level conversion processing instrument 203 performs the conversion of increasing a signal level of a blue color, which is a complementary color of the yellow color component, to the B signal among the RGB signals inputted into the display apparatus 212. In other words, the second signal level conversion processing instrument 203 performs the conversion of increasing a white color component when the yellow color component is included in the RGB signals inputted into the display apparatus 212.

FIG. 2(b) shows the conversion processing which the second signal level conversion processing instrument 203 performs to the B signal. Thus, the horizontal axis of FIG. 2(b) shows the value of the B signal inputted into the second signal level conversion processing instrument 203, and the vertical axis shows the value of the B signal after the third signal level conversion processing instrument 203 performs the conversion processing. The second signal level conversion processing instrument 203 has stored beforehand a conversion table for performing the conversion processing shown in FIG. 2(b), and performs the conversion processing of FIG. 2(b) using the conversion table. In addition, although it was explained that the second signal level conversion processing instrument 203 performed the conversion processing shown in FIG. 2(b) using the conversion table, it is not limited to this. For example, the conversion processing of FIG. 2(b) may be performed using a method other than the conversion table, such as performing the conversion processing shown in FIG. 2(b) by data processing by hardware or software.

Since the second signal level conversion processing instrument 203 converts the value of the B signal inputted as shown in FIG. 2(b), the value of the second B signal in the RGB signals outputted from the second signal level conversion processing instrument 203 becomes large in comparison with the B signals at the time of an input. Thus, when the RGB signals inputted into the display apparatus 212 include the yellow color component 32, RGB signals are newly constituted of the B signal, outputted from the second signal level conversion processing instrument 203, and the R signal and G signal which are inputted into the display apparatus 212. The constituted RGB signals become signals where the white color component increases in comparison with the RGB signals inputted into the display apparatus 212. In addition, the B signal outputted from the second signal level conversion processing instrument 203 is made a second B signal. Furthermore, the color correction of increasing the white color component is equivalent to an example of the second color correction of the present invention, and let these RGB signals, where the white color component increases, be second RGB signals, which are equivalent to examples of the second chrominance signals of the present invention. Moreover, the conversion of the B signal level by the first signal level conversion instrument 202 and second signal level conversion instrument 203 is equivalent to an example of the color correction step of the present invention.

The first switching signal generation instrument 204 generates a switching signal using the dot clock, horizontal synchronizing signal, and vertical synchronizing signal for determining the timing when the RGB display element driving instrument 210 and white display element driving instrument 208 of the display apparatus 212 drives the RGB display unit 211 and white display unit 209, and outputs it to the first selection instrument 205. This switching signal is a signal of taking a value of either 1 or 0. In addition, the operation of the first switching signal generation instrument 204 will be described later.

The first selection instrument 205 selects the first B signal outputted from the first signal level conversion processing instrument 202 when the value of the switching signal outputted from the first switching signal generation instrument 204 is 1, and outputs it to the second selection instrument 206, and selects the second B signal outputted from the second signal level conversion processing instrument 203 when the value of the switching signal is 0, and outputs it to the second selection instrument 206.

When the value of the signal which the arithmetic unit 214 outputs is 1, that is, when the yellow color component is included and the predetermined condition is not fulfilled, the second selection instrument 206 selects the first or second B signal outputted from the first selection instrument 205, and outputs it to the RGB display element driving instrument 210 and white color component detection instrument 207.

When the value of the signal which the arithmetic unit 214 outputs is 0, that is, when the yellow color component is not included or the predetermined condition is fulfilled, the second selection instrument 206 outputs the B signal among the RGB signals, inputted into the display apparatus 212, without conversion processing to the RGB display element driving instrument 210 and white color component detection instrument 207. This B signal outputted without conversion processing is made a third B signal. Moreover, let RGB signals, which are constituted of this B signal, which is not given the conversion processing, and the R signal and G signal, which are inputted into the display apparatus 212, be third chrominance signals, which is an example of chroma signals which are not given the color correction of the present invention. In addition, the selection of the first B signal or second B signal by the switching signal mentioned above, and the selection of the first B signal, second B signal or third B signal by the second selection instrument 206 are equivalent to an example of the control step of the present invention.

Thus, the R signal and G signal which are inputted into the display apparatus 201, and one of the first to third B signals outputted from the second selection instrument 206 are inputted into the RGB display element driving instrument 210 and white color component detection instrument 207. Then, the white color component detection instrument 207 and RGB display element driving instrument 210 process the R signals, G signal, and B signal as a new RGB signal.

In addition, the operation of the white color component detection instrument 207, white display element driving instrument 208, white display unit 209, RGB display element driving instrument 210, and RGB display unit 211 is the same as that of what were explained in the background art.

As mentioned above, an image is displayed on a display screen.

By the way, the switching signal which the first switching signal generation instrument 204 outputs is, for example, such a signal that the value of the switching signal becomes 0 in a pixel adjacent to a certain pixel in a horizontal direction when the value of the switching signal is 1 to the certain pixel, and, the value of the switching signal becomes 1 in a further horizontally adjacent pixel. Thus, when attention is paid to a horizontal pixel row, the switching signal takes 0 and 1 in turn. Similarly, when attention is paid to a vertical pixel column, the switching signal takes 0 and 1 in turn.

Figure 15:
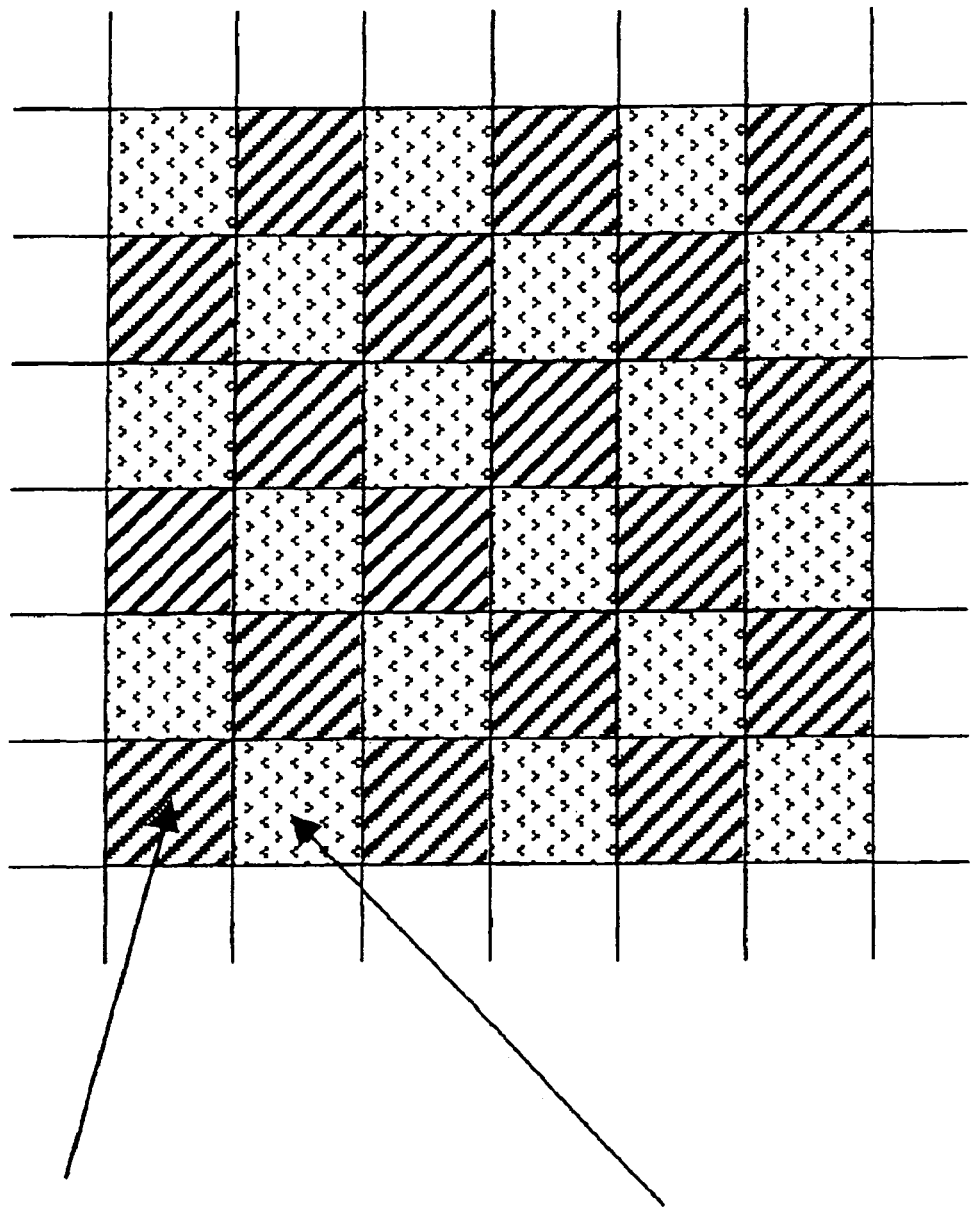
FIG. 15 is a drawing showing a display example of a region of a display screen, where a yellow color component is included, in the fifth embodiment of the present invention.

Hence, as shown in FIG. 15, yellow pixels 218 where the first RGB signals are displayed, and white pixels 219 where the second RGB signals are displayed will be alternately displayed (displayed in a checkered pattern) in a region of the display screen where the yellow color component is included in the inputted RGB signals, that is, a region of the display screen where a plurality of pixels having a yellow color component in the inputted RGB signals exist adjacently.

In this way, the display apparatus 212 gives the height difference in saturation to the region of the display screen by performing display every pixel of the region in the region of the display screen, where the yellow color component is included in the inputted RGB signals, using either of the first RGB signals where saturation is increased, and the second RGB signals where the white color component is increased.

Hence, for example, bright yellow (yellow with low saturation), that is, pastel yellow is displayed with the yellow pixels 218 whose saturation is increased more, and the white pixels 219 where the white color component is increased more. Hence, it will be felt to human eyes by the storage effect of human eyes that bright yellow (yellow with low saturation), that is, pastel yellow is displayed.

Further, since it is possible to increase the brightness of an image portion by displaying bright yellow (yellow with low saturation), that is, pastel yellow by the alternating display with the yellow whose saturation is increased more, and the yellow where the white color component is increased more, even if the image portion being surrounded by white or being adjacent to white, it is possible to decrease the sense of incongruity that visible color appears differently such as the pastel yellow image portion seeming greenish and the like.

In addition, although bright yellow (yellow with low saturation), that is, pastel yellow is expressed by the alternating display of the yellow pixels 218 and the white pixels 219 every pixel for a region of the display screen where the yellow color component is included in the inputted RGB signals in FIG. 15, an equivalent effect can be obtained also by temporally alternating display. That is, when a certain pixel is displayed with the first RGB signals, it is possible to perform display with the second RGB signal in the following frame.

That is, also when the first RGB signals, and second RGB signals are switched and displayed every frame temporally by switching the first B signal and second B signal every frame, it is possible to decrease the sense of incongruity that visible color appears differently as mentioned above. In this way, it is equivalent to an example of the control of the present invention to switch and display the first RGB signals and second RGB signals temporally.

Next, as mentioned above, the first switching signal generation instrument 204 will be described.

Figures 16A, 16B:
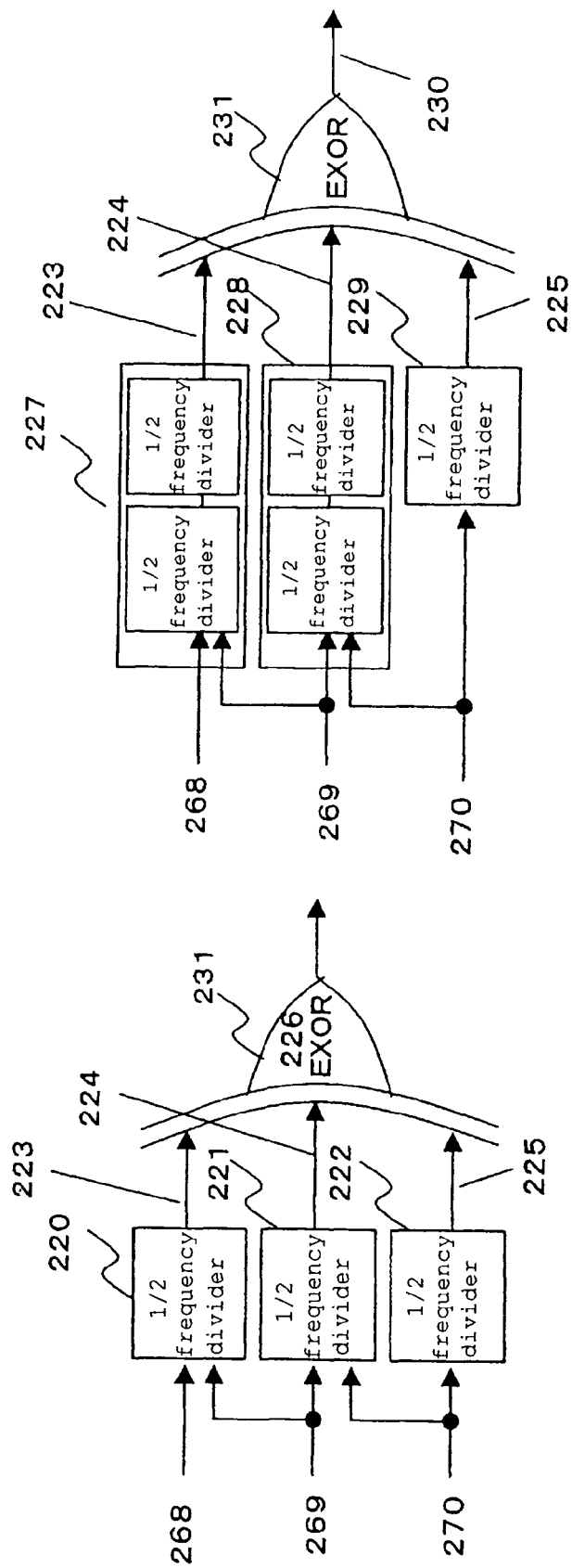
FIG. 16(a) is a drawing showing the structure of first switching signal generation instrument in the fifth embodiment of the present invention.
FIG. 16(b) is a drawing showing the structure of first switching signal generation instrument, which is different from that of FIG. 16(a), in the fifth embodiment of the present invention.

The structural example of the first switching signal generation instrument 204 is shown in FIG. 16(a). The first switching signal generation instrument 204 is constituted of a ½ frequency divider 220, a ½ frequency divider 221, a ½ frequency divider 222, and calculation instrument 231.

The ½ frequency divider 220 is the instrument which performs the ½-frequency dividing of a dot clock signal 268 inputted for the white display element driving instrument 208 and RGB display element driving instrument 210 to determine the timing of display every pixel, and outputs a pixel alternating signal 223.

The ½ frequency divider 221 is the instrument which performs the ½ frequency dividing of a horizontal synchronizing signal 269 inputted for the white display element driving instrument 208 and RGB display element driving instrument 210 to determine the timing of display every horizontal period, and outputs a line alternating signal 224.

The ½ frequency divider 222 is the instrument which performs the ½ frequency dividing of a vertical synchronizing signal 270 inputted for the white display element driving instrument 208 and RGB display element driving instrument 210 to determine the timing of display every frame, and outputs a frame alternating signal 225.

The calculation instrument 253 is the instrument which obtains the exclusive OR of the pixel alternating signal 223, line alternating signal 224, and frame alternating signal 225, and outputs the obtained exclusive OR as a switching signal 226.

Thus, the dot clock signal 268 is inputted into the ½ frequency divider 220, the ½ frequency divider 220 performs the frequency dividing of the dot clock signal 268, and outputs the pixel alternating signal 223.

In addition, the horizontal synchronizing signal 269 is inputted into the ½ frequency divider 220 and frequency divider 221. The ½ frequency divider 220 is reset in the initial state at the timing when the horizontal synchronizing signal 269 is inputted. Furthermore, the ½ frequency divider 221 performs the frequency dividing of the horizontal synchronizing signal 269, and outputs the line alternating signal 224.

Moreover, the vertical synchronizing signal 270 is inputted into the ½ frequency divider 221 and ½ frequency divider 222. The ½ frequency divider 221 is reset in the initial state when the vertical synchronizing signal 270 is inputted. In addition, the ½ frequency divider 222 performs the ½-frequency dividing of the vertical synchronizing signal 270, and outputs the frame alternating signal 225.

The calculation instrument 231 inputs the pixel alternating signal 223, line alternating signal 224, and frame alternating signal 225, obtains the exclusive OR of them, and outputs it as the switching signal 226.

Since the ½ frequency divider 220 and the ½ frequency divider 221 perform the ½ frequency dividing of the dot clock signal 268 and horizontal synchronizing signal 269 respectively, the switching signal 226 becomes what expresses a checkered pattern every frame. Thus, the switching signal 226 is a signal using the dot clock signal 268 inputted so as to determine the timing of display every pixel.

Since the first B signal or second B signal is switched and selected every pixel by the first selection instrument 205 using the first switching signal generation instrument 204 of FIG. 16(a), the first chrominance signals or second chrominance signals are displayed in turn spatially every pixel in a region, where the yellow color component is contained, in the display screen.

Moreover, when attention is paid to a specific pixel, when the yellow color component is contained in the display screen, the first chrominance signals and second chrominance signals are switched and displayed every frame.

Figure 17:
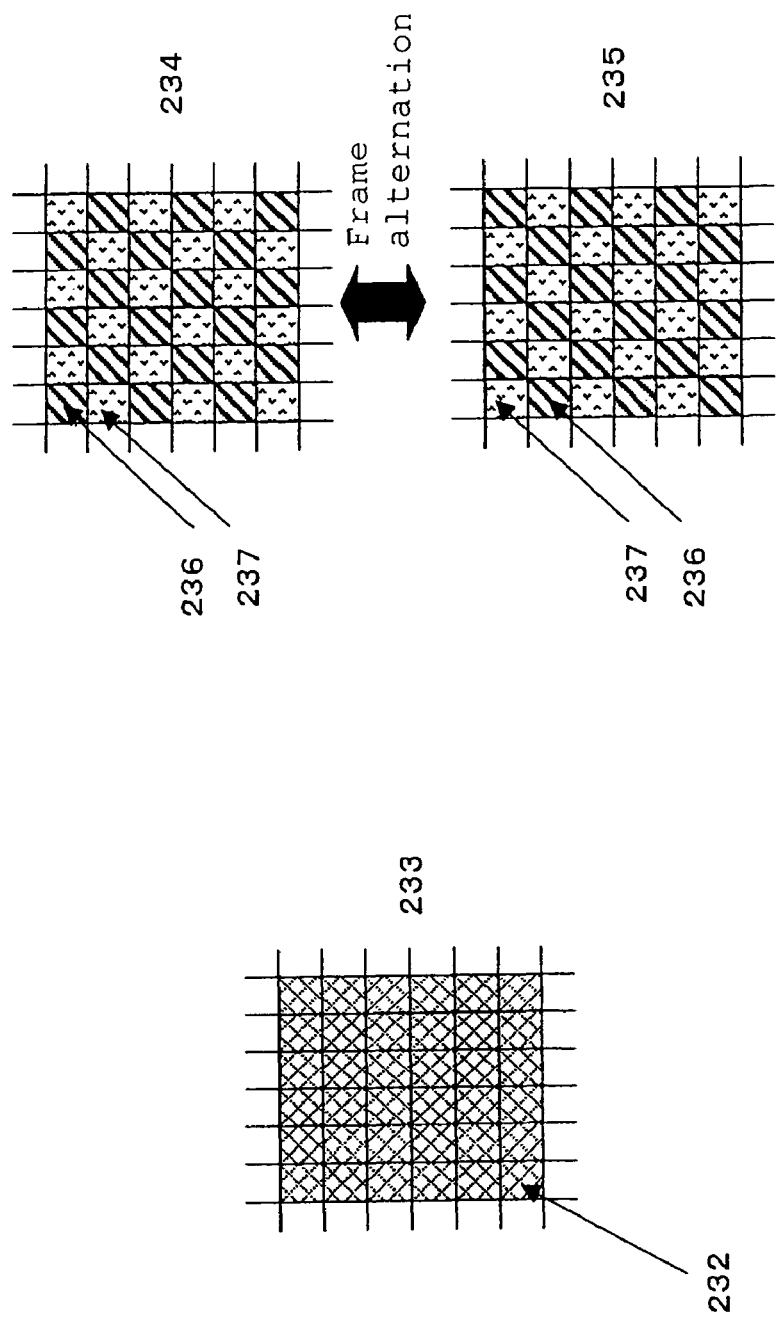
FIG. 17 includes drawings showing output result examples of a switching signal 226 in the fifth embodiment of the present invention.

An example of an output of the switching signal 226 is shown in FIG. 17.

A display region 233 is a region including pastel yellow pixels 232, a display region 234 is a display region at the time of a certain frame displayed by the first switching signal generation instrument 204, and a display region 235 is a display region at the time of the next frame of the display region 234 displayed by the first switching signal generation instrument 204.

As shown in FIG. 17, the yellow pixels 236 and white pixels 237 are alternately displayed in the checkered pattern in the display region 234 and display region 235, and when attention is paid to specific pixels, the yellow pixel 236 and white pixel 237 are switched and displayed in the display region 234 and display region 235. Here, the yellow pixel 236 is what the first RGB signals which is given the conversion processing so that saturation may increase are displayed, the white pixel 237 is what the second RGB signals which is given the conversion processing so that a white color component may increase is displayed.

Figure 18:
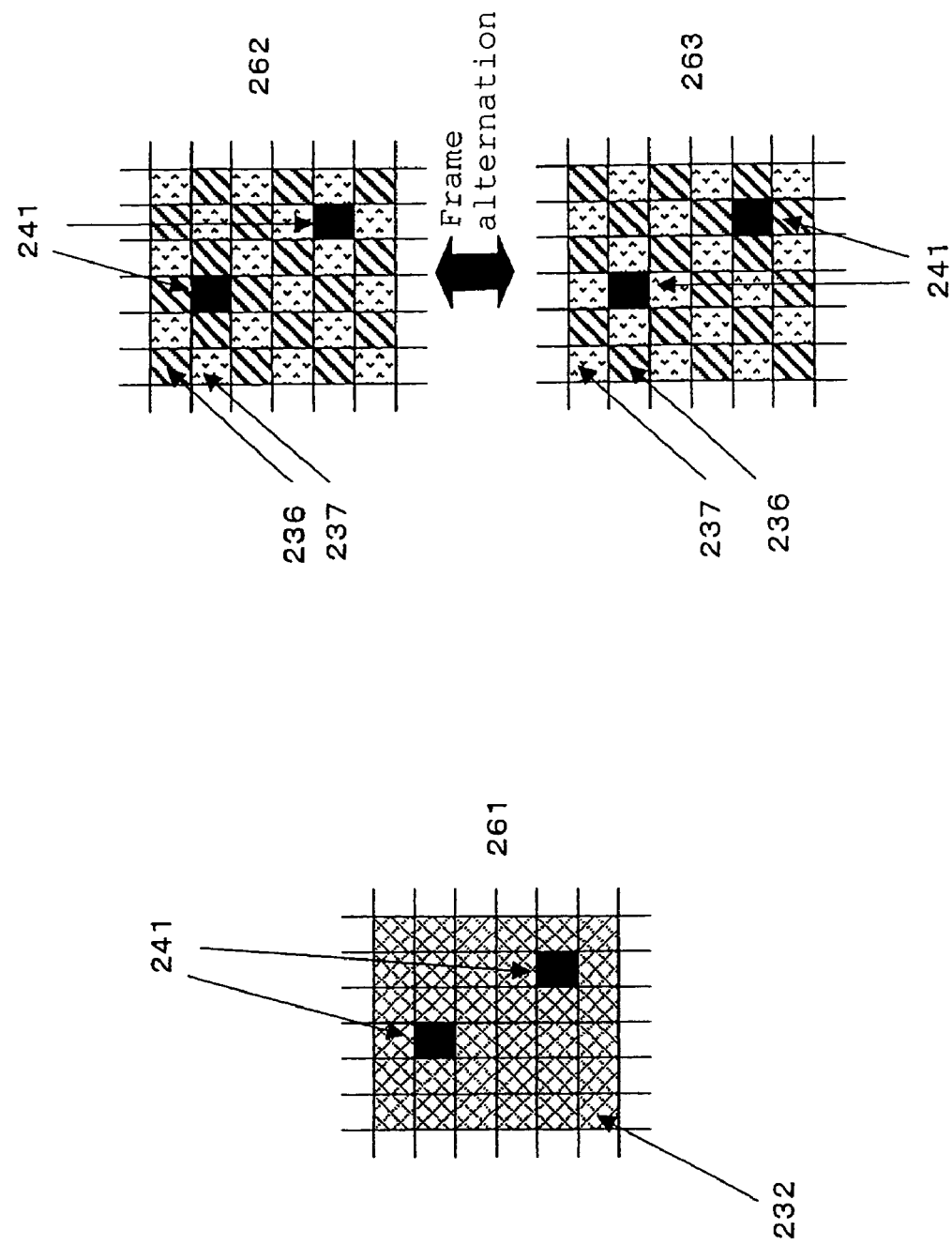
FIG. 18 includes drawings showing output result examples of the switching signal 226 in the case that a black pixel is included in a part of a display region of FIG. 17.

Moreover, the case where a display region contains a small number of black pixels 241 in a plurality of pastel yellow pixels 232 will be also described. A display region 261 of FIG. 18 shows a display region including a small number of black pixels 241 in a plurality of pastel yellow pixels 232. In addition, a display region 262 is a display region at the time of a certain frame which displays chrominance signals, which are displayed like the display region 261, by the display apparatus 212. Moreover, a display region 263 shows a display region at the time of the next frame of the display region 262.

As to a plurality of chrominance signals displayed on this display region 261, when the predetermined condition is not fulfilled, the first B signal or second B signal is selected by the first selection instrument 205 in turn, and as to a black signal which does not include a yellow color component, the third B chrominance signal which is not given correction is selected by the second selection instrument 206, which is combined with the R signal and G signal, and is displayed.

Here, since the selection of the first or second B signal by the first selection instrument is performed every pixel, this is also performed when the third B signal is selected and displayed by the second selection instrument 206. Therefore, assuming that there is no black pixel 241 temporarily and all the chrominance signals displayed in the display region 261 include the yellow color component as shown in the display region 262, the display device 212 displays the yellow pixels 236 and white pixels 237 in turn, and displays the black pixels 241 as it is. Displaying like this display region 262 is equivalent to an example of the control of the present invention.

In addition, FIG. 16(b) shows another structure of the first switching signal generation measure 204. The first switching signal generation instrument 204 of FIG. 16(b) is constituted of a frequency dividers 227 where two ½ frequency dividers are connected in series, a frequency divider 228 where two ½ frequency dividers are connected in series similarly to 227, a ½ frequency divider 229, and calculation instrument 231.

The frequency divider 227 is the instrument which repeats twice the ½-frequency dividing of the dot clock signal 268 inputted for the white display element driving instrument 208 and RGB display element driving instrument 210 to determine the timing of display every pixel, and outputs it as the pixel alternating signal 223.

The frequency divider 228 is the instrument which repeats twice the ½-frequency dividing of the horizontal synchronizing signal 269 inputted for the white display element driving instrument 208 and RGB display element driving instrument 210 to determine the timing of display every horizontal period, and outputs it as the line alternating signal 224.

The ½ frequency divider 222 is the instrument which performs the ½ frequency dividing of the vertical synchronizing signal 270 inputted for the white display element driving instrument 208 and RGB display element driving instrument 210 to determine the timing of display every frame, and outputs the frame alternating signal 225.

The calculation instrument 231 is the instrument which obtains the exclusive OR of the pixel alternating signal 223, line alternating signal 224, and frame alternating signal 225, and outputs the obtained exclusive OR as a switching signal 230.

Thus, the dot clock signal 268 is inputted into the frequency divider 227, the frequency divider 227 repeats twice the ½-frequency dividing using the dot clock signal 268 inputted, and outputs a generated signal as the pixel alternating signal 223.

In addition, the horizontal synchronizing signal 269 is inputted into the frequency divider 227 and frequency divider 228. The frequency divider 227 is reset in the initial state at the timing when the horizontal synchronizing signal 269 is inputted. In addition, the frequency divider 228 repeats twice the ½-frequency dividing using the horizontal synchronizing signal 269, and outputs the line alternating signal 224.

Furthermore, the vertical synchronizing signal 270 is inputted into the frequency divider 228 and the ½ frequency divider 229. The frequency divider 228 is reset in the initial state when the vertical synchronizing signal 270 is inputted. In addition, the ½ frequency divider 229 performs the ½-frequency dividing of the vertical synchronizing signal 270, and outputs the frame alternating signal 225.

The calculation instrument 231 inputs the pixel alternating signal 223, line alternating signal 224, and frame alternating signal 225, obtains the exclusive OR of them, and outputs it as the switching signal 230.

Figure 19:
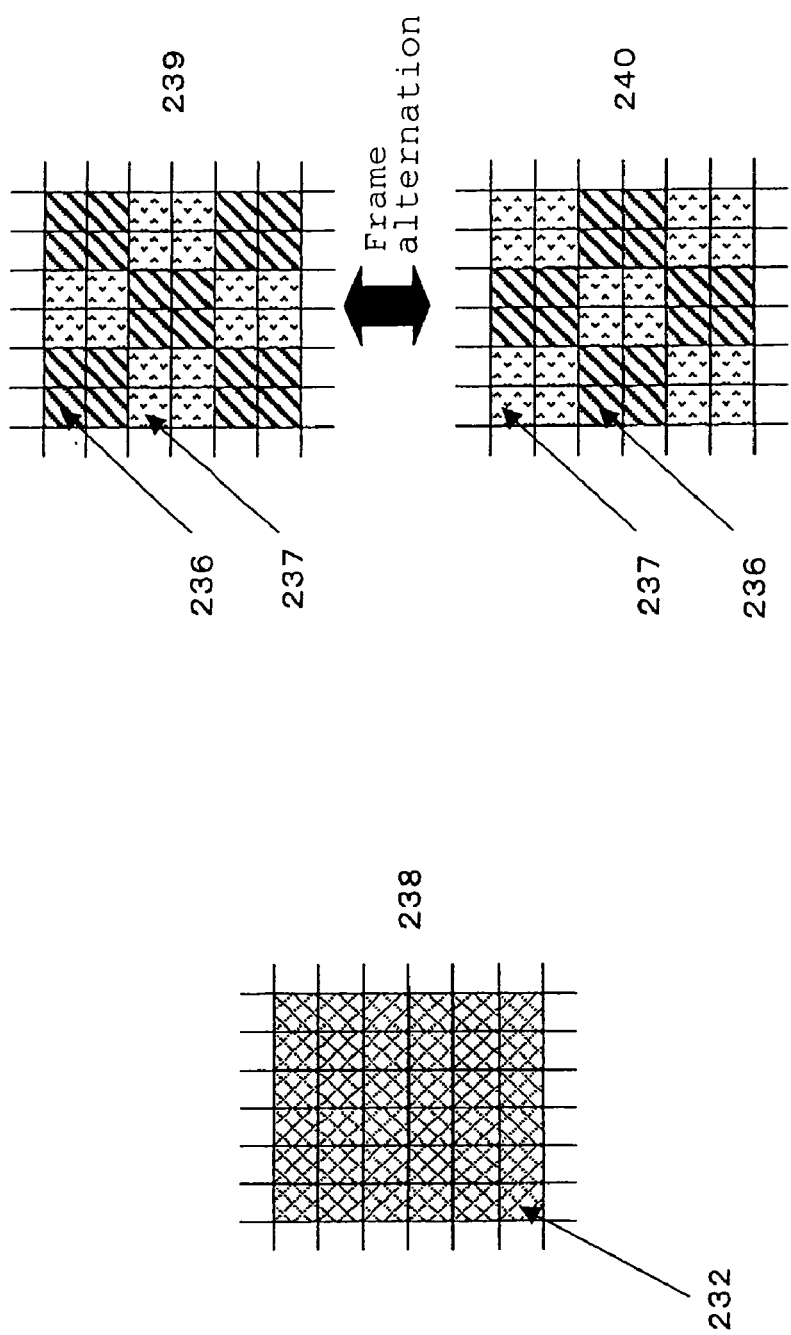
FIG. 19 includes drawings showing output result examples of a switching signal 231 in the fifth embodiment of the present invention.

An example of an output of the switching signal 230 is shown in FIG. 19.

A display region 238 is a region including the pastel yellow pixels 232, a display region 239 is a display region at the time of a certain frame displayed by the first switching signal generation instrument 204, and a display region 240 is a display region at the time of the next frame of the display region 239 displayed by the first switching signal generation instrument 204.

As shown in FIG. 19, the yellow pixels 236 and white pixels 237 are alternately displayed in the checkered pattern with a 2-pixels V×2-pixels H region as a block in the display region 239 and display region 240, and when attention is paid to a specific pixel, the yellow pixel 236 and white pixel 237 are switched and displayed in the display region 239 and display region 240.

In addition, in this fifth embodiment, when attention is paid to a specific pixel, the yellow pixel 236 and white pixel 237 were switched and displayed every frame, but in the case of the interlace mode, it may be performed per field. For example, when one frame is displayed with an odd number field and an even number field, the switching of a specific pixel is performed every two fields.

Next, as mentioned above, the pattern detection instrument 213 will be described, but before that, a problem at the time when not performing pattern detection will be described.

When an output of the second selection instrument 206 is display in the display region 233 where a plurality of pixels having the pastel yellow pixel 232 as shown in FIG. 17 exist adjacently using the switching signal 226 of FIG. 16(a), the pastel yellow pixel 232 is converted into the yellow pixel 236 and the white pixel 237, and the yellow pixel 236 and white pixel 237 are alternately displayed in a checkered pattern as the display region 234 and display region 235. Furthermore, since the display region 234 and display region 235 alternate every frame, an image into which the yellow pixel 236 and white pixel 237 are synthesized appears owing to a storage effect of human being's eyes.

Figure 20:
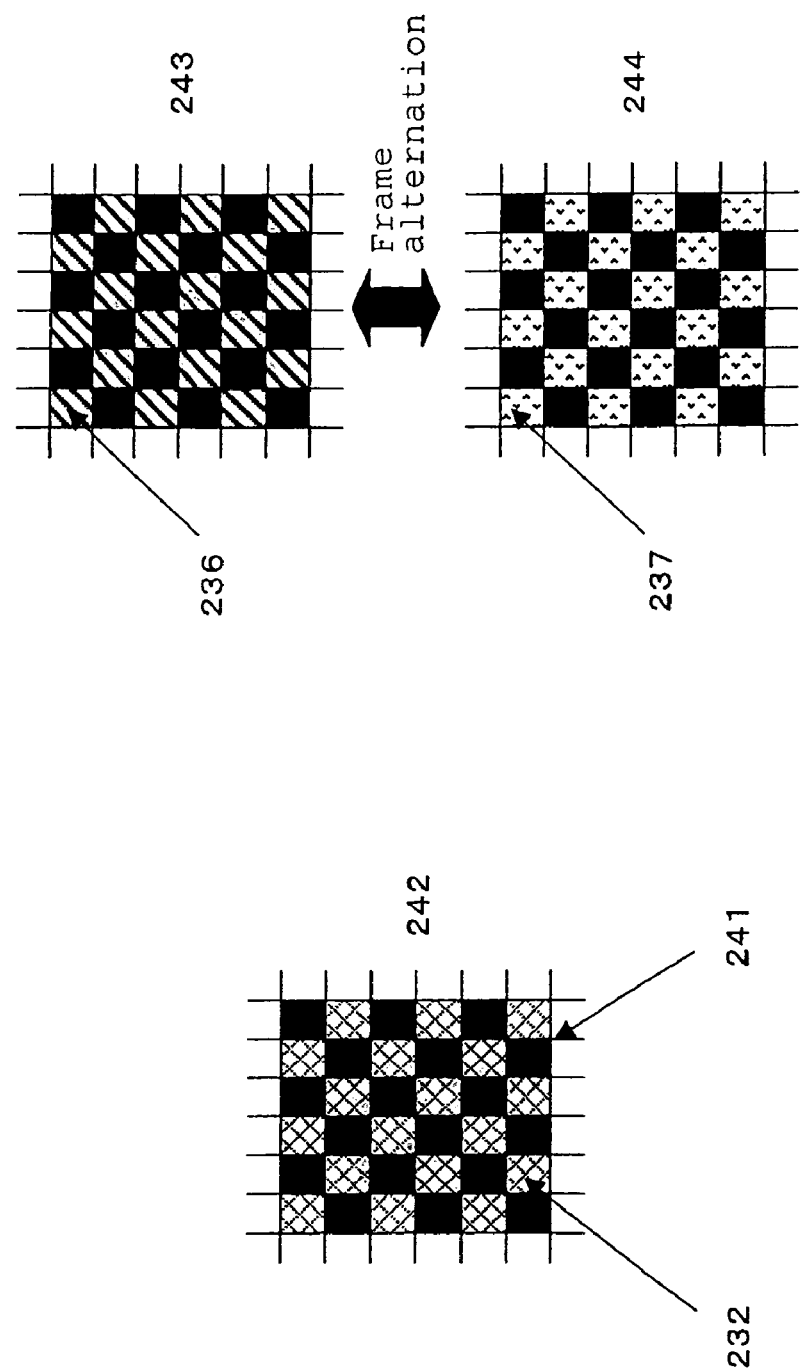
FIG. 20 includes drawings showing display examples of a display area, where a checkered pattern is constituted of pastel yellow pixels and black pixels, in the fifth embodiment of the present invention.

On the other hand, FIG. 20 shows an example of displaying an output of the second selection instrument 206 in the display region 242, where a checkered pattern is constituted of the pastel yellow pixels 232 and black pixels 241, using the switching signal 226 of FIG. 16(a). In addition, since the problem at the time when not performing pattern detection is described, the second selection instrument 206 selects the first B signal or second B signal from the first selection instrument 205 when a predetermined color component is detected, and it selects the third B signal, which is not given correction, when the predetermined color component is not detected.

A display region 243 is a display region at the time of a certain frame where an output of the second selection instrument 206 is displayed using the switching signal 226, and a display region 244 is a display region at the time of the next frame of the display region 243.

As shown in FIG. 20, when pixels originally having the pastel yellow pixel 232 exist every one pixel, in a frame of the display region 243, all the pastel yellow pixels 232 are converted into the yellow pixels 236, and the yellow pixels 236 and black pixels 241 are alternately displayed in a checkered pattern. This is because the third chrominance signals (black) which are not given the color correction are displayed because the third B signal which is not given the correction is selected in the second selection instrument 206 since the chrominance signals corresponding to the black pixel 241 does not include a yellow color component. Moreover, since the black pixel 241 does not have luminance and saturation, that is, the display region 243 becomes a screen which is constituted of only yellow pixels 236.

In addition, in a frame of the display region 244, all the pastel yellow pixels 232 are converted into the white pixels 237, and the white pixels 237 and black pixels 241 are alternately displayed in a checkered pattern. Thus, the display region 244 becomes a screen which is constituted of only the white pixels 237.

Then, since the display region 243 and display region 244 alternate every frame, a display region, which is constituted of only the yellow pixels 236, and a display region which is constituted of only white pixels 237 alternate in a frame. In this case, since the whole display region is constituted of only the yellow pixels 236 or white pixels 237, it appears a flicker when frame alternating is performed.

In order to solve this problem, the pattern detection instrument 213 detect whether a plurality of RGB signals displayed on a display region fulfill a predetermined condition. This predetermined condition is, for example, a case of spatial arrangement like a display region 242 shown in FIG. 20. Thus, it is a case that a pixel which was the pastel yellow pixel 232 is constituted of only the yellow pixel 236 or only the white pixel 237 as a display result of the display apparatus 212 displaying. As is evident from this example, it is necessary according to the first switching signal generation instrument 204 to change the predetermined condition judged by the pattern detection instrument 213.

In addition, as for the example of being given the first switching signal generation instrument 204 of FIG. 16(a), the spatial arrangement that a pixel which was the pastel yellow pixel 232 is constituted of only the yellow pixel 236 is not limited to the case that the pastel yellow pixel 232 and a pixel in which chrominance signals which do not include a yellow color component are displayed constitutes the checkered pattern.

Figure 21:
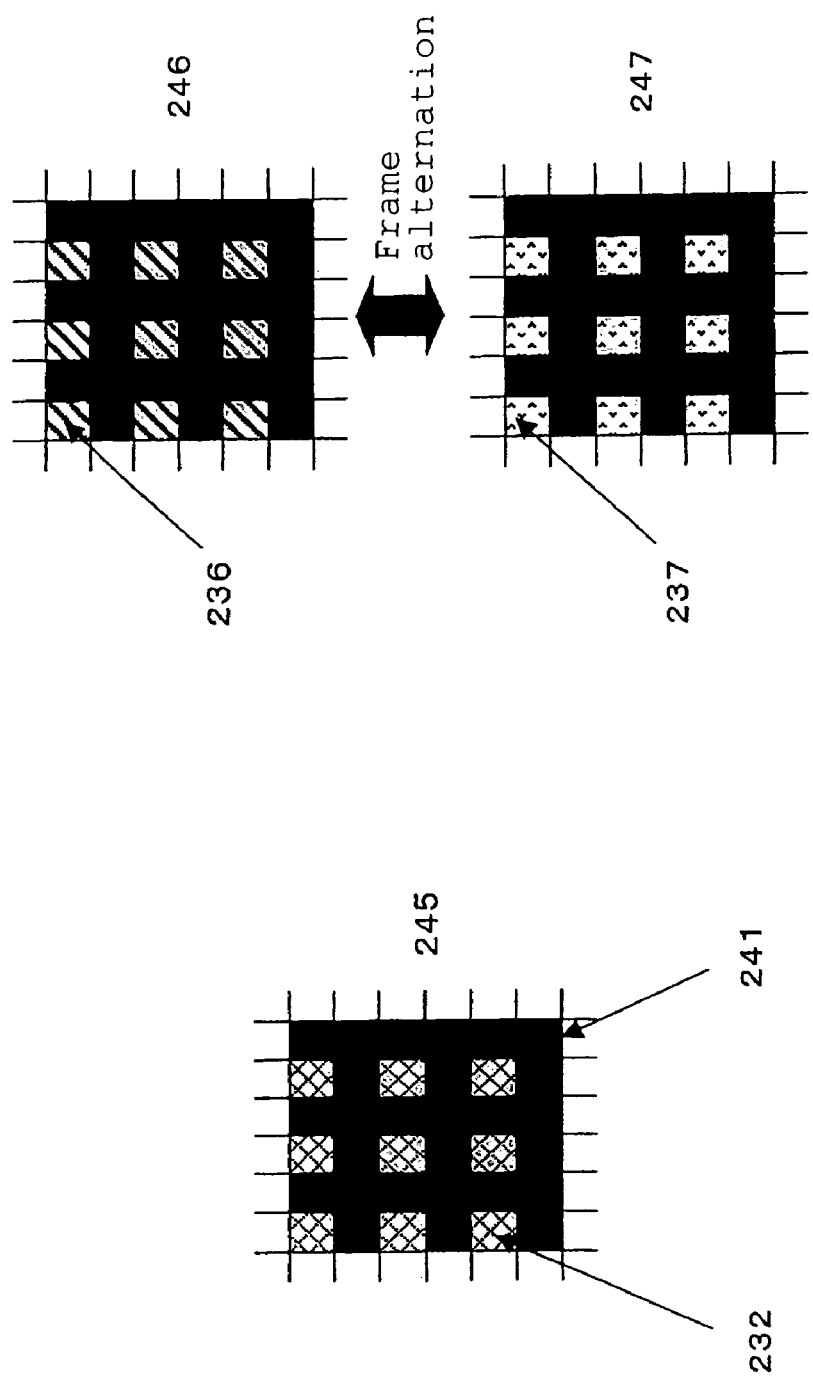
FIG. 21 includes drawings showing examples, where a part of the pastel yellow pixels constituting a checkered pattern of FIG. 19 is changed into black pixels, in the fifth embodiment of the present invention.

FIG. 21 shows a display region 245 where a part of pastel yellow pixels 232 which constitute a checkered pattern is changed into the black pixels. The display region 245 is a region including pastel yellow pixels 232, a display region 246 is a display region at the time of a certain frame where an output of the second selection instrument 206 is displayed using the switching signal 226 of FIG. 16(a), and a display region 247 is a display region at the time of the next frame of the display region 246. As shown in the display region 246, the pixels which were the pastel yellow pixels 232 are constituted of only the yellow pixels 236. Also in this case, it appears a flicker when frame alternating is performed.

As mentioned above, the case where the whole display region is constituted of only the yellow pixels 236 or white pixels 237 except the black pixels 241 is equivalent to an example of the predetermined condition of the present invention. Moreover, the predetermined condition of the present invention, that is, the case that the chrominance signals which do not include the above-mentioned color component are displayed without the above-mentioned color correction, and the chrominance signals including the above-mentioned color component are spatially alternately displayed with the above-mentioned first chrominance signals and the above-mentioned second chrominance signals assuming that all the chrominance signals displayed on pixels of the above-mentioned predetermined region include the predetermined color component is, for example, in this fifth embodiment, a case as shown in the display regions 243 and 244 of FIG. 20 and the display regions 246 and 247 of FIG. 21 where the yellow pixels 236 and white pixels 237 are alternately displayed and the black chrominance signal is displayed as black pixels 241 as it is, as shown in the display region 234 of FIG. 17 in regard to the chrominance signals displayed in a predetermined display region.

In addition, although the example that the predetermined condition is the case that the pixels which were the pastel yellow pixels 232 were constituted of only the yellow pixels 236 like the examples of the display regions 242 and 243 was cited, a small number of white pixels 237 in comparison with the yellow pixels 236 may exist in the pixels which were the pastel yellow pixels 232.

In this case, in the display region at the time of a certain frame, a case that an area displayed as the yellow pixels 236 exists by 5% or larger than an area displayed as the white pixels 237 is made the predetermined condition. The figure of this 5% is an actual measurement obtained by measurement. In addition, a case that an area displayed as the white pixels 237 exists by 5% or larger than an area displayed as the yellow pixels 236 can be also made the predetermined condition. Such predetermined conditions are equivalent to examples of the predetermined condition of the present invention.

In addition, a specific pixel alternates into the yellow pixel 236 and white pixel 237 every frame by the ½ frequency divider 222 of the first switching signal generation instrument 204. It was described that, when the display region 242 fulfilled the predetermined condition at the time of performing this alternation, a flicker arose. However, although a flicker does not arise since the yellow pixels 236 and white pixels 237 do not alternate every field when there is no ½ frequency divider 222 of the first switching signal generation instrument 204 of FIG. 16(a), it is not possible to sufficiently obtain the above-mentioned effect of increasing the brightness of an image portion by displaying the pastel yellow pixels 232 in the alternating display of the yellow pixels 236 whose saturation is increased more, and the white pixels 237 where the white color component is increased more.

For example, when an output of the first selection instrument 205 is displayed in the display region 242, where a checkered pattern is constituted of the pastel yellow pixels 232 and black pixels 241 as shown in FIG. 20, using the first switching signal generation instrument 204 of FIG. 16(a) in the structure without the ½ frequency divider 222, a display region is constituted of the yellow pixels 236 and black pixels 241 like the display region 243 of FIG. 20. That is, the pastel yellow pixel 232 is converted only into the yellow pixel 236 whose saturation is increased more, and the brightness of its image portion does not increase.

Thus, as the examples of the display regions 242 and 243, when pixels which were the pastel yellow pixels 232 are constituted of only the yellow pixels 236, a display area of the yellow pixels 236 exists by 5% or larger than a display area of the white pixels 237, and the yellow pixels 236 and white pixels 237 do not alternate every field, the brightness of its image portion does not increase.

In addition, when an output of the first selection instrument 205 is displayed in the display region 242, where a checkered pattern is constituted of the pastel yellow pixels 232 and black pixels 241 as shown in FIG. 20, using the first switching signal generation instrument 204 of FIG. 16(a) in the structure without the ½ frequency divider 222, the display region 242 may be also converted into a display region which is constituted of the white pixels 237 and black pixels 241 like the display region 244. In this case, the pastel yellow pixels 232 are converted only into the white pixels 237 where the white color component is increased more, and the decrease of saturation of its image portion becomes large.

Thus, as the examples of the display regions 242 and 244, when pixels which were the pastel yellow pixels 232 are constituted of only the white pixels 237, a display area of the white pixels 237 exists by 5% or larger than a display area of the yellow pixels 236, and the yellow pixels 236 and white pixels 237 do not alternate every field, the decrease of saturation of its image portion is large.

In order to prevent a flicker arisen the decrease of brightness or saturation, or arisen at the time of frame alternation as mentioned above, it is detected whether a predetermined condition is fulfilled by the pattern detection instrument 213.

Hereafter, an embodiment of the pattern detection instrument 213 will be described.

Figure 22:
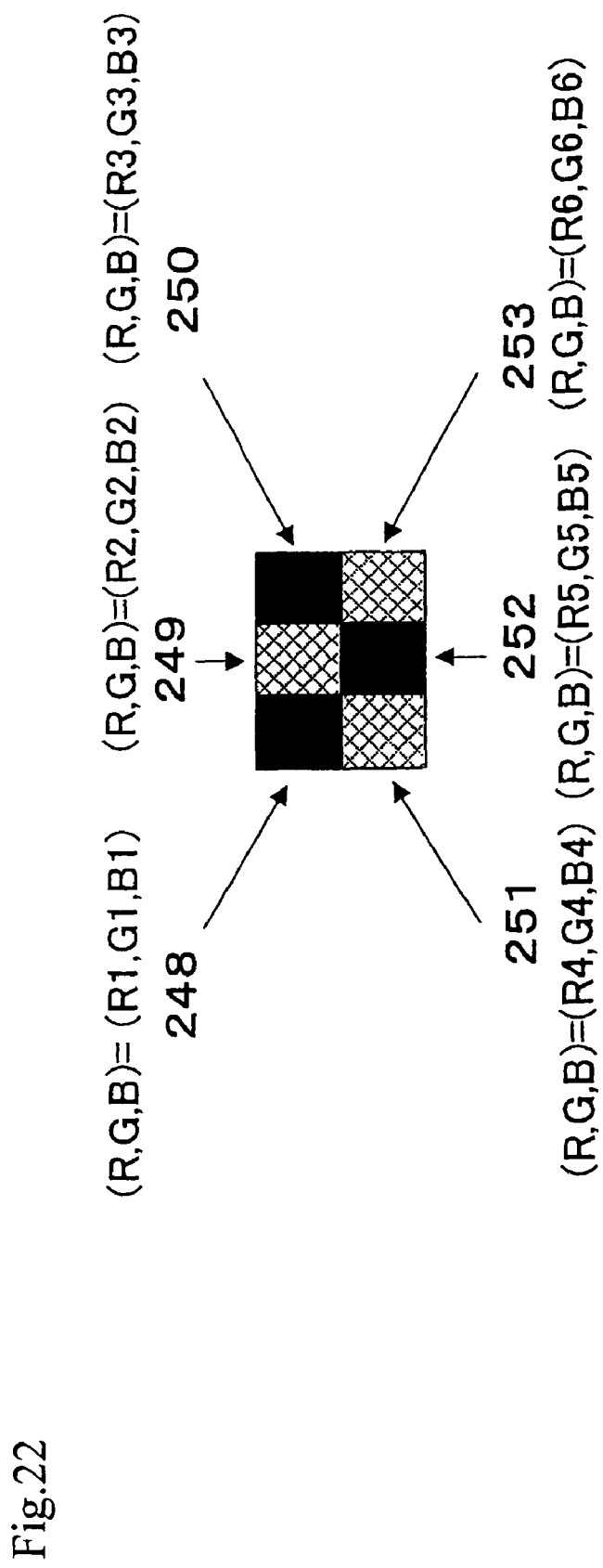
FIG. 22 is an explanatory diagram of pattern detection in the fifth embodiment of the present invention.
Figure 23:
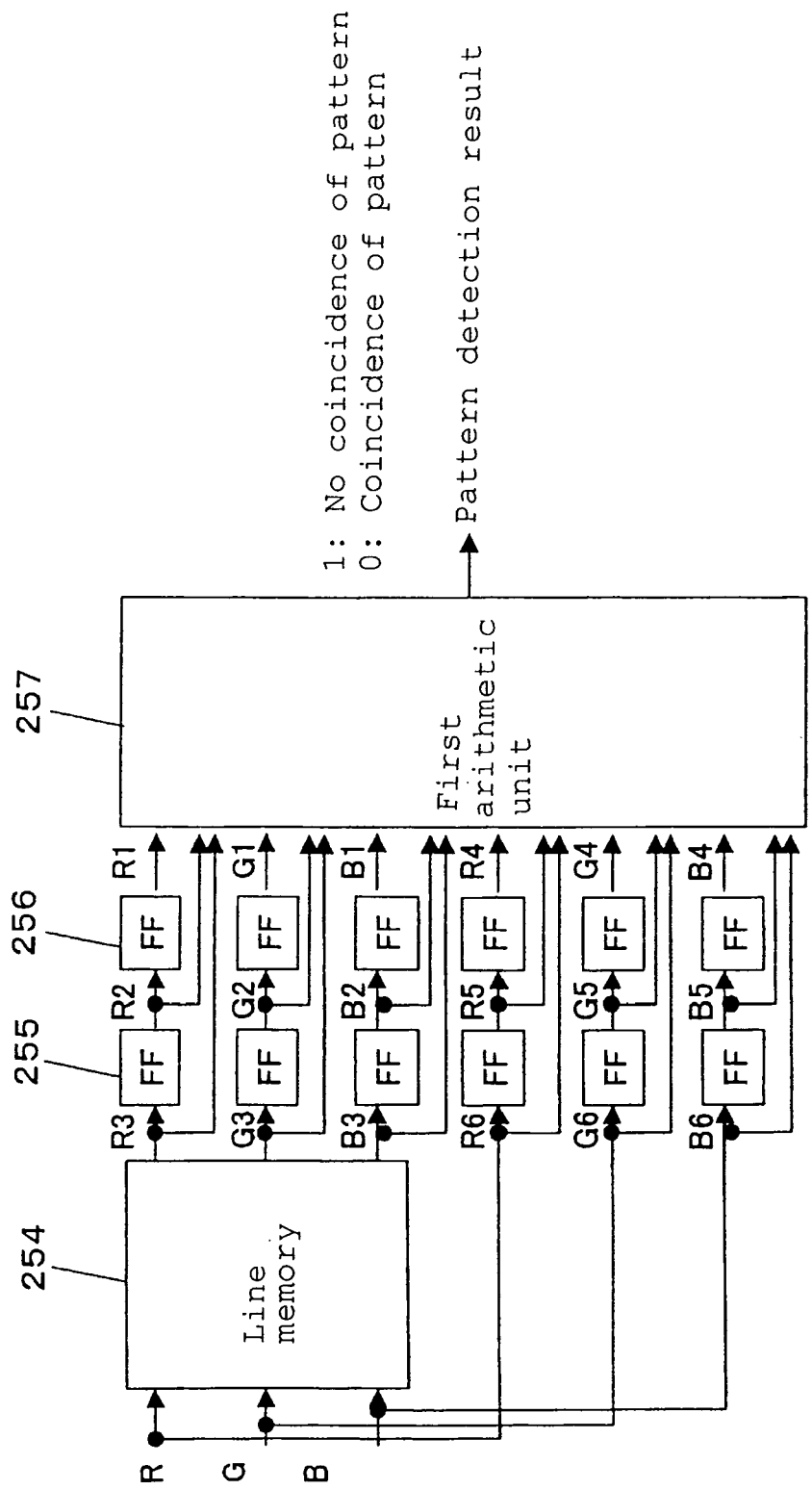
FIG. 23 is a structural diagram of pattern detection instrument 213 in the fifth embodiment of the present invention.
Figure 24:
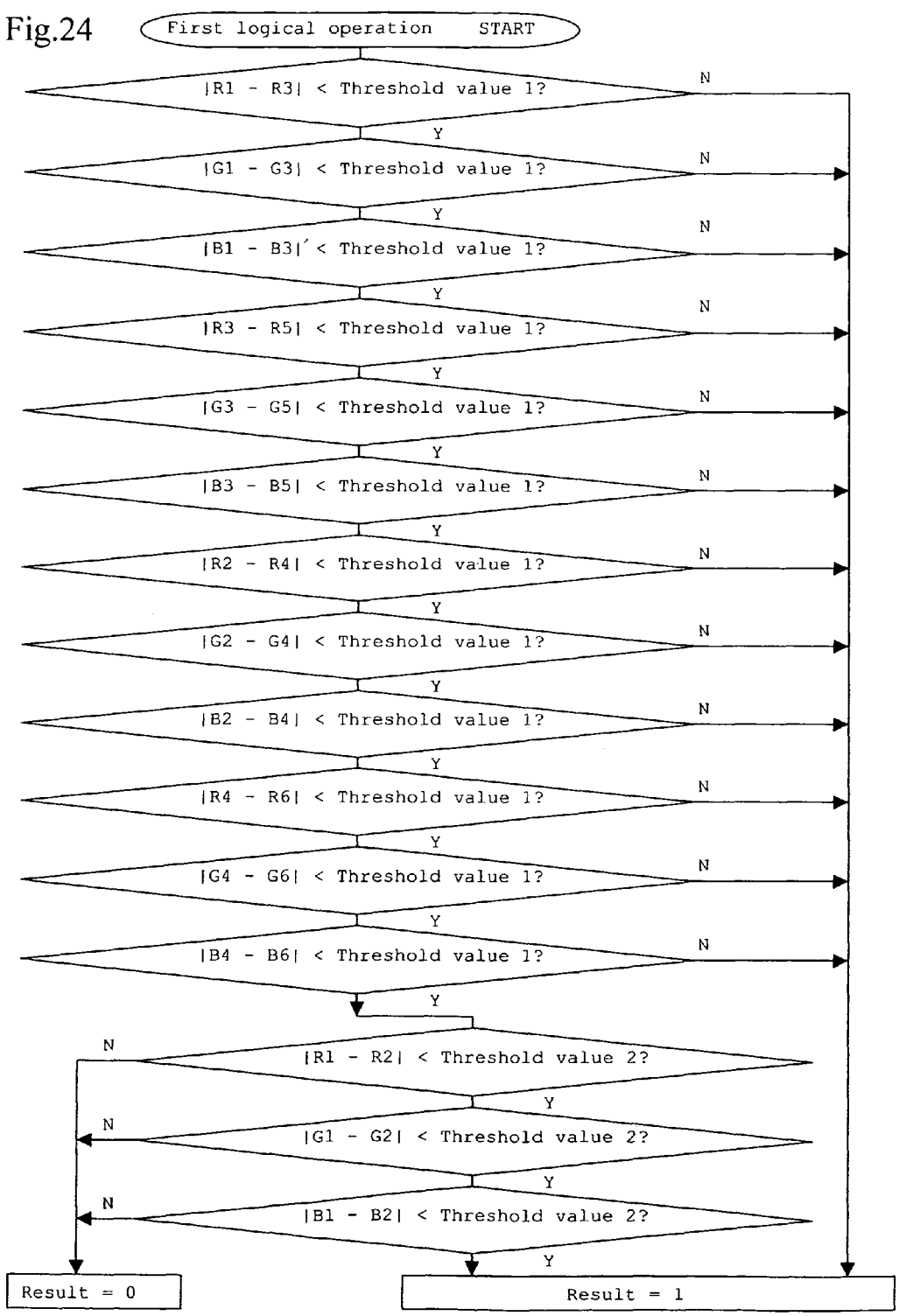
FIG. 24 is a flow chart of a logic operation circuit within the pattern detection instrument 213 in the fifth embodiment of the present invention.

An example of detecting a checkered pattern as a predetermined condition will be shown using FIG. 22, FIG. 23, and FIG. 24. As shown in FIG. 22, the checkered pattern is constituted of black pixels 248, 250, and 252 and pastel yellow pixels 249, 251, and 253. An example of the pattern detection instrument 213 which detects whether the pastel yellow pixel 253 coincides with a checkered pattern will be described. It is assumed that RGB signals of each pixel of black and pastel yellow are (R, G, B)=(R1, G1, B1) for 248, (R, G, B)=(R2, G2, B2) for 249, (R, G, B)=(R3, G3, B3) for 250, (R, G, B)=(R4, G4, B4) for 251, (R, G, B)=(R5, G5, B5) for 252, (R, G, B)=(R6, G6, B6) for 253.

A block structural diagram of the pattern detection instrument 213 is shown in FIG. 23. The pattern detection instrument 213 is constituted of line memory 254, eleven flip-flops (255, 256, and the like), and a first arithmetic unit 257. All of the above-mentioned eleven flip-flops supply the dot clock signal 268, which is a dot clock signal for the white display element driving instrument 208 and RGB display element driving instrument 210 to determine the timing of display every pixel, as a basic clock.

It is assumed that (R, G, B)=(R6, G6, B6) be inputted as an input signal. The (R6, G6, B6) are inputted into the line memory 254. R, G, and B signals before one line are outputted from the line memory 254. Those data are (R, G, B)=(R3, G3, B3). In addition, the signal R3 is inputted into the flip-flop 255, and the signal R2 before one pixel is outputted from the flip-flop 255. Similarly, the signal R2 is inputted into the flip-flop 256, and the signal R1 before one pixel is outputted from the flip-flop 256. Similarly, R4 and R5 signals are outputted from flip-flops. These R1, R2, R3, R4, R5, and R6 signals are inputted into the first arithmetic unit 257. Similarly, the G1, G2, G3, G4, G5, G6, B1, B2, B3, B4, B5, and B6 signals are also inputted into the first arithmetic unit 257.

A flow chart of data processing performed by the arithmetic unit 257 is shown in FIG. 24. When conditional expression |R1−R3|<Threshold 1 is true, it means that values of R1 and R3 are nearly equal. Similarly, when |G1−G3|<Threshold 1 and |B1−B3|<Threshold 1 are also true, it means that (R, G, B)=(R1, G1, B1) and (R, G, B)=(R3, G3, B3) have similar signal values. That is, it means that signal values of a black pixel 248 and a black pixel 250 are nearly equal. Hence, all of the followings are true:

|R1−R3|<Threshold 1, |G1−G3|<Threshold 1, |B1−B3|<Threshold 1
|R3−R5|<Threshold 1, |G3−G5|<Threshold 1, |B3−B5|<Threshold 1
|R2−R4|<Threshold 1, |G2−G4|<Threshold 1, |B2−B4|<Threshold 1
|R4−R6|<Threshold 1, |G4−G6|<Threshold 1, |B4−B6|<Threshold 1, it means that colors of the black pixels 248 and 250, black pixels 250 and 252, pastel yellow pixels 249 and 251, and pastel yellow pixels 251 and 253 are similar, respectively.

In addition, when |R1−R2|<Threshold 2 is true, it means that values of R1 and R2 nearly equal. Hence, any one of |R1−R2|<Threshold 2, |G1−G2|<Threshold 2, and |B1−B2|<Threshold 2 is false, it means that colors of the black pixel 248 and pastel yellow pixel 249 differ. Hence, all of the followings are true:

|R1−R3|<Threshold 1, |G1−G3|<Threshold 1, |B1−B3|<Threshold 1
|R3−R5|<Threshold 1, |G3−G5|<Threshold 1, |B3−B5|<Threshold 1
|R2−R4|<Threshold 1, |G2−G4|<Threshold 1, |B2−B4|<Threshold 1
|R4−R6|<Threshold 1, |G4−G6|<Threshold 1, |B4−B6|<Threshold 1, and any one of the followings is false:
|R1−R2|<Threshold 2, |G1−G2|<Threshold 2, |B1−B2|<Threshold 2, the pastel yellow pixel 253 is apart of a checkered pattern, and pattern detection result outputs 0.

When not fulfilling the above-mentioned conditions, the pastel yellow pixel 253 is not a part of the checkered pattern, and the pattern detection result outputs 1. For example, when |R1−R3|<Threshold 1 is false, red colors of pixels 248 and 250 differ and a checkered pattern is not constituted. In addition, for example, all of the followings are true:

|R1−R3|<Threshold 1, |G1−G3|<Threshold 1, |B1−B3|<Threshold 1
|R3−R5|<Threshold 1, |G3−G5|<Threshold 1, |B3−B5|<Threshold 1
|R2−R4|<Threshold 1, |G2−G4|<Threshold 1, |B2−B4|<Threshold 1
|R4−R6|<Threshold 1, |G4−G6|<Threshold 1, |B4−B6|<Threshold 1, and all of the followings are true:
|R1−R2|<Threshold 2, |G1−G2|<Threshold 2, |B1−B2|<Threshold 2, all of colors of pixels 248, 249, 250, 251, 252, and 253 are similar, and a checkered pattern is not constituted.

In addition, although the example of detecting whether the pastel yellow pixel 253 was a part of a checkered pattern was described in this fifth embodiment, it is not limited to this, but it may be sufficient to detect whether pixels 248, 249, 250, 251, and 252 are a part of a checkered pattern. However, in that case, it is necessary to make the delay amount of output result coincide with other signals in FIG. 14.

For example, in the flow chart of FIG. 24, when pattern detection coincides to detect that the pastel yellow pixel 251 is a part of a checkered pattern, it is necessary to delay an output of the color component separation and detection instrument 201, an output of the first selection instrument 205, a B signal of an input of the second selection instrument 206, an R signal and a B signal of an input of the white color component detection instrument 207, and an R signal and an B signal of an input of the RGB display element driving instrument 210 by two clocks.

In addition, although the example of detecting whether the pastel yellow pixel was a part of a checkered pattern was described in this fifth embodiment, it is not limited to this, but it may be sufficient to detect whether it is a part of another pattern. For example, it may be also sufficient to perform the pattern detection of the display region 245 as shown in FIG. 21. However, in that case, in the case of a checkered pattern or a pattern of the display region 245 as shown in FIG. 21, pattern detection result is set at 0. That is, when in agreement with one of patterns, it is made for the second selection instrument 206 to output the third B signal which is not given correction.

Furthermore, although the example of performing frame alternation as first switching signal generation instrument was described in this fifth embodiment, it is also applicable to the above-mentioned case of not performing the frame alternation. For example, when not performing the frame alternation in FIG. 20, an output of first selection instrument becomes the display region 243. In this case, the display region 243 becomes low luminance in comparison with the display region 242, and hence, it does not become the correction to be intended. In addition, for example, when not performing the frame alternation in FIG. 20, an output of the first selection instrument becomes the display region 244. In this case, the display region 244 becomes low saturation in comparison with the display region 242, and hence, it does not become the correction to be intended. Hence, in such a case, when patterns coincide in the pattern detection instrument 213, the third B signal is outputted from second selection instrument.

In addition, although a checkered pattern was mentioned as an example as an example of predetermined condition, and the pattern detection of whether six chrominance signals displayed on six pixels were a part of the checkered pattern was described in this fifth embodiment, it may be also sufficient to detect whether all the chrominance signals displayed on the whole display region are a checkered pattern.

Moreover, when a case that anyone of an area displayed as the yellow pixels 236 and an area displayed as the white pixels 237 exists by 5% or larger than another side is made a predetermined condition, the pattern detection instrument 213 has only to detect whether it is 5% or less of threshold from the amount of chrominance signals displayed as yellow pixels 236, and chrominance signals displayed as white pixels 237, which are included in all the chrominance signals displayed on a display region.

In addition, although it was described in this fifth embodiment that RGB signals were inputted into the display apparatus 212, it is not limited to this, but signals of expressing colors other than the RGB signals may be inputted.

Furthermore, although the display apparatus 212 performed the processing of decreasing the sense of incongruity of yellow appearance in this fifth embodiment, it is also possible to perform the processing of decreasing the sense of incongruity of magenta or cyan.

Furthermore, although the conversion which the first signal level conversion processing instrument 202 gives to a blue signal is linear conversion at a predetermined intensity level or higher as shown in FIG. 2(a) in this fifth embodiment, nonlinear conversion is acceptable. In short, the first signal level conversion processing instrument 202 has only to convert B signal inputted into the first signal level conversion processing instrument 202 so as to become a signal whose value is reduced in comparison with the B signal at the time of an input.

Moreover, in this embodiment, although the conversion which second signal level conversion processing instrument 203 gave to the blue signal was linear conversion up to the predetermined intensity level, it may be nonlinear conversion. In short, the second signal level conversion processing instrument 203 has only to convert the B signal inputted into the first signal level conversion processing instrument 202 so as to be a large value in comparison with the B signal at the time of an input.

Embodiment 6

Next, a sixth embodiment will be described.

In the sixth embodiment, a display apparatus will be explained which, even if a bright yellow (yellow with low saturation), that is, pastel yellow display portion being surrounded by white or being adjacent to white, can decrease the sense of incongruity that visible color appears differently such as the pastel yellow display portion seeming greenish and the like, and further, can decrease the sense of incongruity that visible color appears differently by changing color correction processing even when the display portion does not fulfill a predetermined condition.

Figure 25:
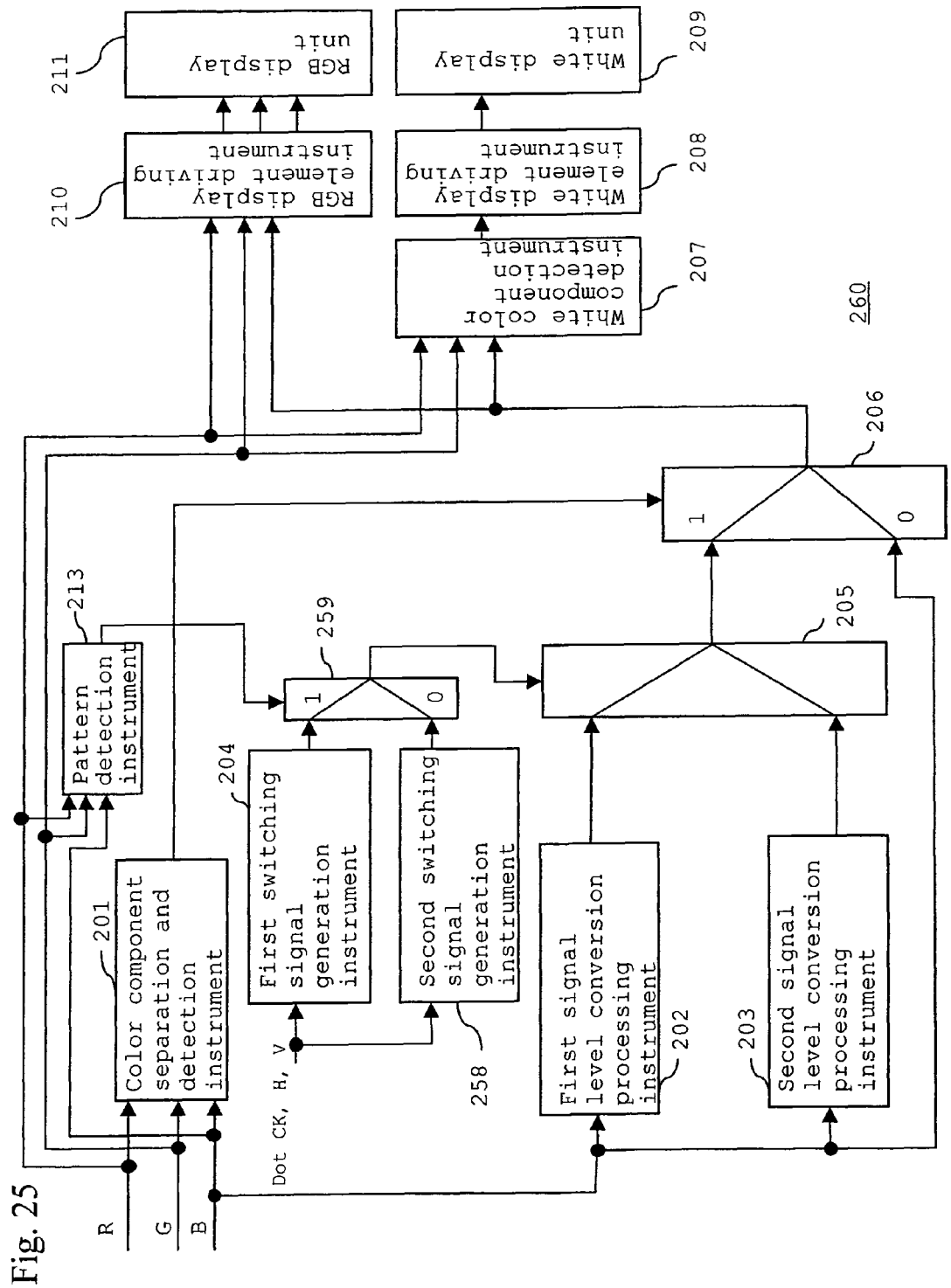
FIG. 25 is a block diagram showing the structure of a display apparatus in a sixth embodiment of the present invention.

FIG. 25 is a structural diagram of the display apparatus in this sixth embodiment.

A display apparatus 260 of FIG. 25 is constituted of the color component separation and detection instrument 201, first signal level conversion processing instrument 202, second signal level conversion processing instrument 203, first switching signal generation instrument 204, first selection instrument 205, second selection instrument 206, white color component detection instrument 207, white display element driving instrument 208, white display unit 209, RGB display element driving instrument 210, RGB display unit 211, pattern detection instrument 213, second switching signal generation instrument 258, and third selection instrument 259.

The operation of the above-mentioned color component separation and detection instrument 201, first signal level conversion processing instrument 202, second signal level conversion processing instrument 203, first switching signal generation instrument 204, first selection instrument 205, second selection instrument 206, white color component detection instrument 207, white display element driving instrument 208, white display unit 209, RGB display element driving instrument 210, and RGB display unit 211 is similar to the fifth embodiment, and hence, description is omitted.

The structure shown in FIG. 16(b) may be sufficient for the second switching signal generation instrument 258, which generates the switching signal 230. The first switching signal generation instrument 204 has the structure shown in FIG. 16(a) similarly to the fifth embodiment, and generates the switching signal 226. Moreover, the third selection instrument 259 selects the switching signal 226 when '1' which means that a predetermined condition is not fulfilled is inputted from the pattern detection instrument 213, and selects the switching signal 230 when '0' which means that a predetermined condition is fulfilled is inputted.

Hereinafter, the operation of the display apparatus 260 of this sixth embodiment will be described.

When the first selection instrument 5 is operated using the output result of the first switching signal generation instrument 204 when a checkered pattern is formed of the pastel yellow pixels 232 and black pixels 241 whose pastel yellow display region is like 242 in FIG. 20, a flicker arises since it becomes the frame alternation of the display region 243 of FIG. 20, and the display region 244 of FIG. 20.

Figure 26:
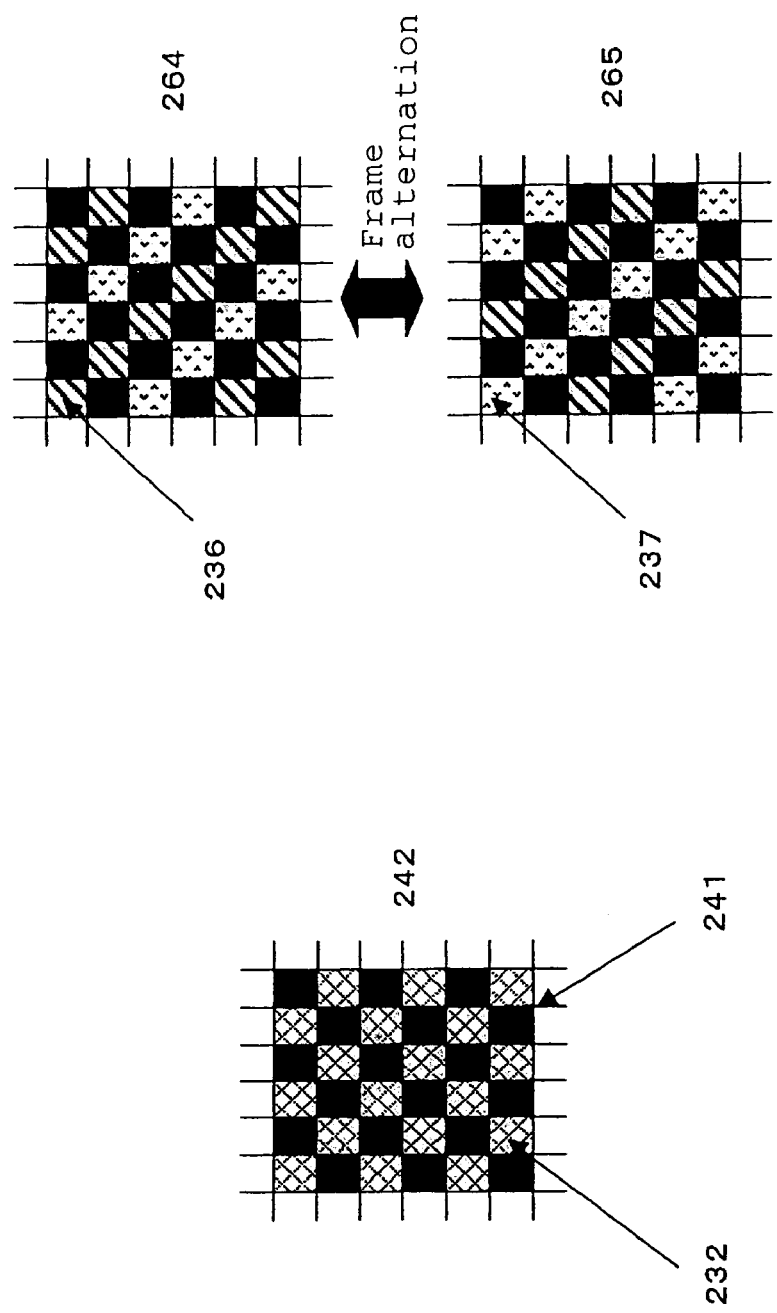
FIG. 26 includes drawings showing display examples of a display area, where a checkered pattern is constituted of pastel yellow pixels and black pixels, in the sixth embodiment of the present invention.

Then, when a checkered pattern is detected by the pattern detection instrument 213, its output is set at 0. Then, an output of the third selection instrument 259 serves as the switching signal 230 which is an output of the second switching signal generation instrument 258. A case where the switching signal 230 is used is shown in FIG. 26. A display region 264 is a display region at the time of a certain frame which is displayed using the switching signal 230, and a display region 265 is a display region at the time of the next frame of the display region 264. When displaying the display region 238 currently displayed only in the pastel yellow pixels 232 on the basis of the switching signal 230, the yellow pixels 236 and white pixels 237 are displayed in turn spatially every two pixels as shown in FIG. 19.

Therefore, it is possible to avoid a flicker even if frame alternation is performed since the yellow pixels 236 and white pixels 237 are displayed on the display region 264 at the time of a certain frame even if a pastel yellow display region is a checkered pattern like 242 in FIG. 26.

In addition, it is equivalent to an example of such control of the present invention of being spatially displayed in turn every two or more pixel units to make it displayed in turn every two pixels as mentioned above. Moreover, it is not necessary to limit to "every two pixels", but, in short, it has only to be able to make displayed so as to be able to avoid a flicker.

Furthermore, the switching signal 226 is equivalent to an example of the first switching signal, and the switching signal 230 is equivalent to an example of the second switching signal of the present invention. Moreover, the third selection instrument 259 is equivalent to an example of the switching signal selection instrument of the present invention.

In addition, the color detection instrument of the present invention is equivalent to the color component separation instrument 201 in this sixth embodiment, and the color correction instrument of the present invention is equivalent to the first signal level conversion processing instrument 202 and second signal level conversion processing instrument in this sixth embodiment. Moreover, the judging instrument of the present invention is equivalent to, for example, the pattern detection instrument 213 in this sixth embodiment. In addition, the control device of the present invention is equivalent to, for example, the first switching signal generation instrument 204, second switching signal generation instrument 258, first selection instrument 205, second selection instrument 206, and third selection instrument in the second embodiment. Moreover, the display instrument of the present invention is equivalent to, for example, the white color component detection instrument 207, white display element driving instrument 208, white display unit 209, RGB display element driving instrument 210, and RGB display unit 211 in the second embodiment.

In addition, the R (red) color, G (green) color, and B (blue) color of this sixth embodiment are examples of the three primary colors of the present invention, the RGB signals of this embodiment are examples of the chrominance signals of the present invention, and the yellow of this sixth embodiment is an example of the predetermined color of the present invention.

Moreover, although the example of detecting whether a pastel yellow pixel is a part of a checkered pattern is described in this embodiment, it is not limited to this similarly to the fifth embodiment, but it may be sufficient to detect whether it is a part of another pattern.

Furthermore, although the example of performing frame alternation as first switching signal generation instrument is described in this embodiment, it is also applicable to a case of not performing the frame alternation, similarly to the fifth embodiment.

In addition, although it is described in this sixth embodiment that RGB signals are inputted into the display apparatus 260, it is not limited to this, but signals of expressing colors other than the RGB signals may be inputted.

Furthermore, although the display apparatus 260 performed the processing, which decreased the sense of incongruity of yellow appearance, in this sixth embodiment, it is also possible to perform the processing which decreases the sense of incongruity of magenta or cyan.

In addition, although the conversion which the first signal level conversion processing instrument 202 gave to a blue signal was linear conversion at a predetermined intensity level or higher as shown in FIG. 2(*a*) in this sixth embodiment, nonlinear conversion is acceptable. In short, the first signal level conversion processing instrument 202 has only to convert the B signal inputted into the first signal level conversion processing instrument 202 so as to be a small value in comparison with the B signal at the time of an input.

Furthermore, in this sixth embodiment, although the conversion which second signal level conversion processing instrument 203 gave to the blue signal was linear conversion up to the predetermined intensity level, it may be nonlinear conversion. In short, the second signal level conversion processing instrument 203 has only to convert the B signal inputted into the first signal level conversion processing instrument 202 so as to be a large value in comparison with the B signal at the time of the input.

In the fifth embodiment, even if a bright yellow (yellow with low saturation), that is, pastel yellow display portion being surrounded by white or being adjacent to white, it was possible to decrease the sense of incongruity that visible color appears differently such as the pastel yellow display portion seeming greenish and the like when a display portion did not fulfill a predetermined condition.

In the sixth embodiment, even if a bright yellow (yellow with low saturation), that is, pastel yellow display portion being surrounded by white or being adjacent to white, it was possible to decrease the sense of incongruity that visible color appears differently such as the pastel yellow display portion seeming greenish and the like and further, to obtain the same effect by changing the processing even when the display portion did not fulfill a predetermined condition.

Embodiment 7

Hereafter, a seventh embodiment will be described. Although the fundamental structure of a display apparatus of this seventh embodiment is the same as the fifth embodiment, a predetermined condition differs from that of the fifth embodiment. Therefore, description will be performed with focusing on this difference.

In this seventh embodiment, as a predetermined condition, it is made a condition that a plurality of pixels where chrominance signals including a yellow color component are displayed is not spatially displayed adjacently. This predetermined condition is equivalent to an example of the predetermined condition of the present invention.

The pixel 248 in FIG. 22 is mentioned as an example, and pattern detection will be described below.

Firstly, it is detected about the pixel 248 and pixel 249 whether |R1−R2|<Threshold 1, |G1−G2|<Threshold 1, and |B1−B2|<Threshold 1 are fulfilled. When result is true, this means that colors of the pixel 248 and pixel 249 are similar and means that two or more are adjacent, and hence, the pattern detection is ended and "1" is outputted to the arithmetic unit 214 since the predetermined condition is not fulfilled.

When being false, it is detected about the pixel 248 and pixel 251 whether |R1−R4|<Threshold 1, |G1−G4|<Threshold 1, and |B1−B4|<Threshold 1 are fulfilled. When result is true, this means that colors of the pixel 248 and pixel 251 are similar and means that two or more are adjacent, and hence, the pattern detection is ended and "1" is outputted to the arithmetic unit 214 since the predetermined condition is not fulfilled.

Moreover, when being false, it is detected whether colors of the pixel 249, and pixel 250 or pixel 252 which are horizontally adjacent to the pixel 248 are similar. Thus, the detection is performed one by one horizontally, about the pixel of the first line, and is moved to the next line when all of the detection results are false, and the detection is performed similarly to the above. Then, when truth is detected, the pattern detection is ended and "1" is outputted to the arithmetic unit 214. Furthermore, when being false even if the pattern detection about all the chrominance signals displayed in a display region is performed, "0" is outputted to the arithmetic unit 214.

When the pattern detection is performed as mentioned above, the display apparatus 212 displays the yellow pixels 236 and white pixels 237 in turn spatially, and displays the chrominance signals, which do not include the predetermined color component, as it is, in a state that assumes that all the chrominance signals displayed on a predetermined display region include the yellow color component. At this time, the yellow pixels 236 and white pixels 237 may be also displayed every two or more pixels as shown in the display region 239 of FIG. 19. Displaying in this way is equivalent to an example of the control of the present invention.

Figure 27:
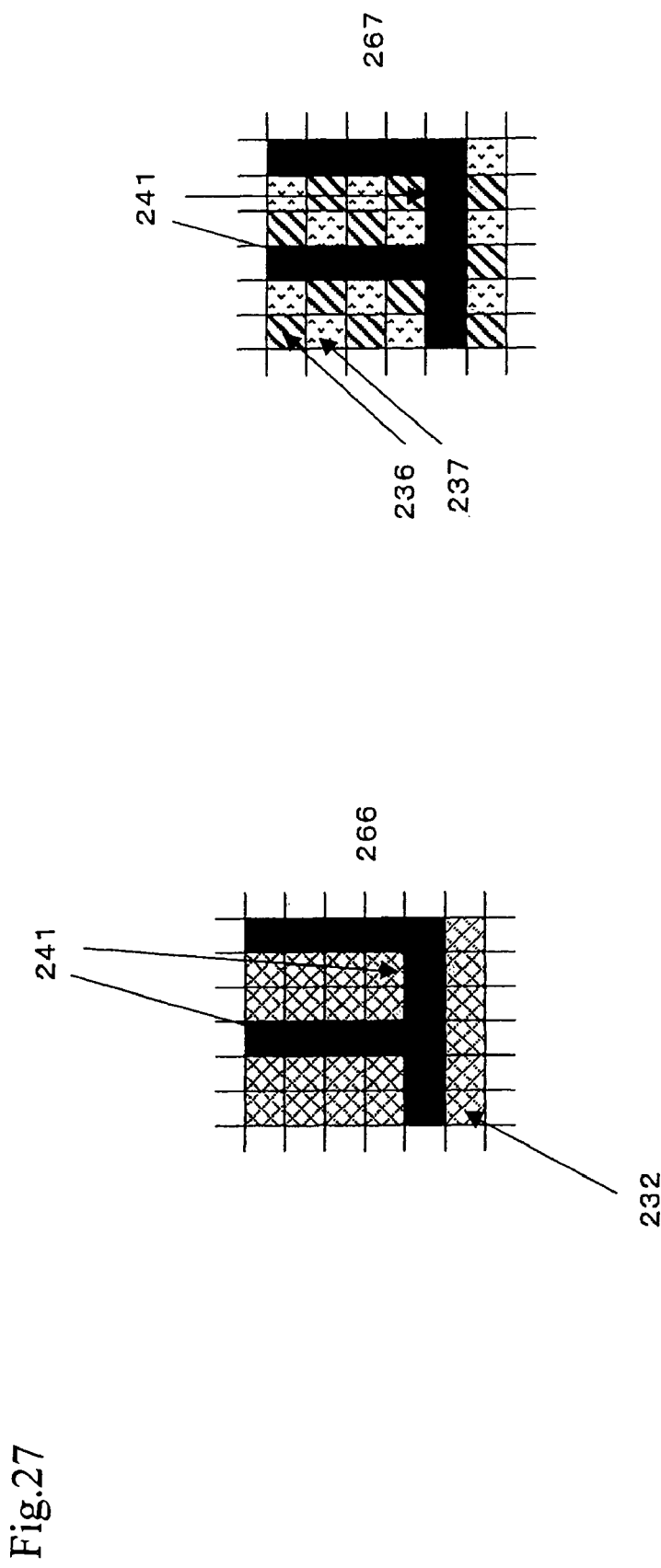
FIG. 27 includes drawings showing display examples of a display area, which is constituted of pastel yellow pixels and black pixels, in an modified example of a seventh embodiment of the present invention.
Figure 28:
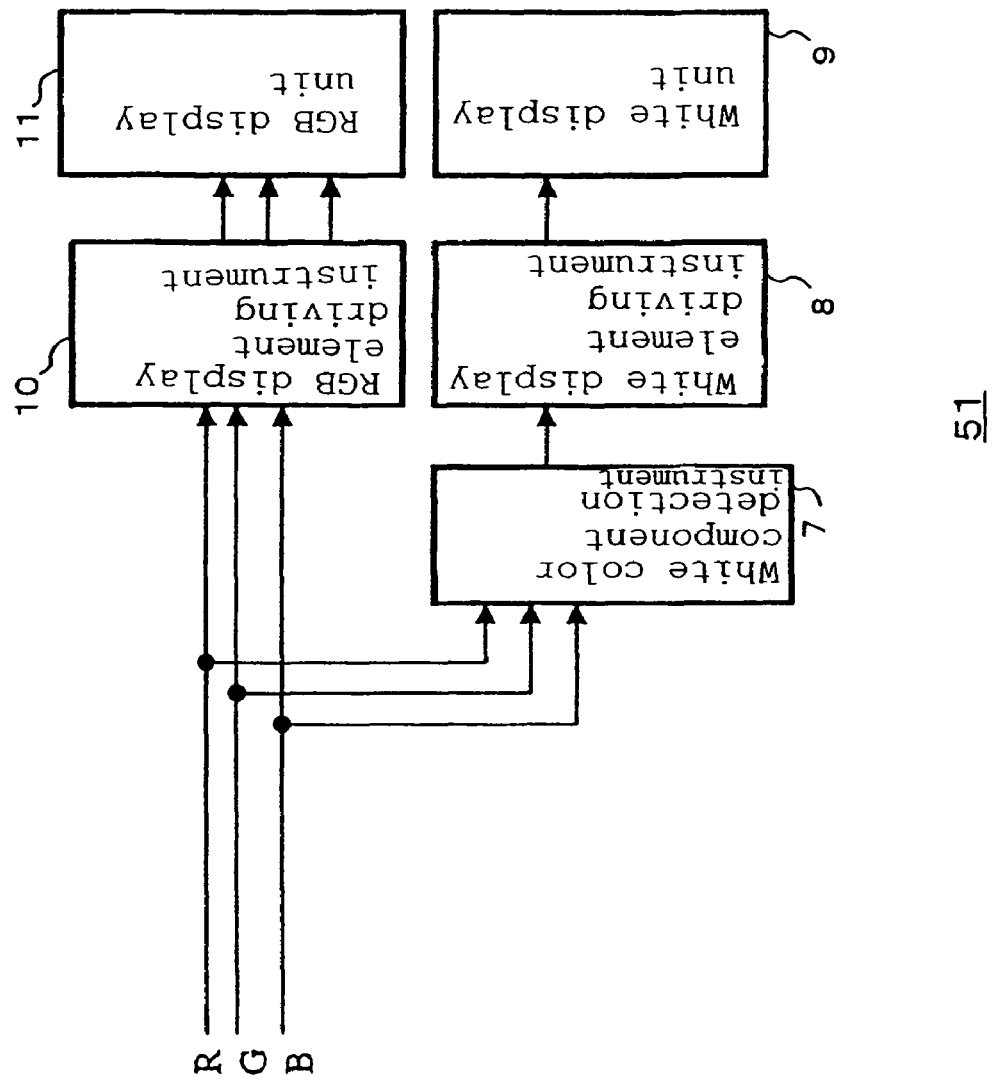
FIG. 28 is a block diagram showing the structure of a conventional display apparatus.
Figure 30:
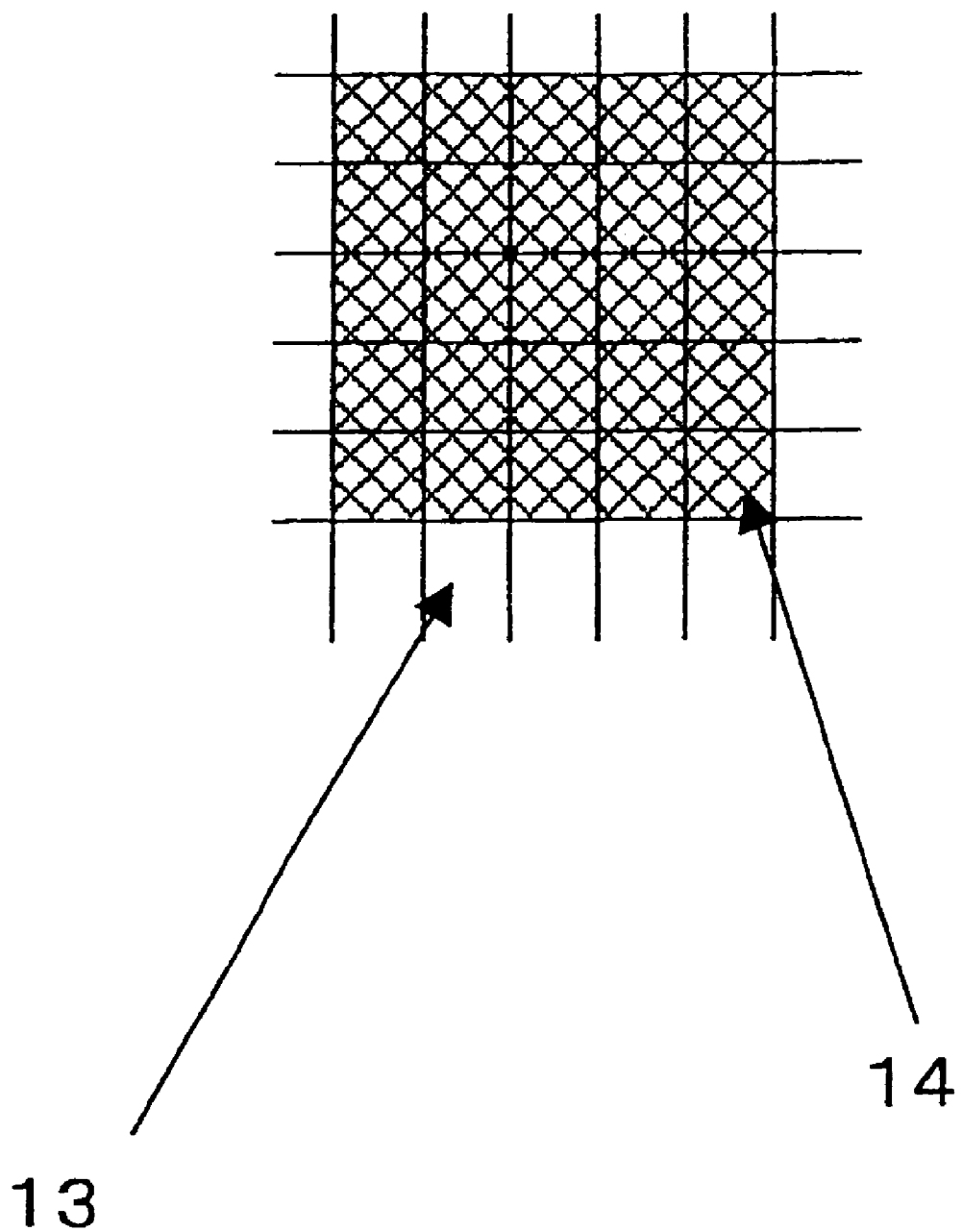
FIG. 30 is a drawing showing an example of a display screen of a conventional display apparatus.

In addition, although the yellow pixels 236 and white pixels 237 were displayed in turn in the state that it was assumed that all the chrominance signals displayed on a predetermined display region included the yellow color component since the first B signal and second B signal were selected every pixel display, the first B signal and second B signal may be switched every display to a pixel of chrominance signals where the yellow color component is detected by the color component separation and detection instrument 1. In this case, as for the chrominance signals displayed on the display region 266 of FIG. 27, the yellow pixels 236 and white pixels 237 are displayed in turn only every plural pixels, which are adjacent, like the display region 267, without all including the yellow color component. Displaying in this way is also equivalent to an example of the control of the present invention.

In addition, the program of the present invention is a program for executing functions of all or a part of instrument of the display apparatus of the present invention mentioned above by a computer, and is a program which operates with collaborating with the computer.

Moreover, the recording medium of the present invention is a recording medium which records a program for executing functions of all or a part of instrument of the display apparatus of the present invention, mentioned above, by a computer, and is a recording medium for the above-mentioned program being readable by a computer and executing the above-mentioned functions with collaborating with the above-mentioned computer.

In addition, the above-mentioned "a part of instrument" of the present invention means one or some instrument of a plurality of instrument.

Moreover, the above-mentioned "functions of instrument" of the present invention means functions of all or a part of the above-mentioned instrument.

Furthermore, the program of the present invention is a program for executing the operation of all or a part of steps of the display method of the present invention, as mentioned above, by a computer, and is a program which operates with collaborating with the computer.

Moreover, the recording medium of the present invention is a recording medium which records a program for executing all or a part of operation of all or a part of steps of the display method of the present invention, mentioned above, by a computer, and is a recording medium for the above-mentioned program being readable by a computer and executing the above-mentioned operation with collaborating with the above-mentioned computer.

In addition, the above-mentioned "a part of steps" of the present invention means one or some of a plurality of steps.

Moreover, the above-mentioned "operation of steps" of the present invention means the operation of all or a part of the above-mentioned steps.

In addition, one utilizing form of the program of the present invention may be an aspect of being recorded on a recording medium which can be read by a computer, and operating with collaborating with the computer.

Moreover, one utilizing form of the program of the present invention may be an aspect of being transmitted inside a transmission medium, being read by a computer, and operating with collaborating with the computer.

Furthermore, as a recording medium, ROM and the like are included.

In addition, the computers of the present invention which is mentioned above may be not only pure hardware such as a CPU, but also firmware, an OS, and what includes a peripheral device.

Furthermore, as described above, the structure of the present invention may be realized not only by software, but also by hardware.

The display apparatus, display method, program, and recording medium according to the present invention are useful to a display apparatus, a display method, a program, and a recording medium for having an effect that the sense of incongruity of the visual aspect of color decreases, making one pixel displayable in four colors, that is, three primary colors and a white color, and inputting and displaying chrominance signals corresponding to a mixing ratio of the above-mentioned four colors.

The invention claimed is:

1. A display apparatus including pixels, each pixel configured to display four colors including three primary colors and a white color, the display apparatus receiving chrominance signals corresponding to a mixing ratio of said four colors and displaying said chrominance signals to include said four colors, comprising:

a color correction instrument which applies, to at least one of the pixels, each of a) a first color correction of increasing saturation of at least one of said chrominance signals by decreasing a value of the at least one of said chrominance signals to form a first corrected chrominance signal and b) a second color correction of increasing the white color component of the at least one of said chrominance signals by increasing the value of the at least one of said chrominance signals to form a second corrected chrominance signal, when a predetermined color component is detected in said chrominance signals corresponding to said at least one pixel;

a height generation instrument which generates, when a region of adjacent pixels having said predetermined color component is detected, a saturation height difference for the pixels in said region by assigning each of said first corrected chrominance signal and said second corrected chrominance signal to the pixels of said region according to a predetermined assignment pattern, the predetermined assignment pattern alternating said first and second corrected chrominance signals over one or more of said pixels; and a display instrument which displays the pixels of said region using said generated saturation height difference.

2. The display apparatus according to claim 1, wherein said predetermined color component is yellow, magenta, or cyan.

3. The display apparatus according to claim 1, wherein said three primary colors are red, green, and blue.

4. The display apparatus according to claim 1, wherein said chrominance signals are RGB signals.

5. The display apparatus according to claim 4, wherein, when said predetermined color component is yellow, said color correction instrument performs said first color correction by decreasing a value of a B signal of said chrominance signals and performs said second color correction by increasing the B signal of said chrominance signals, when a yellow color component exists in said chrominance signals corresponding to said pixel.

6. The display apparatus according to claim 1, wherein said height generation instrument performs the assignment of said first corrected chrominance signal and said second corrected chrominance signal using a signal of determining timing when said display instrument performs display in said respective pixel.

7. The display apparatus according to claim 1, wherein said color correction instrument separately applies each of said first color correction and said second color correction to said respective at least one of the pixels.

8. A display method of displaying, for each pixel, four colors including three primary colors and a white color, receiving chrominance signals corresponding to a mixing ratio of said four colors and displaying said chrominance signals to include said four colors, comprising:

a color correction step of applying, to at least one of the pixels, each of a) a first color correction of increasing saturation of at least one of said chrominance signals by decreasing a value of the at least one of said chrominance signals to form a first corrected chrominance signal and b) a second color correction of increasing the white color component of at least one of said chrominance signals by increasing the value of the at least one of said chrominance signals to form a second corrected chrominance signal, when a predetermined color component is detected in said chrominance signals corresponding to said at least one pixel;

a height generation step of generating, when a region of adjacent pixels having said predetermined color component is detected, a saturation height difference for the pixels in said region by assigning each of said first corrected chrominance signal and said second corrected chrominance signal to the pixels of said region according to a predetermined assignment pattern, the predetermined assignment pattern alternating said first and second corrected chrominance signals over one or more said pixels; and a display step of displaying the pixels of said region on a display instrument using said generated saturation height difference.

9. A non-transitory computer readable medium including computer program instructions which are configured to cause a computer to function as:

a color correction instrument which applies, to at least one pixel, each of a) a first color correction of increasing saturation of at least one chrominance signal by decreasing a value of the at least one chrominance signal to form a first corrected chrominance signal and b) a second color correction of increasing a white color component of said at least one chrominance signal by increasing the value of the at least one chrominance signal to form a second corrected chrominance signal, when a predetermined color component is detected in said chrominance signal corresponding to said at least one pixel; and a height generation instrument which generates, when a region of adjacent pixels having said predetermined color component is detected, a saturation height difference for the pixels in said region by assigning each of said first corrected chrominance signal and said second corrected chrominance signal to the pixels of said region according to a predetermined assignment pattern, the predetermined assignment pattern alternating said first and second corrected chrominance signals over one or more of said pixels in a display apparatus, wherein each pixel of said display apparatus is configured to display four colors including three primary colors and said white color component, the display apparatus receiving and displaying said chrominance signal corresponding to a mixing ratio of said four colors, and said display apparatus comprises said color correction instrument, and a display instrument which displays the chrominance signal, which is selected by said color correction instrument, in said pixel.

10. A display apparatus including pixels, each pixel configured to display four colors including three primary colors and a white color, the display apparatus receiving and displaying chrominance signals corresponding to a mixing ratio of said four colors, comprising:

a color detection instrument which detects whether a predetermined color component is included in each chrominance signal corresponding to each pixel in a predetermined region;

a color correction instrument which applies, to at least one of the pixels, each of a) a first color correction of increasing the saturation of at least one of said chrominance signals by decreasing a value of the at least one of said chrominance signals to form a first corrected chrominance signal and b) a second color correction of increasing the white color component of the at least one of said chrominance signals by increasing the value of the at least one of said chrominance signals to form a second corrected chrominance signal, a control instrument which performs control of a color correction of the at least one of said chrominance signals based on said detected predetermined color component so that each of said first corrected chrominance signal and said second corrected chrominance signal are alternately displayed in a predetermined size of pixel units which are horizontally and/or vertically adjacent, over said predetermined region; and a display instrument which displays, for each pixel, said first corrected chrominance signal, said second corrected chrominance signal, or a chrominance signal not provided with said color correction responsive to said control instrument.

11. The display apparatus according to claim 10 wherein said predetermined size of pixel units is two pixel units.

12. The display apparatus according to claim 10, wherein when said control instrument performs the control so that each of said first corrected chrominance signal and said second corrected chrominance signal are alternately displayed in said predetermined size of pixel units, which are horizontally adjacent, over said predetermined region,
said control instrument switches and selects said first corrected chrominance signal and said second corrected chrominance signal in every one of a predetermined plurality of dot clock signals for determining display timing of every pixel in said predetermined region.

13. The display apparatus according to claim 10, wherein when said control instrument performs the control so that each of said first corrected chrominance signal and said second corrected chrominance signal are alternately displayed in said predetermined size of pixel units, which are vertically adjacent, over said predetermined region,
said control instrument switches and selects said first corrected chrominance signal and said second corrected chrominance signal for every one of a predetermined plurality of horizontal periods in said predetermined region.

14. The display apparatus according to claim 10 wherein said control instrument performs the control so that said first corrected chrominance signal and said second corrected chrominance signal are temporally alternately displayed in said corresponding pixel of said predetermined region.

15. The display apparatus according to claim 10, wherein said control instrument performs the control so that a chrominance signal which does not include said predetermined color component is displayed without performing said color correction, and
performs the control so that each of said first corrected signal and said second corrected signal are alternately displayed, where it is assumed that all of the chrominance signals displayed in the corresponding pixel of said predetermined region include said predetermined color component.

16. The display apparatus according to claim 10, wherein said predetermined color component is yellow, magenta, or cyan.

17. The display apparatus according to claim 10, wherein said three primary colors are red, green, and blue.

18. The display apparatus according to claim 10, wherein said chrominance signals are RGB signals.

19. The display apparatus according to claim 10, wherein, when said predetermined color component is yellow, said color correction instrument performs said first color correction by decreasing a value of a B signal of said chrominance signal and performs said second color correction by increasing the value of the B signal of said chrominance signal, when a yellow color component exists in said chrominance signals corresponding to said pixel.

20. A display method using a display apparatus including pixels, each pixel configured to display four colors including three primary colors and a white color, the display apparatus receiving and displaying chrominance signals corresponding to a mixing ratio of said four colors, comprising:
a color detection step of detecting whether a predetermined color component is included in each chrominance signal corresponding to each pixel in a predetermined region;
a color correction step of applying, to at least one of the pixels, each of a) a first color correction of increasing the saturation of at least one of said chrominance signals by decreasing a value of the at least one of said chrominance signals to form a first corrected chrominance signal and b) a second color correction of increasing the white color component of the at least one of said chrominance signals by increasing the value of the at least one of said chrominance signals to form a second corrected chrominance signal,
a control step of performing control of a color correction of the at least one of said chrominance signals based on said detected predetermined color component so that each of said first corrected chrominance signal and said corrected second chrominance signal are alternately displayed in a predetermined size of pixel units, which are horizontally and/or vertically adjacent, over said predetermined region; and
a display step of displaying on a display instrument, for each pixel, said first corrected chrominance signal, said second corrected chrominance signal, or a chrominance signal not provided with said color correction responsive to said control step.

21. A non-transitory computer readable medium including computer program instructions which are configured to cause a computer to perform:
a color detection step of detecting whether a predetermined color component is included in each chrominance signal corresponding to each pixel in a predetermined region;
a color correction step of applying, to at least one of the pixels, each of a) a first color correction of increasing the saturation of at least one chrominance signal by decreasing a value of the at least one chrominance signal to form a first corrected chrominance signal and b) a second color correction of increasing a white color component of the at least one chrominance signal by increasing the value of the at least one chrominance signal to form a second corrected chrominance signal; and
a control step of performing control of a color correction of the at least one chrominance signal based on said detected predetermined color component so that each of said first corrected chrominance signal and said second corrected chrominance signal are alternately displayed in a predetermined size of pixel units, which are horizontally and/or vertically adjacent, over said predetermined region, of a display method wherein
each pixel of said display method is configured to display four colors including three primary colors and the white color component, and receives and displays said chrominance signal corresponding to a mixing ratio of said four colors, and
said display method comprises said color correction step, said control step and a display step.

* * * * *